(12) United States Patent
Kimrey, Jr.

(10) Patent No.: US 11,129,398 B2
(45) Date of Patent: Sep. 28, 2021

(54) RADIO FREQUENCY HEATING PROCESS WITH RESIDENCE TIME CONTROL OF PACKAGED ARTICLES

(71) Applicant: Harold Dail Kimrey, Jr., Knoxville, TN (US)

(72) Inventor: Harold Dail Kimrey, Jr., Knoxville, TN (US)

( * ) Notice: Subject to any disclaimer, the term of this patent is extended or adjusted under 35 U.S.C. 154(b) by 279 days.

(21) Appl. No.: 16/163,507

(22) Filed: Oct. 17, 2018

(65) Prior Publication Data

US 2019/0124729 A1  Apr. 25, 2019

Related U.S. Application Data

(60) Provisional application No. 62/574,603, filed on Oct. 19, 2017, provisional application No. 62/574,607, (Continued)

(51) Int. Cl.
| | |
|---|---|
| *H05B 6/80* | (2006.01) |
| *H05B 6/46* | (2006.01) |
| *A23L 3/01* | (2006.01) |
| *H05B 6/62* | (2006.01) |
| *A23L 3/00* | (2006.01) |

(Continued)

(52) U.S. Cl.
CPC .............. *A23L 3/01* (2013.01); *A23L 3/003* (2013.01); *A23L 3/065* (2013.01); *B65G 35/00* (2013.01); *B65G 37/00* (2013.01); *H05B 6/48* (2013.01); *H05B 6/54* (2013.01); *H05B 6/60* (2013.01); *H05B 6/62* (2013.01); *H05B 6/68* (2013.01); *H05B 6/782* (2013.01); *H05B 6/80* (2013.01); *A23V 2002/00* (2013.01);

(Continued)

(58) Field of Classification Search
CPC ... H04L 5/0016; H04L 5/0023; H04L 5/0026; H04L 5/0048; H04L 5/0053; H04W 72/042; A23L 3/003; A23L 3/01; A23L 3/065; A23V 2002/00; H05B 2206/045; H05B 6/46; H05B 6/48; H05B 6/54; H05B 6/60; H05B 6/62; H05B 6/68; H05B 6/80
USPC ....... 219/679, 680, 682, 684, 687, 690, 692, 219/693, 698, 700, 701, 707, 757, 761, 219/756; 426/91, 231, 233; 427/440
See application file for complete search history.

(56) References Cited

U.S. PATENT DOCUMENTS

| | | |
|---|---|---|
| 2,946,972 A | 7/1960 | Hunt et al. |
| 2,981,904 A | 4/1961 | Ajioka et al. |
| | (Continued) | |

FOREIGN PATENT DOCUMENTS

| | | |
|---|---|---|
| WO | 95/10403 | 4/1995 |
| WO | 2010032478 A1 | 3/2010 |

OTHER PUBLICATIONS

Search Report and Written Opinion dated Jan. 19, 2016 for related PCT Patent Application No. PCT/US2015/057190, filed Oct. 23, 2015, 13 pages.

(Continued)

*Primary Examiner* — Quang T Van
(74) *Attorney, Agent, or Firm* — Hovey Williams LLP; Kameron D. Kelly

(57) ABSTRACT

Heating systems utilizing radio frequency (RF) energy and methods for using the same to rapidly and uniformly heat packaged articles moving through the system on one or more convey lines. These systems may be useful for a variety of processes, including the pasteurization or sterilization of packaged foodstuffs.

5 Claims, 22 Drawing Sheets

Related U.S. Application Data filed on Oct. 19, 2017, provisional application No. 62/574,616, filed on Oct. 19, 2017, provisional application No. 62/574,620, filed on Oct. 19, 2017, provisional application No. 62/574,622, filed on Oct. 19, 2017, provisional application No. 62/574,630, filed on Oct. 19, 2017, provisional application No. 62/574,638, filed on Oct. 19, 2017, provisional application No. 62/574,640, filed on Oct. 19, 2017.

(51) Int. Cl.

| | | |
|---|---|---|
| *A23L 3/06* | (2006.01) | |
| *H05B 6/78* | (2006.01) | |
| *B65G 37/00* | (2006.01) | |
| *B65G 35/00* | (2006.01) | |
| *H05B 6/60* | (2006.01) | |
| *H05B 6/68* | (2006.01) | |
| *H05B 6/48* | (2006.01) | |
| *H05B 6/54* | (2006.01) | |
| *A47J 37/04* | (2006.01) | |

(52) U.S. Cl.
CPC .............. *A47J 37/045* (2013.01); *H05B 6/46* (2013.01); *H05B 2206/045* (2013.01)

(56) References Cited

U.S. PATENT DOCUMENTS

| | | |
|---|---|---|
| 3,528,041 A | 9/1970 | Honda et al. |
| 3,571,551 A | 3/1971 | Ogasawara et al. |
| 3,725,824 A | 4/1973 | McDonald |
| 3,995,238 A | 11/1976 | Knox et al. |
| 4,162,500 A | 7/1979 | Jacobi et al. |
| 4,282,887 A | 8/1981 | Sterzer |
| 4,633,875 A | 1/1987 | Turner |
| 4,673,946 A | 6/1987 | Hoover |
| 5,487,873 A | 1/1996 | Bridges et al. |
| 5,609,820 A | 3/1997 | Bridges et al. |
| 5,914,014 A | 6/1999 | Kartchner |
| 6,063,234 A | 5/2000 | Chen et al. |
| 6,086,830 A | 7/2000 | Kartchner |
| 6,187,988 B1 | 2/2001 | Cha |
| 8,514,034 B2 | 8/2013 | Kang |
| 2012/0092091 A1 | 4/2012 | Kang |
| 2012/0103976 A1* | 5/2012 | Boido .................. B65C 9/0015 |
| | | 219/690 |

OTHER PUBLICATIONS

European Search Report dated Jun. 8, 2018 for related European Patent Application No. 15852694.7; 6 pages.
TMI-Orion Data Sheet PicoVACQ Temperature Brochure; TMI-Orion S.A., Casteinau-le-Lez, France; TO/DS/080101. ed14; www.tmi-orion.com; 2018; 5 pages.

* cited by examiner

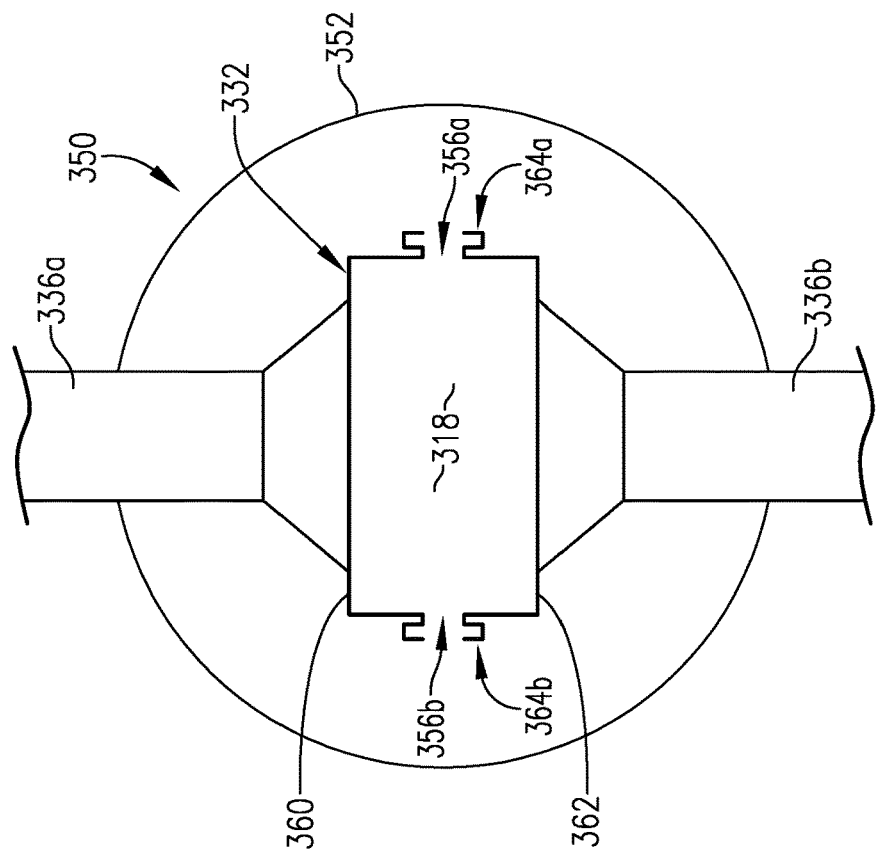
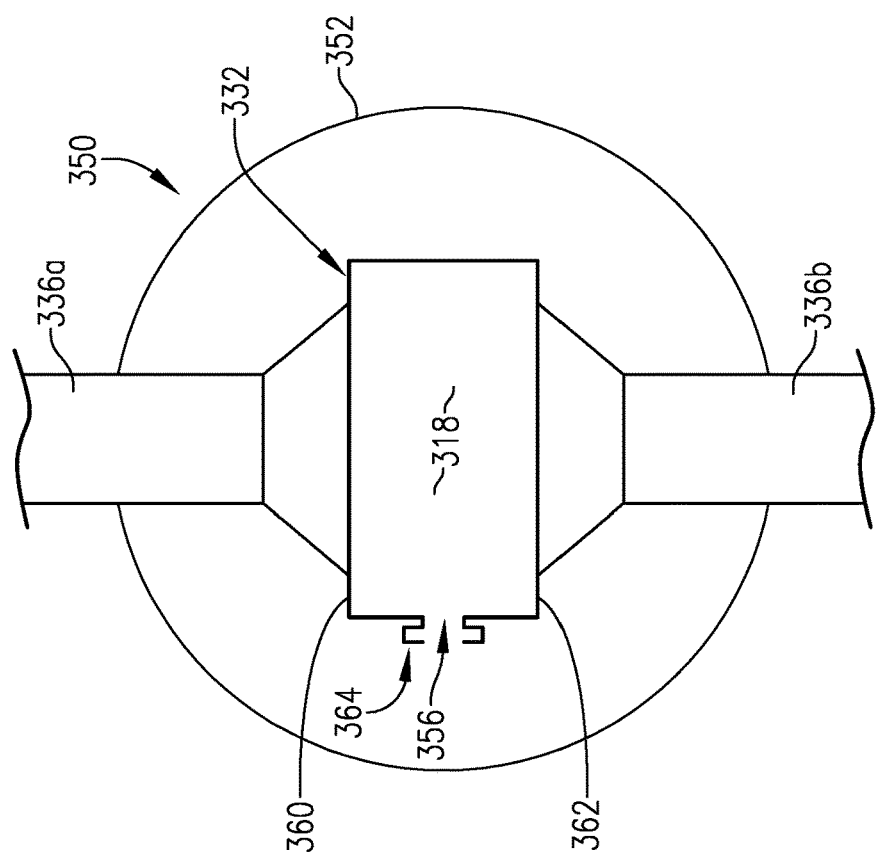

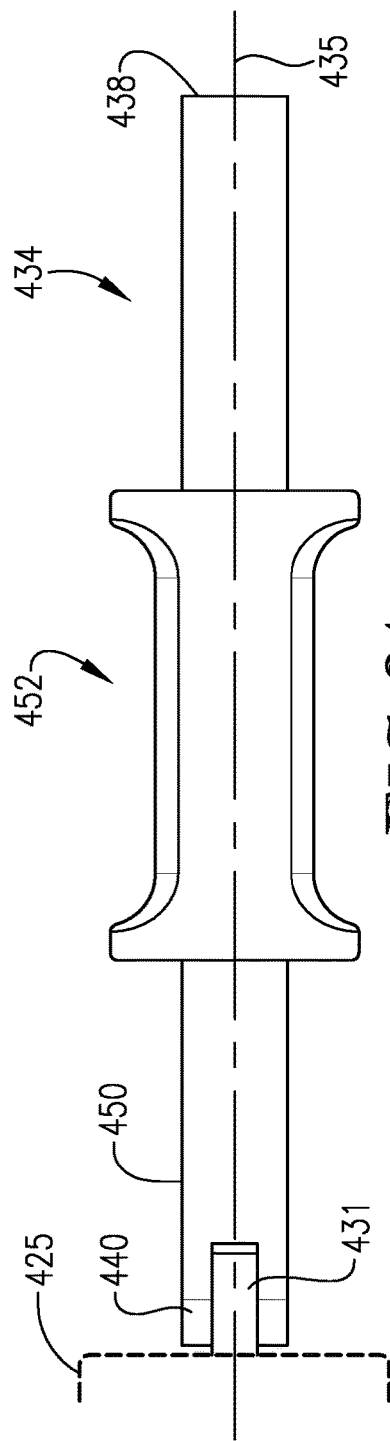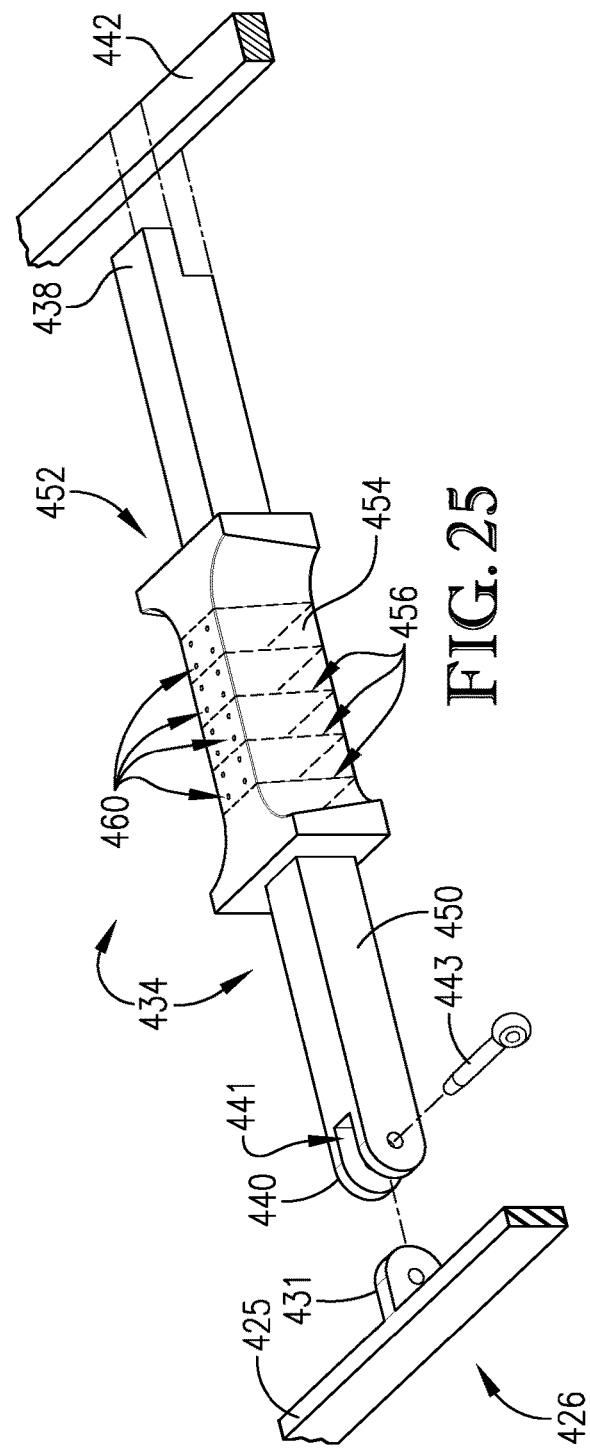

RADIO FREQUENCY HEATING PROCESS WITH RESIDENCE TIME CONTROL OF PACKAGED ARTICLES

RELATED APPLICATIONS

The present U.S. utility patent application claims priority to U.S. Provisional Patent Application Ser. No. 62/574,603, filed Oct. 19, 2017, entitled "COMPACT RADIO FREQUENCY HEATING OF PACKAGED ARTICLES," U.S. Provisional Patent Application Ser. No. 62/574,607, filed Oct. 19, 2017, entitled "HIGH INTENSITY RADIO FREQUENCY HEATING OF PACKAGED ARTICLES," U.S. Provisional Patent Application Ser. No. 62/574,616, filed Oct. 19, 2017, entitled "APPLICATION OF RADIO FREQUENCY ENERGY TO PACKAGED ARTICLES," U.S. Provisional Patent Application Ser. No. 62/574,620, filed Oct. 19, 2017, entitled "CONVEYANCE OF PACKAGED ARTICLES HEATED WITH RADIO FREQUENCY ENERGY," U.S. Provisional Patent Application Ser. No. 62/574,622, filed Oct. 19, 2017, entitled "ENERGY ABSORPTIVE COMPONENTS FOR RADIO FREQUENCY HEATING OF PACKAGED ARTICLES," U.S. Provisional Patent Application Ser. No. 62/574,630, filed Oct. 19, 2017, entitled "CONTACT MEMBERS FOR PACKAGED ARTICLES HEATED WITH RADIO FREQUENCY ENERGY," U.S. Provisional Patent Application Ser. No. 62/574,638, filed Oct. 19, 2017, entitled "RADIO FREQUENCY HEATING APPARATUS WITH HELICAL TRAVEL PATH FOR PACKAGED ARTICLES," and U.S. Provisional Patent Application Ser. No. 62/574,640, filed Oct. 19, 2017, entitled "RADIO FREQUENCY HEATING PROCESS WITH RESIDENCE TIME CONTROL OF PACKAGED ARTICLES." The entirety of the above-identified provisional patent applications are incorporated herein by reference.

FIELD OF THE INVENTION

The present invention relates generally to systems that use radio frequency (300 kHz to 300 MHz) energy to heat articles.

BACKGROUND

Electromagnetic radiation is a known mechanism for delivering energy to an object. The ability of electromagnetic energy to penetrate and heat an object in a rapid and effective manner has proven advantageous for a number of chemical and industrial processes. In the past, radio frequency (RF) energy has been used to heat articles by, for example, induction heating or dielectric heating. However, the use of RF energy to heat articles can have drawbacks. For example, the wavelength of RF energy can make it difficult to transmit and launch RF energy in an efficient manner. The present invention involves discoveries for minimizing and/or eliminating many of the drawbacks conventionally associated with the use of RF energy to heat articles.

SUMMARY

One aspect of the present invention concerns a process for sterilizing or pasteurizing articles using radio frequency (RF) energy. The process comprises the steps of: (a) passing a plurality of articles through a liquid contact zone of an RF heating system on at least one convey line while maintaining the articles in contact with a liquid for at least a portion of the passing, where the liquid contact zone includes an initial thermal regulation zone, an RF heating zone, and subsequent thermal regulation zone; (b) regulating the temperature of the articles on the convey line in the initial thermal regulation zone to promote temperature uniformity of the articles; and (c) subsequent to the regulating step, heating the articles on the convey line with RF energy in the RF heating zone to thereby increase the average temperature at the geometric center of the articles by at least 20° C.; and (d) subsequent to the heating step, regulating the temperature of the articles on the convey line to thereby decrease the average temperature at the geometric center of the articles by at least 10° C. The average residence time of the articles in the RF heating zone is not more than 10 percent of the average residence time of the articles in the liquid contact zone.

Another embodiment of the present invention concerns a process for sterilizing or pasteurizing articles using RF energy. The process includes the steps of: (a) passing a plurality of articles through a liquid contact zone of an RF heating system on at least one convey line while maintaining the articles in contact with a liquid during at least a portion of said passing, where the liquid contact zone includes an initial thermal regulation zone, an RF heating zone, and a subsequent thermal regulation zone; (b) regulating the temperature of the articles on the convey line in the initial thermal regulation zone to promote temperature uniformity of the articles; (c) subsequent to the regulating, heating the articles on the convey line with RF energy in the RF heating zone to thereby increase the average temperature at the geometric center of the articles by at least 20° C.; and (d) subsequent to the heating, regulating the temperature of the articles on the convey line to thereby decrease the average temperature at the geometric center of the articles by at least 10° C. The articles travel through the liquid contact zone on a nonlinear travel path having a total length that is at least 10 times greater than the linear distance between the locations where the articles enter and exit the liquid contact zone.

Yet another embodiment of the present invention concerns a system for sterilizing or pasteurizing articles using radio frequency energy. The system comprises an initial thermal regulation zone for promoting temperature uniformity of the articles, an RF heating zone for heating the articles with RF energy, and a subsequent thermal regulation zone for cooling the articles. The system also includes at least one convey line for transporting the articles along a non-linear article travel path through the initial thermal regulation, RF heating, and subsequent thermal regulation zones. The initial thermal regulation zone comprises an inlet for receiving the articles and the final thermal regulation zone comprises an outlet for discharging the articles. The convey line is configured such that the total length of the article travel path from the inlet to the outlet is at least 10 times greater than the linear distance between the inlet and the outlet.

Still another embodiment of the present invention concerns a process for sterilizing or pasteurizing articles using radio frequency energy. The process includes the steps of: (a) discharging RF energy into an RF heating zone; (b) passing a plurality of said articles through the RF heating zone on at least one convey line; (c) heating the articles on the convey line with at least a portion of the RF energy discharged into the RF heating zone, where the heating is sufficient to increase the average temperature at the geometric center of the articles by at least 20° C. to a temperature of at least 65° C. During the heating, the articles absorb RF energy at an average lengthwise energy absorption rate of at least $2 \times 10^5$ Joules per foot.

A further embodiment of the present invention concerns a process for sterilizing or pasteurizing articles using radio frequency energy. The process includes the steps of: (a) discharging RF energy into an RF heating zone; (b) passing a plurality of said articles through the RF heating zone on at least one convey line; and (c) heating the articles on the convey line with at least a portion of the RF energy discharged into the RF heating zone to increase the average temperature at the geometric center of the articles by at least 20° C. to a temperature of at least 80° C. During the heating, the average lengthwise heating rate at the geometric center of the articles in the RF heating zone is at least 2° C. per foot.

A still further embodiment of the present invention concerns a system for sterilizing or pasteurizing articles using radio frequency energy. The system includes an initial thermal regulation zone for promoting temperature uniformity of the articles and one or more RF energy generators capable of generating at least 25 kW of RF power. The system also includes an RF heating zone for heating the articles with RF energy generated by the RF energy generators and a subsequent thermal regulation zone for cooling the articles. The system further includes at least one convey line for transporting the articles along an article travel path through the initial thermal regulation, RF heating, and subsequent thermal regulation zones. The system is configured to provide the RF heating zone with an average volumetric RF power intensity of at least 1.5 kilowatts per cubic foot.

Another embodiment of the present invention concerns a process for sterilizing or pasteurizing articles using radio frequency (RF) energy. The process includes the steps of: (a) passing a plurality of said articles through a pressure vessel on at least one convey line while said articles are submerged in a liquid medium; (b) discharging RF energy into an RF heating zone defined within at least one applicator that is received in the pressure vessel and is in open communication with the interior of the pressure vessel; and (c) heating the articles with RF energy in the RF heating zone as the articles are passed through the RF heating zone on the convey line and are submerged in the liquid medium.

Yet another embodiment of the present invention concerns a system for heating a plurality of articles using radio frequency energy. The system includes a pressure vessel, a convey line for transporting the articles through the pressure vessel, and at least one RF applicator received in the pressure vessel and defining an RF heating zone therein. The RF applicator includes at least one opening that is in communication with the interior of the pressure vessel. The system also includes an RF generator for producing RF energy and an RF energy transmission system configured to transmit RF energy from the RF generator to the RF applicator. At least a portion of the RF energy transmission system penetrates at least one wall of the pressure vessel to provide RF energy to the applicator in the pressure vessel.

Still another embodiment of the present invention concerns a system for heating a plurality of articles using radio frequency (RF) energy. The system comprises a split applicator configured to provide a resonant cavity for RF energy. The split applicator comprises an upper section and a lower section and at least one opening defined between the upper and lower sections. The system further comprises at least one RF waveguide configured to propagate RF energy toward the split applicator and an RF conveyor configured to transport a plurality of the articles through the split applicator. The RF conveyor comprises a plurality of convey arms extending through the opening in the split applicator and configured to engage and transport the articles through the split applicator.

Yet another embodiment of the present invention concerns a process for sterilizing or pasteurizing articles using radio frequency energy. The process comprises the steps of: (a) loading a plurality of said articles onto an RF zone conveyor in a loading zone; (b) transporting the articles through an RF heating zone using the RF zone conveyor while heating the articles with RF energy in the RF heating zone; and (c) unloading the articles from the RF zone conveyor in an unloading zone. The RF zone conveyor comprises a plurality of spaced apart article-supporting members coupled to a drive mechanism that moves the article-supporting members through the RF heating zone. The loading step includes loading each of the articles in an article-receiving space defined between adjacent ones of the article-supporting members and the unloading step includes unloading each of the articles from the article-receiving space. The size of the article-receiving space is larger in the loading and unloading zones than in the RF heating zone.

A further embodiment of the present invention concerns a process for sterilizing or pasteurizing articles using radio frequency energy. The process includes the steps of: (a) loading a plurality of articles onto an RF zone conveyor in a loading zone, where the RF zone conveyor comprises a plurality of spaced-apart convey arms, each elongated along a longitudinal axis, and where the loading includes placing each of the articles between and in contact with a pair of the convey arms; (b) transporting the articles through an RF heating zone along a heating path using the RF zone conveyor while heating the articles with RF energy in the RF heating zone; (c) unloading the articles from the RF zone conveyor in an unloading zone; and (d) returning the convey arms to the loading zone along a return path. The convey arms travel along at least a portion of the heating path in a heating orientation and travel along at least a portion of the return path in a return orientation. The direction of extension of the longitudinal axis of the convey arms in the return orientation is skewed at least 45 degrees from the direction of extension of the longitudinal axis of the convey arms in the heating orientation.

A still further embodiment of the present invention concerns a radio frequency heating system for heating a plurality of articles. The system comprises an RF heating zone for heating a plurality of the articles with RF energy and a swing arm conveyor for transporting the articles through the RF heating zone. The swing arm conveyor comprises a plurality of spaced apart elongated convey arms each defining a free end, a connected end, and a longitudinal axis extending from the connected end to the free end. The system comprises a continuous drive mechanism coupled to the connected ends of the convey arms and the continuous drive mechanism moves the convey arms along a convey arm travel path that includes a heating path and a return path. The system comprises a support system for supporting the convey arms along at least a portion of the convey arm travel path. The support system supports the convey arms in a heating orientation along at least a portion of the heating path and in a return orientation along at least a portion of the return path. The direction of extension of the longitudinal axis of each of the convey arms in the return orientation is skewed at least 45 degrees from the direction of extension of the longitudinal axis of each of the convey arms in the heating orientation.

Still another embodiment of the present invention concerns a system for sterilizing or pasteurizing articles using radio frequency energy. The system comprises an RF generator for generating RF energy, an RF heating zone for heating the articles using RF energy generated by the RF generator, and an RF zone conveyor for transporting the articles through the RF heating zone. The RF zone conveyor comprises a plurality of article contact members each comprising an energy-absorptive component, and the article contact members are configured to contact the packages of the articles. The energy-absorptive component has a dielectric constant in the range of 20 to 150 and a dielectric loss factor in the range of 10 to 1500.

A further embodiment of the present invention concerns an apparatus for use in a pasteurization or sterilization system. The apparatus includes an ingestible substance, a sealed package surrounding the ingestible substance, and at least one article contact member contacting and at least partially supporting the sealed package. The article contact member includes an energy-absorptive component and the energy-absorptive component has a dielectric constant within 50 percent of the average dielectric constant of the ingestible substance. The energy-absorptive component has a dielectric loss factor within 50 percent of the average dielectric loss factor of the ingestible substance and the energy-absorptive component comprises a composite material that includes at least one of (i) a polymeric binder and a plurality of solid particles dispersed in the polymeric binder and (ii) a solid electrolyte material.

A still further embodiment of the present invention concerns an apparatus for use in a system for pasteurizing or sterilizing articles using radio frequency energy. The apparatus comprises an article supporting member configured to support the articles during pasteurization or sterilization and an energy-absorptive contact member coupled to the article supporting member and configured to contact at least a portion of the package of the articles. The article contact member comprises an energy-absorptive component and the energy-absorptive component includes a composite material comprising at least one of (i) a polymeric binder and a plurality of solid particles dispersed in the polymeric binder and (ii) a solid electrolyte material. The article supporting member is formed of a dielectric material having a dielectric loss factor of less than 10 or a conductive material having a conductivity of at least $1 \times 10^6$ Siemens per meter and the composite material has a dielectric constant in the range of 40 to 60 and a dielectric loss factor in the range of 200 to 800.

Yet another embodiment of the present invention concerns a process for sterilizing or pasteurizing articles using radio frequency energy. The process comprises the steps of: (a) transporting a plurality of articles through an RF heating zone using an RF zone conveyor; (b) simultaneously with the transporting, heating the articles with RF energy in the RF heating zone. The RF zone conveyor comprises a plurality of article contact members at least partially surrounding and supporting the articles in the RF heating zone. Each of the article contact members comprises an energy-absorptive component having a dielectric constant in the range of 20 to 150 and a dielectric loss factor in the range of 10 to 1500.

Still another embodiment of the present invention concerns a process for sterilizing or pasteurizing articles using radio frequency energy. The process includes the steps of: (a) loading a plurality of the articles onto an RF zone conveyor in a loading zone, where the loading includes initiating contact between the packages of the articles and contact surfaces of article contact members of the RF zone conveyor, and the contact surfaces have an initial contact surface temperature immediately before contacting the packages of the articles in the loading zone; (b) transporting the articles through an RF heating zone via the RF zone conveyor while supporting the articles with the article contact members and maintaining the packages of the articles in contact with the contact surfaces, where each of the article contact members comprises an energy-absorptive component having a dielectric constant in the range of 20 to 150 and a dielectric loss factor in the range of 10 to 1500; (c) simultaneously with the transporting, heating the articles and the contacting members using RF energy discharged into the RF heating zone, where the heating causes the temperature of the geometric center of the articles to increase by at least 20° C.; (d) unloading the articles from the RF convey line in an unloading zone, where the unloading includes removing the packages of the articles from contact with the contact surfaces of the article contact members, the contact surfaces have a final contact surface temperature immediately after removing the packages of the articles from contact with the contact surfaces in the unloading zone, and the final contact surface temperature is at least 20° C. greater than the initial contact surface temperature; and (e) returning the article contact members from the unloading zone to the loading zone. During the returning, the temperature of the contact surfaces of the article contact members is reduced to a temperature within about 5° C. of the initial contact surface temperature.

A still further embodiment of the present invention concerns a process for sterilizing or pasteurizing articles using radio frequency. The process includes the steps of: (a) providing at least one article to be treated in the RF heating system, where the article comprises an ingestible substance in a sealed package; (b) determining at least one of an average dielectric constant and an average dielectric loss factor for the ingestible substance; (c) making an article contact member for the article, where the making includes forming an energy-absorptive component of the article contact member, the energy-absorptive component has a dielectric constant within 50 percent of the average dielectric constant of the ingestible substance and a dielectric loss factor within 50 percent of the average dielectric loss factor of the ingestible substance; (d) at least partially surrounding the packaged article with the contact member; and (e) while the article is at least partially surrounded by the contact member, heating the ingestible substance and the energy-absorptive component with RF energy in an RF heating zone. The heating increases the temperature of the coldest portion of the ingestible substance by at least 20° C.

Yet another embodiment of the present invention concerns a process for sterilizing or pasteurizing articles using radio frequency energy. The process includes the steps of: (a) heating a plurality of first articles in an RF heating zone while transporting the first articles through the RF heating zone on a convey line having a first configuration, where the convey line having the first configuration comprises a continuous drive member and a plurality of spaced-apart article supporting members for supporting the first articles; (b) replacing at least a portion of the plurality of first article supporting members with a plurality of second article supporting members to thereby provide a convey line having a second configuration; and (c) heating a plurality of second articles in the RF heating zone while transporting the second articles through the RF heating zone via the convey line having the second configuration. The first and second articles have different dimensional and/or dielectric characteristics and the first and second article supporting members are differently configured to account for the different characteristics of the first and second articles.

Still another embodiment of the present invention concerns an apparatus for thermally treating a plurality of articles. The apparatus includes a vessel comprising an article inlet for receiving the articles into the vessel and an article outlet for discharging the articles from the vessel and a conveyor received in the vessel and operable to transport the articles away from the article inlet toward the article outlet. The conveyor comprises a track configured to guide the articles on a convey pathway that includes a first substantially helical path having a plurality of vertically-spaced tiers and a plurality of spaced-apart pusher members configured to push the articles along the first substantially helical path.

A still further embodiment of the present invention concerns a system for pasteurizing or sterilizing articles using radio frequency (RF) energy. The system includes an initial thermal regulation zone comprising an initial helical conveyor, an RF heating zone comprising a linear conveyor, and a subsequent thermal regulation zone comprising a subsequent helical conveyor.

Yet another embodiment of the present invention concerns a process for sterilizing or pasteurizing articles using radio frequency RF energy. The process includes the steps of: (a) passing a plurality of articles through an initial thermal regulation zone; (b) heating the articles an RF heating zone, where at least a portion of the heating is performed using RF energy; and (c) passing the articles through a subsequent thermal regulation zone. The passing through the initial thermal regulation zone and/or the subsequent thermal regulation zone includes pushing the articles relative to a track that guides movement of the articles along a substantially helical path having a plurality of vertically-spaced tiers.

Still another embodiment of the present invention concerns a process for treating a plurality of articles. The process includes the steps of: (a) transporting a plurality of articles through a first zone using an initial continuous conveyor; (b) transitioning the articles from the initial continuous conveyor to an indexing conveyor, which includes intermittently loading individual articles into discrete article-receiving spaces defined along a convey path of the indexing conveyor; (c) transporting the articles through a second zone using the indexing conveyor, which includes incrementally moving the articles in an intermittent manner along the convey path of the indexing conveyor; (d) transitioning the articles from the indexing conveyor to a subsequent continuous conveyor, where the transitioning includes intermittently unloading the articles out of the article-receiving spaces of the indexing conveyor; (e) transporting the articles through a third zone using the subsequent continuous conveyor; and (f) adjusting the average residence time of the articles in the second zone relative the average residence time of the articles in the first and/or third zones by changing the average number of articles on the convey path of the indexing conveyor.

A still further embodiment of the present invention concerns a process for treating a plurality of articles. The process comprises the steps of: (a) entering processing rate and residence time information into a process control system of a multi-zone processing apparatus; (b) using the process control system to calculate one or more operating parameters of the processing apparatus based on the entered processing rate and residence time information; and (c) operating the processing apparatus according to the operating parameters. The step of operating includes: (i) transporting a plurality of articles through a first zone of the processing apparatus using an initial continuous conveyor; (ii) transitioning the articles from the initial continuous conveyor to an indexing conveyor, where the transitioning includes intermittently loading individual articles into discrete article-receiving spaces defined along a convey path of the indexing conveyor, where the operating parameters includes a loading parameter that determines how many article-receiving spaces of the indexing conveyor are skipped during the loading; (iii) transporting the articles through a second zone of the processing apparatus using the indexing conveyor, where the transporting includes incrementally moving the articles in an intermittent manner along the convey path of the indexing conveyor; (iv) transitioning the articles from the indexing conveyor to a subsequent continuous conveyor, where the transitioning includes intermittently unloading the articles out of the article-receiving spaces of the indexing conveyor; and (v) transporting the articles through a third zone of the processing apparatus using the subsequent continuous conveyor.

BRIEF DESCRIPTION OF THE DRAWINGS

FIG. 17 is a schematic axial cross-section of an RF heating section, particularly illustrating one embodiment of a split RF applicator;

FIG. 18 is a schematic axial cross-section of an RF heating section, particularly illustrating another embodiment of a split RF applicator;

FIG. 24 is a schematic top view of an article supporting member configured according to embodiments of the present invention, particularly showing the article contact member and the connection of the article supporting member to the drive mechanism;

FIG. 25 is a partial perspective view of an article supporting member configured according to various embodiments of the present invention;

DETAILED DESCRIPTION

In many commercial processes, it can be desirable to heat large numbers of individual packaged articles in a rapid and uniform manner. The present invention relates to systems and processes for such heating that use radio frequency (RF) energy to heat, or assist in heating, a variety of different articles. Examples of the types of articles that can be processed according to the present invention include, but are not limited to, packaged foodstuffs and beverages, as well as packaged pharmaceuticals, and packaged medical or veterinary fluids. The systems described herein may be configured for pasteurization, for sterilization, or for both pasteurization and sterilization. In general, pasteurization involves the rapid heating of an article or articles to a minimum temperature between about 60° C. and 100° C., or about 65° C. to about 100° C., about 70° C. and 100° C., while sterilization involves heating articles to a minimum temperature between 100° C. and 140° C., or between 110° C. and 135° C., or between 120° C. and 130° C.

Figure 1:
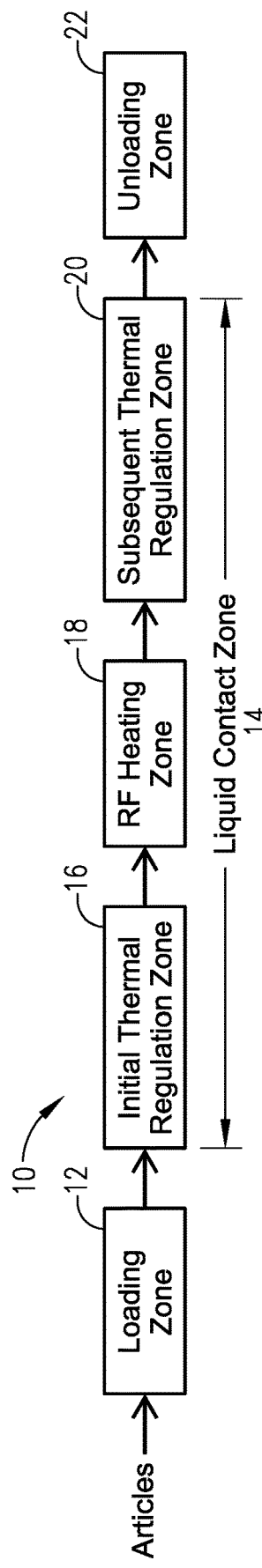
FIG. 1 is a block diagram of the typical zones or steps of an RF heating system or process configured according to various embodiments of the present invention.
Figure 2:
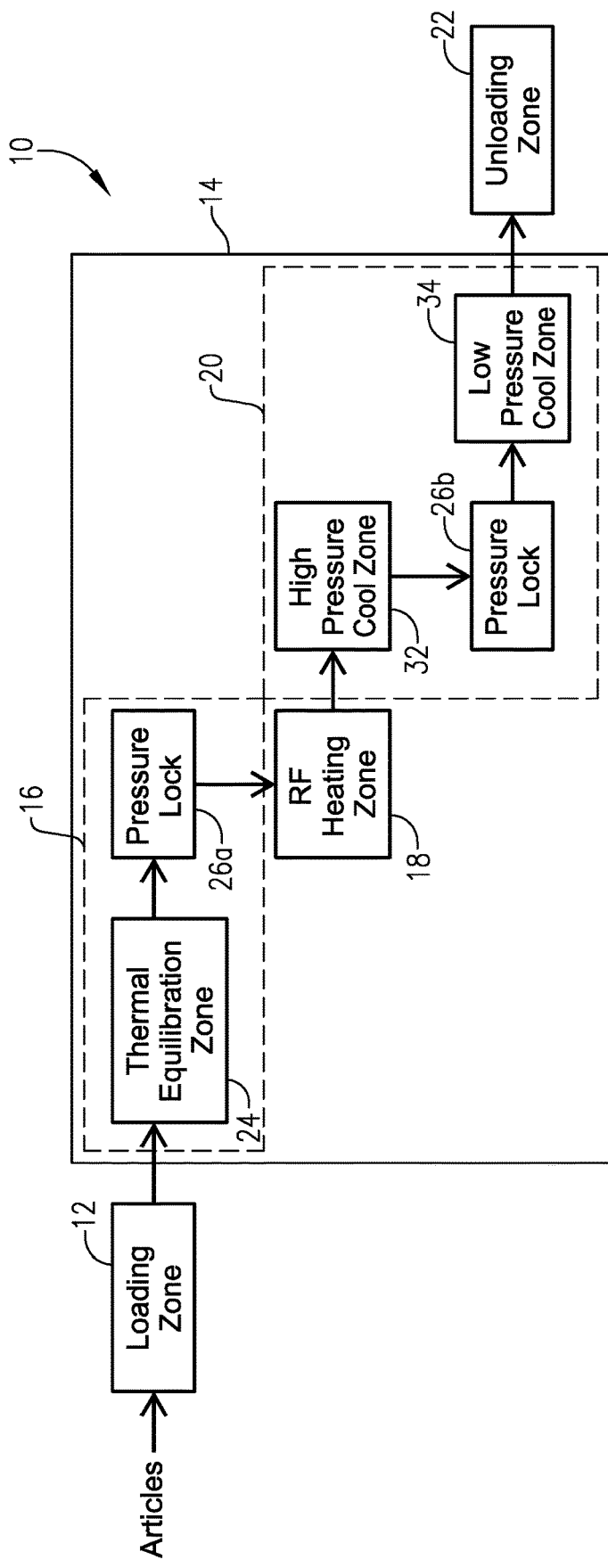
FIG. 2 is a block diagram of the typical steps or zones of an RF heating system according to various embodiments of the present invention, particularly where the system is used to pasteurize articles.
Figure 3:
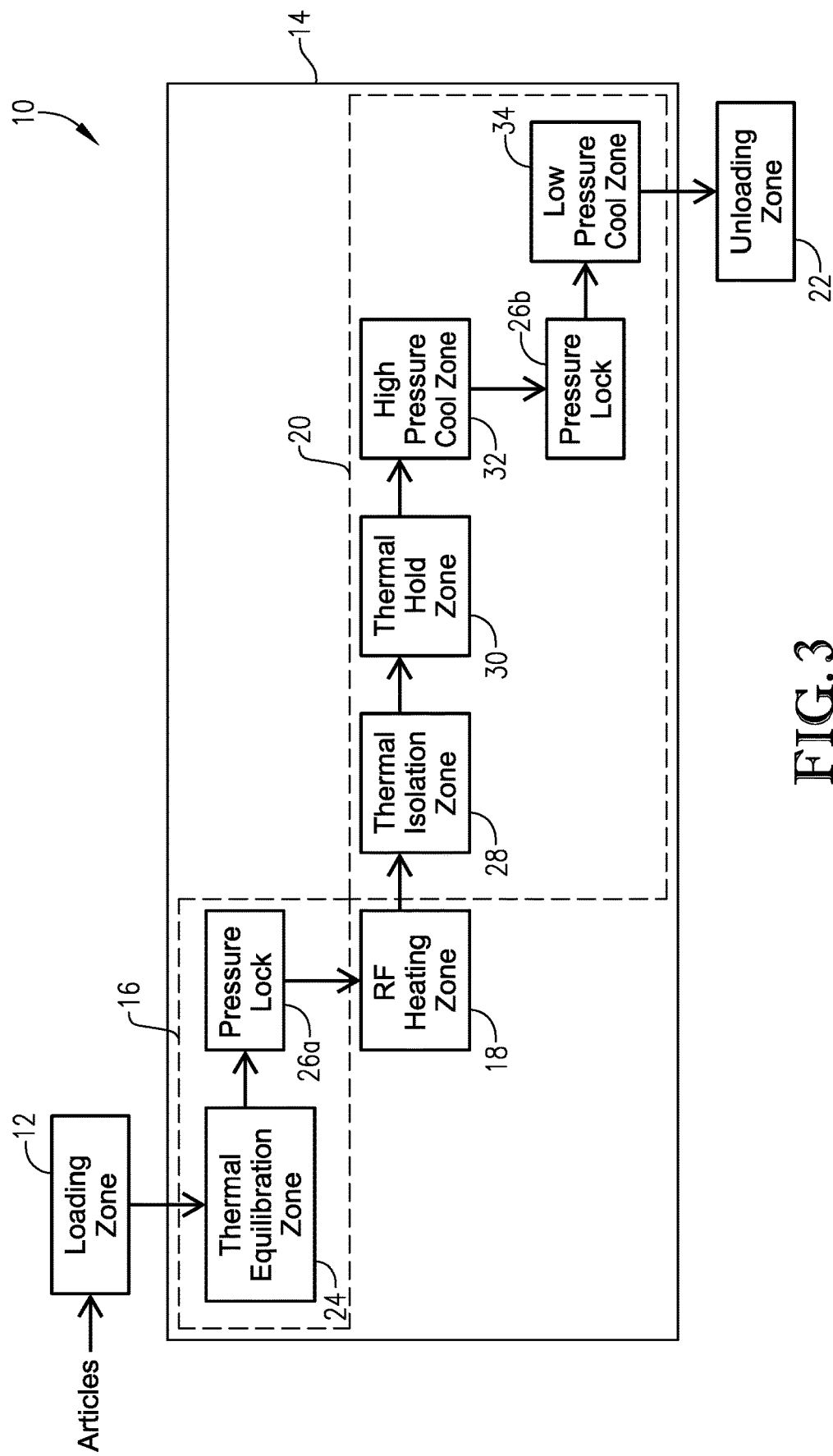
FIG. 3 is a block diagram of typical steps or zones of an RF heating system according to various embodiments of the present invention, particularly where the system is used to sterilize articles.

FIGS. 1-3 are overall diagrams of various embodiments of an RF heating system 10 configured according to the present invention. As shown in FIGS. 1-3, articles introduced into the RF heating system 10 can pass from a loading zone 12 into a liquid contact zone 14, wherein the articles may be contacted with at least one liquid medium while being heated to a temperature sufficient to pasteurize or sterilize the contents of the package. The liquid contact zone 14 is the section of the RF heating system 10 located between where the articles are initially contacted with a liquid medium, such as, for example, by spraying or submersion, and where the articles are finally removed from contact with a liquid medium. The articles may remain in contact with the liquid medium while passing through the liquid contact zone 14. As shown in FIG. 1, the liquid contact zone 14 may include an initial thermal regulation zone 16, an RF heating zone 18, and a subsequent thermal regulation zone 20. Specific configurations of the liquid contact zone 14 are shown in FIG. 2 for an exemplary RF pasteurization system and in FIG. 3 for an exemplary RF sterilization system, details of which will be discussed in further detail below. Once pasteurized or sterilized and after being cooled to a suitable handling temperature, the articles may be unloaded from the liquid contact zone 14 via an unloading zone 22.

In some embodiments, each of the initial thermal regulation zone 16, RF heating zone 18, and subsequent thermal regulation zone 20 may be defined in a single vessel, while in other embodiments, at least one of these stages of the liquid contact zone 14 may be defined within one or more separate vessels. Additionally, one or more transition zones between individual processing stages or steps may also be defined in one or more separate vessels, or one or more of those transition zones may be defined within the same vessel as at least one preceding (e.g., upline) or subsequent (e.g., downline) stage or zone.

In certain embodiments, the average residence time of each article in the liquid contact zone 14, measured from the inlet to the initial thermal regulation zone 16 to the outlet of the subsequent thermal regulation zone 20, can be at least about 10, at least about 15, at least about 20, at least about 25, at least about 30, at least about 35, at least about 40, at least about 45, at least about 50, at least about 55, or at least about 60 minutes and/or not more than about 240, not more than about 230, not more than about 220, not more than about 210, not more than about 200, not more than about 190, not more than about 180, not more than about 170, not more than about 160, not more than about 150, not more than about 140, not more than about 130, not more than about 120, not more than about 110, not more than about 100, not more than about 90, not more than about 80, or not more than about 70 minutes. When the articles are being pasteurized, each article can have a residence time in the liquid contact zone 14 in range of from about 10 minutes to about 120 minutes, or about 30 minutes to about 70 minutes. When being sterilized, the articles can have an average residence time in the liquid contact zone 14 in the range of from about 20 minutes to about 240 minutes, about 40 minutes to about 120 minutes, or about 60 minutes to about 100 minutes.

The RF heating systems of the present invention may include at least one conveyance system for transporting the articles along a travel path through one or more of the processing zones as described above. The conveyance system may include a single convey line or it can include two or more convey lines arranged in parallel or in series. Unlike other types of heating systems, the articles passed through the RF heating systems described herein are not placed in multi-article carriers, but instead, travel through the system as individual sealed packages. Further, in certain embodiments, the articles passing through the initial thermal regulation zone 16 and the subsequent thermal regulation zone 20 may not be in contact with or supported by any type of article contact member during passage through these zones.

One or more of the vessels defining the liquid contact zone 14 (e.g., the initial thermal regulation zone 16, the RF heating zone 18, and/or the subsequent thermal regulation zone 20) may be configured to be at least partially liquid-filled. As used herein, the term "at least partially liquid-filled," denotes a configuration in which at least 50 percent of the total internal volume of a vessel is filled with a specified liquid. In certain embodiments, at least about 60, at least about 70, at least about 80, at least about 90, at least about 95, or at least about 99 percent of the total internal volume of one or more vessels may be filled with a liquid medium. While being passed through a liquid-filled vessel, the articles may be at least partially, or completely, submerged in the liquid medium during the processing step. When two or more vessels are at least partially filled with a liquid medium, the liquid medium in one vessel may be the same as, or different than, the liquid medium in another adjacent vessel. Thus, articles that are at least partially submerged in one liquid during the processing step performed in one zone may be at least partially submerged in the same or in a different liquid during the processing step performed in a previous or subsequent zone. In certain embodiments, the initial thermal regulation zone 16, the RF heating zone 18, and the subsequent thermal regulation zone 20 are configured to maintain the articles in substantially continuous contact with a liquid medium.

The liquid medium used in the vessel or vessels of the liquid contact zone 14 can be any suitable non-compressible fluid that exists in a liquid state at the operating conditions within the vessel. The liquid medium may have a dielectric constant greater than the dielectric constant of air. In some cases, the liquid medium may have a dielectric constant similar to the dielectric constant of the packaged substance being processed. For example, the dielectric constant of the liquid medium may be at least about 20, at least about 25, at least about 30, at least about 35, or at least about 40 and/or not more than about 120, not more than about 110, not more than about 100, not more than about 80, or not more than about 70, measured at a temperature of 80° C. and a frequency of 100 MHz. Water (or a liquid comprising water) may be particularly suitable for systems used to heat ingestible substances such as foodstuffs and medical or pharmaceutical fluids. Additives such as, for example, oils, alcohols, glycols, or salts, may be optionally be added to the liquid medium to alter or enhance its physical properties (e.g., boiling point) during processing, if needed.

Several different types of articles may be heated using RF heating systems of the present invention. Typically, each article includes a sealed package surrounding at least one ingestible substance. Examples of ingestible substances can include, but are not limited to, food, beverages, medical, or pharmaceutical items suitable for human and/or animal consumption. A packaged article may include a single type of foodstuff (or other ingestible substance), or it may include two or more different ingestible substances, which may be in contact with each other or separated from one another within the package. The total volume of foodstuff (or other ingestible substance) within each sealed package can be at least about 4, at least about 6, at least about 8, at least about 10, at least about 15, at least about 20, at least about 25, at least about 50, at least about 75, at least about 100, at least about 150, at least about 200, or at least about 250 cubic inches and/or not more than about 500, not more than about 400, not more than about 300, not more than about 200, not more than about 100, not more than about 75, not more than about 50, not more than about 25, not more than about 24, not more than about 22, not more than about 18, or not more than about 16 cubic inches.

In certain embodiments, the article, foodstuff, or other ingestible substance being heated may have a dielectric constant of at least about 20 and not more than about 150. Additionally, or in the alternative, the foodstuff or other ingestible substance may have a dielectric loss factor of at least about 10 and not more than about 1500. Unless otherwise noted, the dielectric constant and dielectric loss factors provided herein are measured at a frequency of 100 MHz and a temperature of 80° C. In other embodiments, the foodstuff or other ingestible substance can have a dielectric constant of at least about 25, at least about 30, at least about 35, or at least about 40 and/or not more than about 140, not more than about 130, not more than about 120, not more than about 110, not more than about 100, not more than about 90, not more than about 80, not more than about 70, or not more than about 60, or it can be in the range of from about 20 to about 150, about 30 to about 100, or about 40 to about 60. Additionally, the foodstuff or other ingestible substance can have a dielectric loss factor of at least about 10, at least about 25, at least about 50, at least about 100, at least about 150, or at least about 200 and/or not more than about 1500, not more than about 1250, not more than about 1000, or not more than about 800, or it can be in the range of from about 10 to about 1500, about 100 to about 1250, or about 200 to about 800.

The packages used to hold the foodstuff or other ingestible substance may be of any size and/or shape. In some embodiments, each package can have a length (longest dimension) of at least about 2, at least about 4, at least about 6, at least about 8 inches and/or not more than about 30, not more than about 20, not more than about 18, not more than about 15, not more than about 12, not more than about 10, or not more than about 8 inches; a width (second longest dimension) of at least about 1 inch, at least about 2, or at least about 4 inches and/or not more than about 20, not more than about 15, not more than about 12, not more than about 10, or not more than about 8 inches; and a depth (shortest dimension) of at least about 0.5, at least about 1, or at least about 2 inches and/or not more than about 8, not more than about 6, or not more than about 4 inches. The packages may be formed of materials that include, but are not limited to, plastics, cellulosics, glass, and combinations thereof. In certain embodiments, the packages are rigid or semi-rigid, but not flexible. In other embodiments, the packages can be flexible, or partially flexible.

The RF heating systems of the present invention may be configured to maximize spatial efficiency, while still achieving desirable levels of production. For example, the convey line or lines may be configured such that each article may travel along a path between the inlet and outlet of the liquid contact zone 14 that is at least about 300, at least about 400, at least about 500, at least about 600, at least about 700, at least about 800, at least about 900, at least about 1000, at least about 1250, or at least about 1500 feet and/or not more than about 25,000, not more than about 22,500, not more than about 20,000, not more than about 17,500, not more than about 15,000, not more than about 12,500, not more than about 10,000, not more than about 7500, not more than about 6000, or not more than about 5000 feet, or the travel path of the article through the liquid contact zone 14 can be in the range of from about 500 feet to about 25,000 feet or from about 600 feet to about 6000 feet. It should be understood that the travel path through the liquid contact zone 14 is equal to the sum of the length of the travel paths in the initial thermal regulation zone 16, the RF heating zone 18, and the subsequent thermal regulation zone 20, along with the travel paths through any transition zones therebetween.

Figure 4:
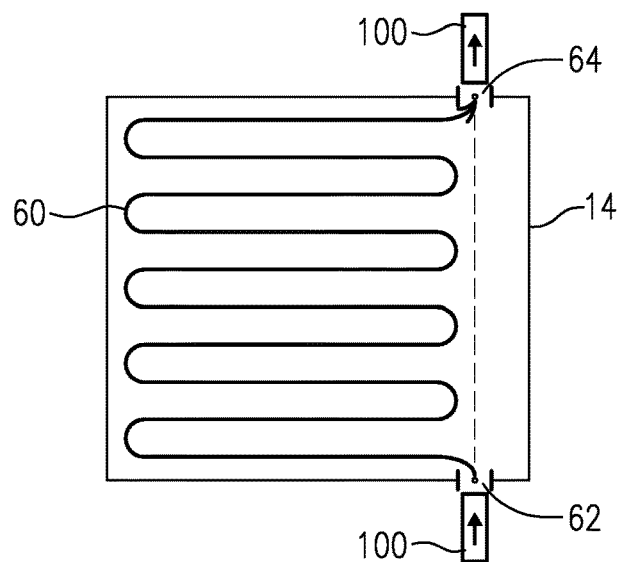
FIG. 4 is a schematic diagram of a liquid contact zone according to various embodiments of the present invention, particularly illustrating one example of a non-linear article travel path through the liquid contact zone.
Figure 5:
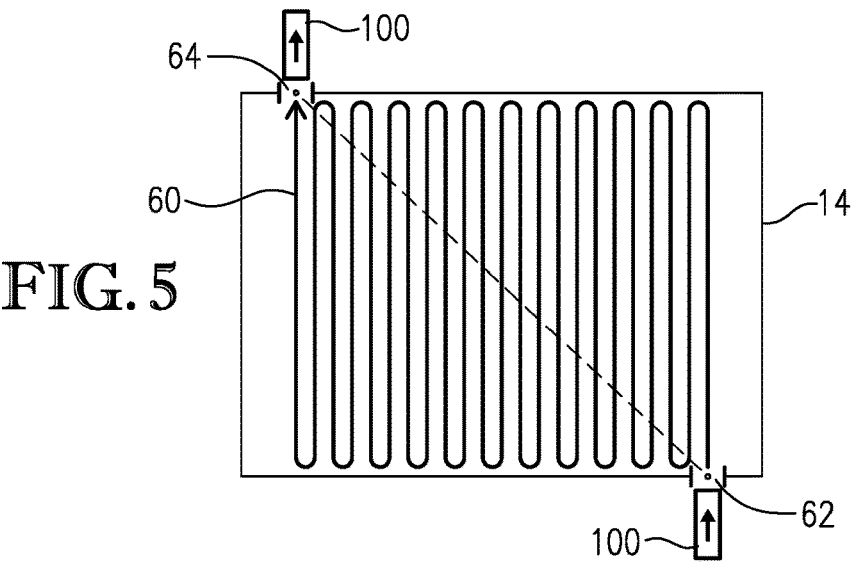
FIG. 5 is a schematic diagram of a liquid contact zone according to various embodiments of the present invention, particularly illustrating another example of a non-linear article travel path through the liquid contact zone.
Figure 6:
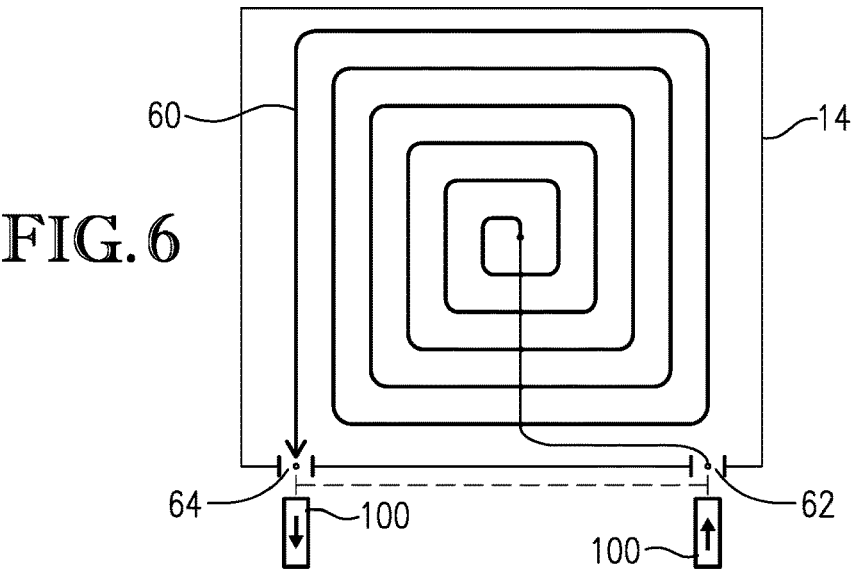
FIG. 6 a schematic diagram of a liquid contact zone according to various embodiments of the present invention, particularly illustrating yet another example of a non-linear article travel path through the liquid contact zone.

In some embodiments, the liquid contact zone 14 can be configured so that the travel path of the articles through the liquid contact zone 14 can be at least 2, at least about 5, at least about 8, at least about 10, at least about 12, at least about 15, at least about 18, at least about 20, at least about 22, or at least about 25 times greater than the linear distance between the inlet and outlet of the liquid contact zone 14. In such cases, the article travel paths (or convey lines defining the travel paths) may be nonlinear. Examples of the liquid contact zones 14 that include such nonlinear travel paths 60 for articles 100 are shown in FIGS. 4-6. In FIGS. 4-6, the travel paths 60 are shown with solid lines, while the linear distance between the inlet 62 and outlet 64 of the liquid contact zones 14 are shown as dashed lines.

When the liquid contact zone includes an initial thermal regulation zone, an RF heating zone, and a subsequent thermal regulation zone, the inlet 62 shown in FIGS. 4-6 can be the inlet to the initial thermal regulation zone, and the outlet 64 can be the outlet of the subsequent thermal regulation zone. In certain embodiments, the maximum linear distance between any two points on the article travel path through the liquid contact zone 14 can be not more than about 500, not more than about 450, not more than about 400, not more than about 350, not more than about 300, not more than about 250, not more than about 200, not more than about 150, not more than about 100, or not more than about 50 feet.

As a result, the RF heating systems of the present invention may be configured to have a relatively small footprint such that, in certain embodiments, the entire liquid contact zone 14 of the RF heating system may be capable of fitting into a single cuboid having a total volume of not more than about 400,000, not more than about 350,000, not more than about 300,000, not more than about 250,000, not more than about 200,000, not more than about 150,000, not more than about 100,000, not more than about 75,000, or not more than about 50,000 cubic feet.

At the same time, the RF heating systems as described herein may be configured to achieve an overall production rate of at least about 2, at least about 5, at least about 10, at least about 15, at least about 20, at least about 25, at least about 30, at least about 35, at least about 40, at least about 45, at least about 50 articles per minute (articles/min) and/or not more than about 500, not more than about 450, not more than about 400, not more than about 350, not more than about 300, not more than about 250, not more than about 200 articles/min. In other embodiments, the mass convey rate of the food (or other edible substance) passing through the RF heating system can be at least about 1, at least about 5, at least about 10, at least about 15, at least about 20, or at least about 25 pounds of food (or other edible substance) per minute (lb/min) and/or not more than about 500, not more than about 450, not more than about 400, not more than about 350, not more than about 300, not more than about 250, not more than about 200, not more than about 150 lb/min.

Turning back to FIGS. 1-3, the articles may be initially introduced into a loading zone 12. The loading zone 12 may include any suitable device or system capable initially contacting one or more articles with a liquid medium. This contacting may include, for example, spraying the articles with or at least partially submerging the articles in the liquid medium. In certain embodiments, the articles introduced into the loading zone 12 may have an average temperature, measured at the geometric center of each article, of at least about 5, at least about 10, at least about 15, at least about 20, at least about 25, or at least about 30° C. and/or not more than about 70, not more than about 60, not more than about 50, not more than about 40, or not more than about 30° C. As used herein, the "geometric center" of an article is the common point of intersection of planes passing through the midpoints of the article's length, width, and height. The loading zone may be operated at approximately ambient temperature and/or pressure.

As shown in FIGS. 1-3, the articles may then be passed from a loading zone 12 into the initial thermal regulation zone 16 of the liquid contact zone 14. When introduced into the initial thermal regulation zone 16, the average temperature at the geometric center of the articles can be at least about 5, at least about 10, at least about 15, at least about 20, at least about 25, or at least about 30° C. and/or not more than about 90, not more than about 80, not more than about 70, not more than about 60, not more than about 50, or not more than about 40° C. For pasteurization systems, the temperature at the geometric center of the articles introduced into initial thermal regulation zone 16 may be in the range of from about 5° C. to about 70° C. or about 25° C. to about 40° C., while it may be in the range of from about 15° C. to about 90° C. or about 30° C. to about 60° C. for sterilization systems.

In certain embodiments, the initial thermal regulation zone 16 may be configured to increase the temperature of each article, measured at its geometric center, by at least about 1, at least about 5, at least about 10, at least about 15, or at least about 20° C. and/or not more than about 60, not more than about 55, not more than about 50, not more than about 45, not more than about 40, not more than about 35, or not more than about 30° C., or it can be increased by an amount in the range of from about 1° C. to about 60° C. or about 10° C. to about 30° C. In certain embodiments, the average temperature at the geometric center of the articles exiting the initial thermal regulation zone 16 may be at least about 25, at least about 30, at least about 35, at least about 40, at least about 45, at least about 50, at least about 55, or at least about 60° C. and/or not more than about 90, not more than about 85, not more than about 80, not more than about 75, not more than about 70, or not more than about 65° C. During pasteurization, the average temperature at the geometric center of the articles exiting the initial thermal regulation zone 16 can be in the range of from about 25° C. to about 90° C. or about 40° C. to about 70° C., while it may be in the range of from about 40° C. to about 90° C., or about 60° C. to about 80° C. during sterilization.

Additionally, the initial thermal regulation zone 16 may be configured to regulate the temperature of the articles passing therethrough to promote temperature uniformity amongst the articles. For example, in certain embodiments, the temperature of the articles may be regulated within the initial thermal regulation zone 16 so that the average value of the difference between the maximum temperature (i.e., hottest portion) and the minimum temperature (i.e., coldest portion) of each article exiting the initial thermal regulation zone 16 can be not more than about 20, not more than about 15, not more than about 10, more than about 5, not more than about 4, not more than about 2.5, not more than about 2, not more than about 1.5, not more than about 1, or not more than about 0.5° C. Similar differences can be achieved between the average of the temperatures of adjacent articles removed from the initial temperature regulation zone 16, measured at the geometric center of each article.

In certain embodiments, the articles can have an average residence time in the initial thermal regulation zone 16 of at least about 10, at least about 15, at least about 20, or at least about 25 minutes and/or not more than about 70, not more than about 65, not more than about 60, not more than about 55, not more than about 50, not more than about 45, or not more than about 40 minutes, or it can be in the range of from about 10 to about 70 minutes, or about 25 to about 40 minutes. This can correspond to, for example, at least about 10, at least about 15, at least about 20, at least about 25, or at least about 30 percent and/or not more than about 75, not more than about 70, not more than about 65, not more than about 60, not more than about 55, not more than about 50, not more than about 45 percent of the total residence time of the article within the entire liquid contact zone 14.

In certain embodiments, at least about 15, at least about 20, at least about 25, or at least about 30 percent and/or not more than about 75, not more than about 70, not more than about 65, not more than about 60, not more than about 55, or not more than about 50 percent of the total travel path along which the articles are transported through the RF heating system may be defined within the initial thermal regulation zone 16. In some cases, the travel path of the articles through the initial thermal regulation zone 16 can correspond to 15 percent to 75 percent or 30 percent to 55 percent of the total travel path of the articles through the entire RF heating system.

As shown in FIGS. 2 and 3, whether the RF heating system is configured for pasteurization or sterilization, the initial thermal regulation zone 16 may include a thermal equilibration zone 24 followed by an optional pressure lock 26. The thermal equilibration zone 24 may be configured to increase the temperature of the articles passing therethrough in order to promote temperature uniformity within each article and amongst the articles passing therethrough, as described previously. In certain embodiments, articles passing through the thermal equilibration zone 24 may be contacted with a liquid during at least a portion of the thermal equilibration step. The liquid may comprise or be water and can have a temperature within about 25, within about 20, within about 15, or within about 10° C. of the average temperature at the geometric center of the articles introduced into the thermal equilibration zone 24.

The contacting may be performed by any suitable method including, but not limited to, by spraying the articles with and/or by submerging, or partially submerging, the articles in the liquid medium. In some embodiments, the thermal equilibration zone 24 may further include one or more liquid jets for discharging streams of pressurized liquid toward the articles. Such pressurization may increase the Reynolds number of the liquid surrounding the article, thereby enhancing heat transfer. When present, the liquid jets may be positioned along one or more walls of the vessel in which the thermal equilibration step is performed and may be used whether or not the articles are additionally submerged in a liquid medium.

The articles may be passed through the thermal equilibration zone 24 via a conveyance system. Examples of suitable types of conveyance systems can include, but are not limited to, plastic or rubber belt conveyors, chain conveyors, roller conveyors, flexible or multi-flexing conveyors, wire mesh conveyors, bucket conveyors, pneumatic conveyors, trough conveyors, vibrating conveyors, and combinations thereof. The conveyance system may include a single convey line, or two or more convey lines arranged within the vessel or vessels defining the thermal equilibration zone.

In certain embodiments, the thermal equilibration zone 24 may include at least one helical conveyor. One example of a helical conveyor suitable for use in the thermal equilibration zone 24 of an RF heating system configured according to embodiments of the present invention is shown in FIGS. 7 through 10.

Turning now to FIGS. 7 through 10, a helical conveyor 260 configured according to embodiments of the present invention is shown. Helical conveyor 260 includes a track 262 configured to guide articles 100 along a convey pathway. At least a portion of the track 262 (FIGS. 7 and 8) forms a substantially helical path 248 (FIG. 10) that extends around a substantially vertical central axis 263. The helical path formed by the track 262 shown in FIGS. 7 and 8 includes a plurality of vertically-spaced tiers 264 spaced apart from one another in a direction parallel to the vertical central axis 263. In total, the portion of the track 262 forming the helical pathway 248 can include at least 3, at least 5, at least 8, at least 10, at least 12, at least 15, or 20 or more vertically-spaced tiers 264 and/or not more than 100, not more than 75, not more than 50, not more than 40, not more than 35, not more than 30, not more than 25, or not more than 18 vertically-spaced tiers 264.

Figure 8:
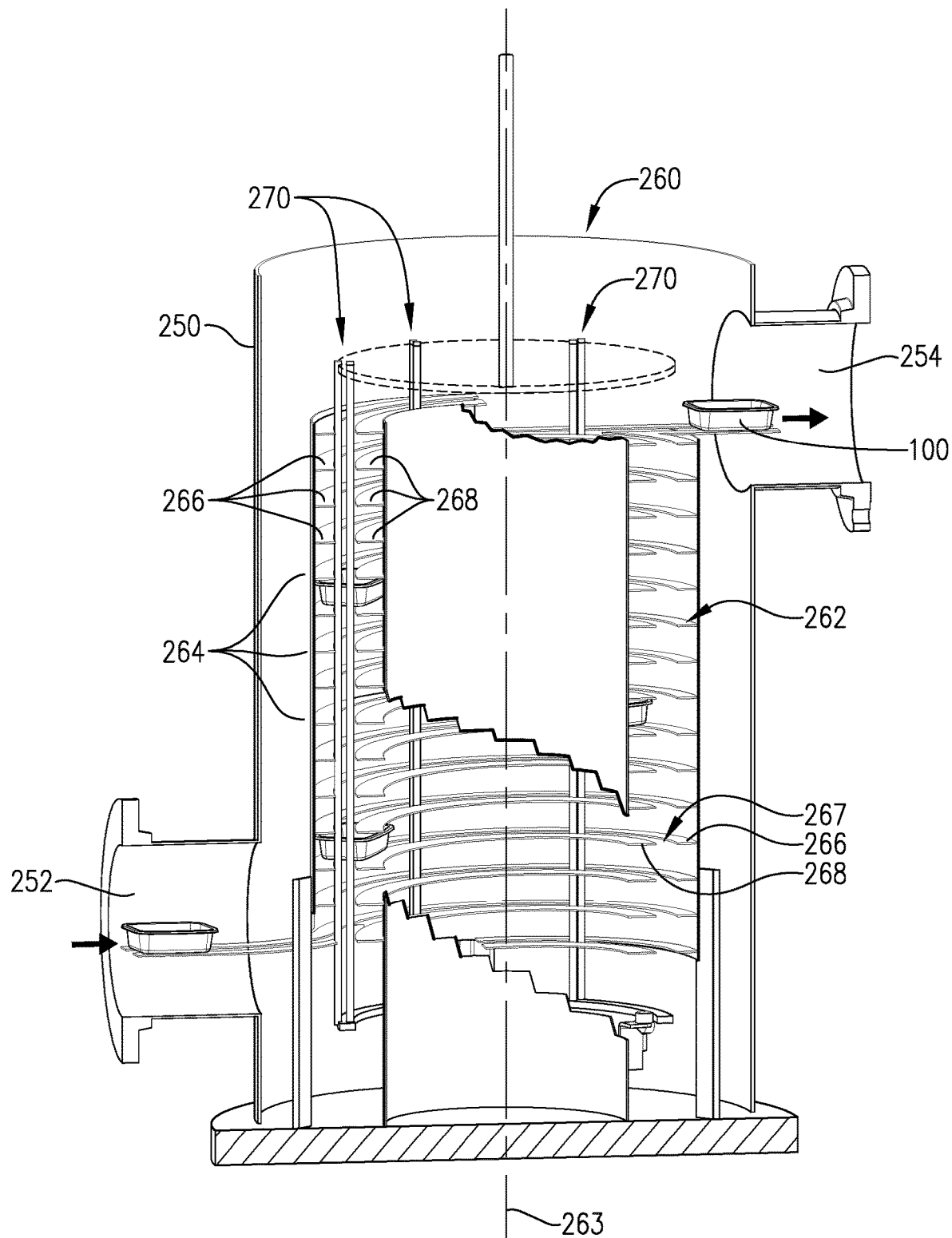
FIG. 8 is a partial cutaway view of a helical conveyor disposed in a vessel and suitable for use in one or more zones of the RF heating system according to embodiments of the present invention, particularly illustrating the helical travel path of the articles.
Figure 9:
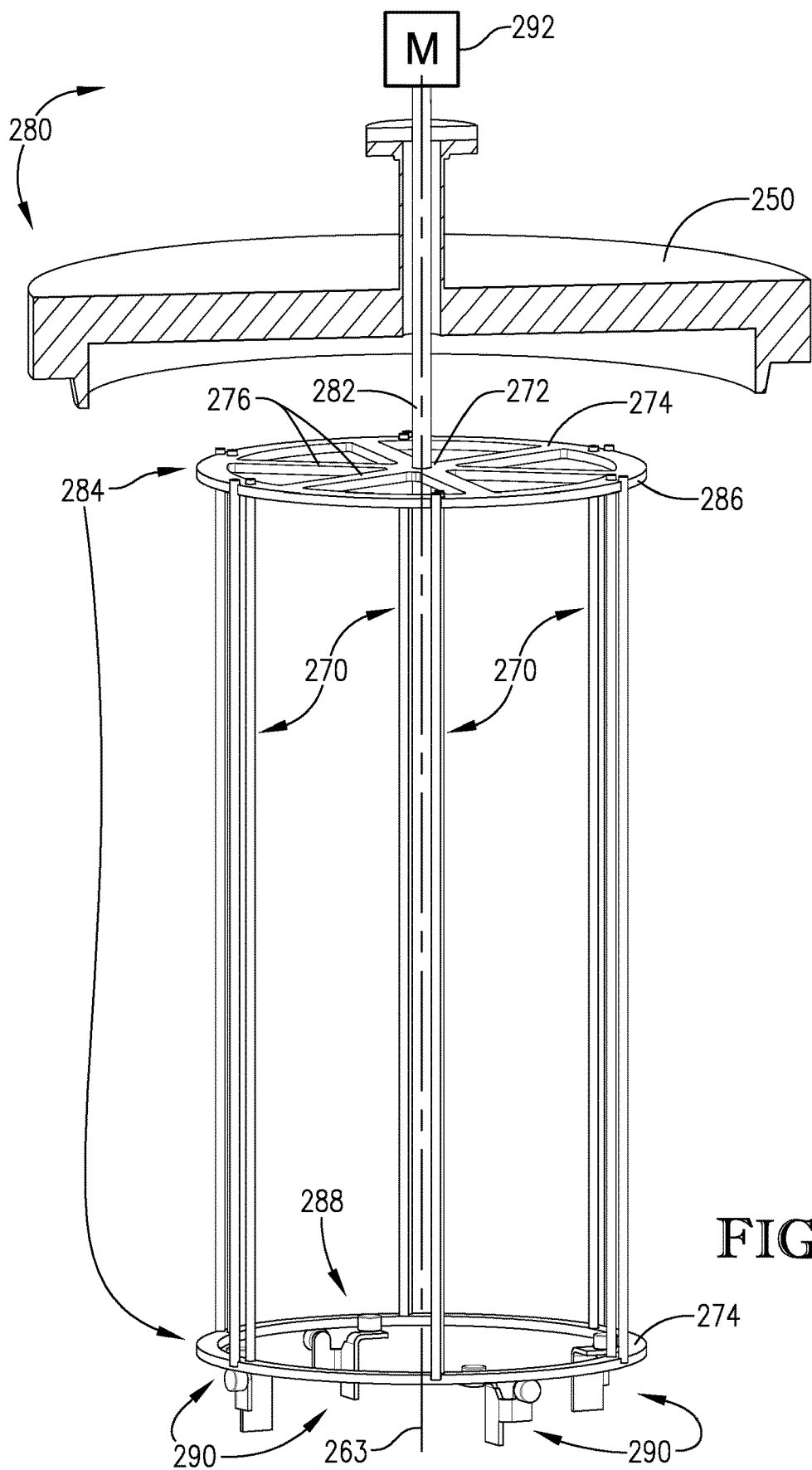
FIG. 9 is a partial perspective view of several components of a helical conveyor according to various embodiments of the present invention, particularly illustrating components of an article-pushing assembly.

As shown in FIGS. 8 and 9, the helical conveyor 260 can have a plurality of article pusher members 270 for contacting the articles 100 so that each article 100 can be moved along the portion of the track 262 that defines the helical path. In some embodiments, one or more of the article pusher members 270 may be configured to rotate relative to the track 262, while, in other embodiments, at least a portion of the track 262 may be configured to rotate relative to the article pusher members 270 on the central vertical axis 263 of the conveyor 260.

Figure 7:
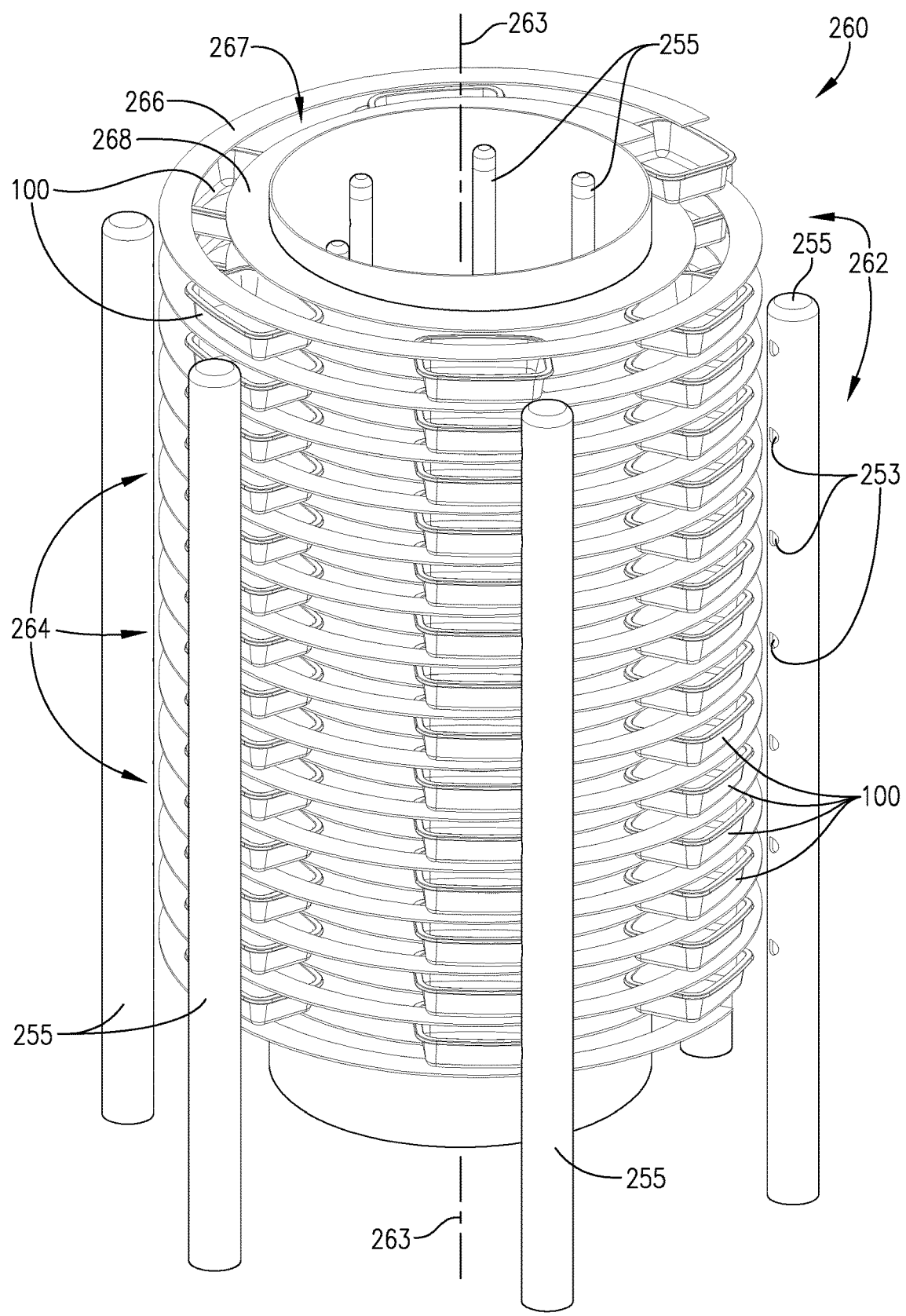
FIG. 7 is a partial perspective view of a helical conveyor suitable for use in one or more zones of the RF heating system according to various embodiments of the present invention, particularly showing the article track and liquid spray nozzles.

As particularly shown in FIGS. 7 and 8, the portion of the track 262 that forms the helical pathway may comprise an outer section 266 and an inner section 268 spaced inwardly toward the central vertical axis 263 from the outer section 266. In certain cases, a gap 267 can be formed between the outer section 266 and inner section 268 and the gap 267 may extend along a portion, or substantially all, of the helical path. In certain embodiments, the article pusher members 270 can extend through at least a portion of the gap 267 formed between the outer section 266 and inner section 268 of the track 262. Each article pusher member 270 may include at least one vertical rod and, in some cases, may include a pair of vertical rods spaced radially spaced apart from one another, as shown in FIG. 8. As shown in FIGS. 8 and 9, each of the article pusher members 270 extends to a plurality of the vertically-spaced tiers 264 and can be configured to simultaneously contact two or more articles 100 located on different tiers 264 of the track 262. Thus, two or more articles 100 located on different vertical tiers may be contacted with a common article pusher member 270.

When the article pusher members 270 are configured to move relative to the track, the helical conveyor 260 may further comprise an article pushing assembly 280, as particularly shown in FIG. 8. The article pushing assembly 280 may include a central drive shaft 282, the article pusher members 270, and a plurality of connectors 284 for connecting the article pusher members 270 to the central drive shaft 282. In certain embodiments, the connectors 284 may include at least an upper connection wheel 286 and a lower connection wheel 288 as shown in FIG. 9. The upper connection wheel 286 and/or the lower connection wheel 288 may include a hub 272 coupled to the central drive shaft 282, a rim 274 coupled to the article pusher members 270, and a plurality of radially-extending spokes 276 connecting the hub 272 to the rim 274. As shown in FIG. 9, the upper portions of each of the article pusher members 270 may be coupled to the rim 274 of the upper connection wheel 286, while the lower portion of the article pusher members 270 may be coupled to the rim 274 of the lower connection wheel 288. In some embodiments, the connectors 284 may further include a plurality of rollers 290 for supporting the lower connection wheel 288 permitting the lower connection wheel 288 to rotate as the central drive shaft 282 rotates about the central vertical axis 263. As shown in the embodiment depicted in FIG. 9, when the central drive shaft 282 does not extend to the lower portion of the article pushing assembly 280, the lower connection wheel 288 may not include any spokes.

As also shown in FIG. 9, the helical conveyor 260 can include an actuator 292 coupled to the central drive shaft 282 and configured to cause the central drive shaft 282 to rotate on the central vertical axis 263. In some embodiments, the actuator 292 may be located within the vessel 250 that houses the helical conveyor 260, while, in other embodiments, actuator 292 may be positioned outside the vessel 250 as shown in FIG. 9.

In operation, the articles 100 may be pushed along the track 262 by intermittently rotating the article pushing assembly 280 using the actuator 292. As the actuator 292 causes the central drive shaft 282 to rotate, the central drive shaft 282 causes the upper connection wheel 286 and/or the lower connection wheel 288 to rotate, which also causes the article pusher members 270 to rotate relative to the track 262. As the article pusher members 270 move through the gap 267 between the outer section 266 and inner section 268 of the track 262, the article pusher members 270 contact one or more articles 100 on the same and/or a different vertical tier and push the articles 100 along the helical path defined by the track 262.

In certain embodiments, the movement of the article pushing assembly 280 can be constant. In other embodiments, the movement of the article pushing assembly 280 may be intermittent, so that, for example, the articles 100 are passed along the track 262 in an intermittent manner. In such a way, the residence time of the articles 100 may be modified by, for example, adjusting the magnitude of the intermittent movement of the article pushing assembly 280. In certain embodiments, the magnitude of the intermittent movement of the article pushing assembly 280 can be measured by the angular magnitude of the intermittent rotation. By increasing (or decreasing) the magnitude of the angular rotation of the article pushing assembly 280 without changing the rate at which the articles 100 are loaded onto or unloaded from the track 262 (e.g., the loading or unloading rates), the residence time of the articles 100 along the helical path can be adjusted in indirect proportion to the change in the magnitude of angular rotation. That is, larger changes in the angular magnitude of intermittent rotation results in shorter residence times, and vice versa. Additional details relating specific methods of adjusting the residence time of articles on an intermittent conveyor (including a helical conveyor) are discussed below.

Figure 10:
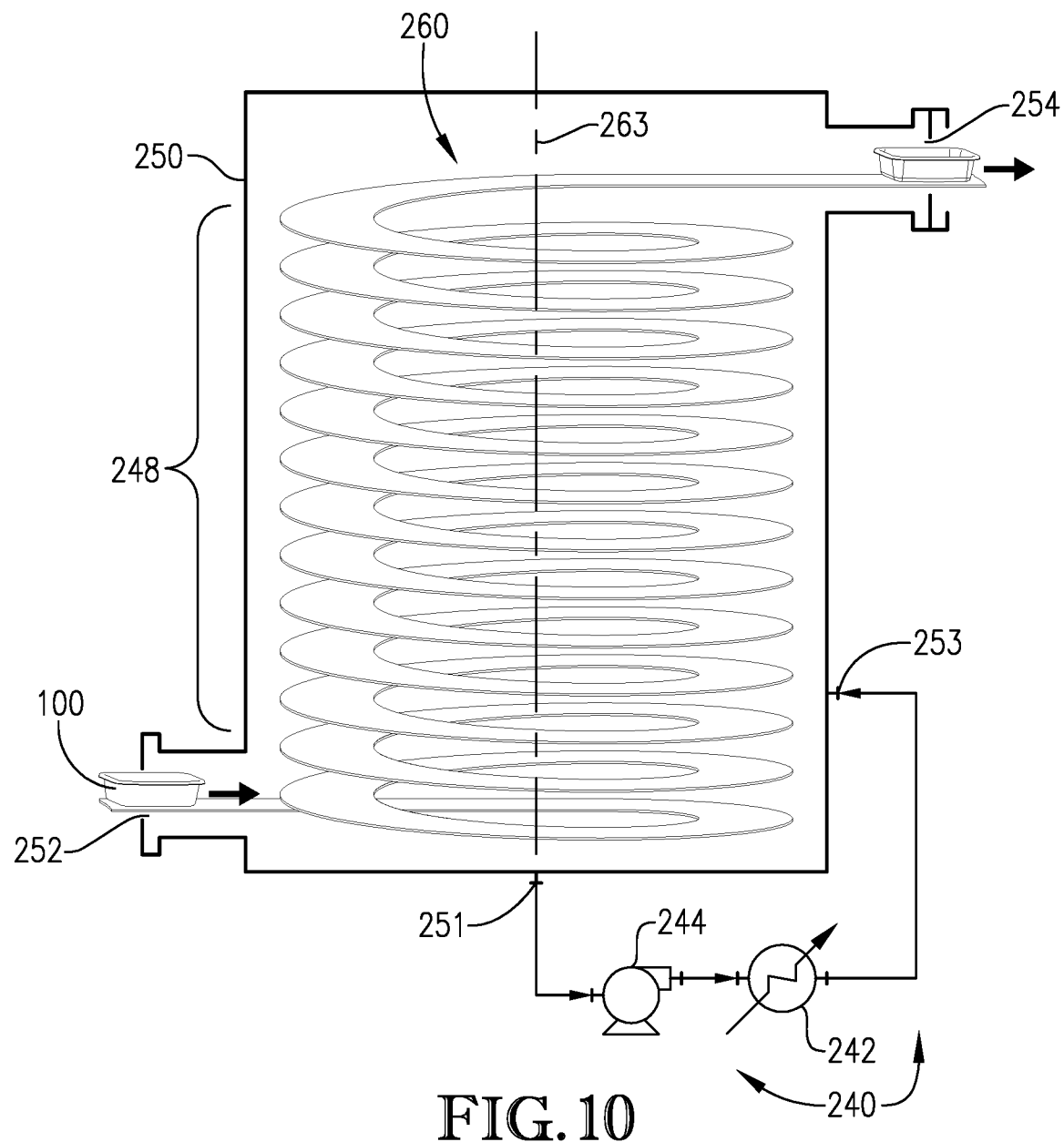
FIG. 10 is a partial schematic view of a processing zone employing a helical conveyor according to various embodiments of the present invention, particularly illustrating elements of a liquid heat transfer system for adjusting the temperature of the articles moving along the helical conveyor.

As particular shown in FIGS. 8 and 10, the helical conveyor 260 may be received inside a pressure vessel 250 having an inlet 252 configured to receive articles 100 into the vessel 250 and an outlet 254 for discharging the articles 100 from the vessel 250. The helical conveyor 260 shown in FIG. 10 is depicted schematically and primarily illustrates the helical path 248 along which the articles 100 travel when being passed along the track of the helical conveyor. As shown in FIG. 10, the helical conveyor 260 may be operable to transport the articles 100 away from the inlet 252 toward the outlet 254 of the vessel 250 along the helical path 248. Although shown as being configured to transport articles 100 upwardly from a lower inlet 252 to an upper outlet 254, the conveyor 260 may be configured to transport articles 100 downwardly from an upper inlet to a lower outlet, or the inlet and outlet may be at approximately the same vertical elevation if, for example, two helical conveyors are arranged in series in a single vessel.

As the articles 100 pass along the helical path 248 of the helical conveyor 260, at least a portion of the articles 100 may be contacted with a liquid medium. The step of contacting the articles 100 with a liquid medium may include submerging the articles 100 in a liquid medium and/or spraying the liquid medium onto the articles 100. The liquid medium may act as a liquid heat transfer medium for facilitating heating or cooling of the article 100. When the helical conveyor 260 is utilized in the thermal equilibration zone 24, the liquid heat transfer medium may be warmed liquid for increasing the temperature of the articles 100 being contacted. In other embodiments, one or more of the hold zone 30, high-pressure cooling zone 32, and low-pressure cooling zone 34 may also include at least one helical conveyor and the liquid medium, when present, in each of those zones may be heated or cooled in order to facilitate the desired transfer of heat to or from the article 100.

The thermal equilibration zone 24 (or any of the hold zone 30, high-pressure cooling zone 32, or low-pressure cooling zone 34 that include a helical conveyor) can further include a liquid heat transfer system for adjusting the temperature of the articles 100 in the vessel by contact with a liquid heat transfer medium. As particularly shown in FIG. 10, the heat transfer system 240 includes a thermal regulator 242 to adjust the temperature of the heat transfer medium introduced into the vessel 250 and a circulation pump 244 for pumping the heat transfer liquid from a liquid outlet 251 of the vessel 250, through the thermal regulator 242, and back into the vessel 250 via a liquid inlet 253. In certain embodiments, the liquid inlet 253 can be a single inlet for discharging liquid into a pool of liquid in which the articles 100 are submerged, as generally shown in FIG. 10. In other embodiments, the liquid inlet can comprise a plurality of spray nozzles 253 for discharging streams of pressurized heat transfer medium toward the articles 100 moving along the helical path. In some cases, a plurality of spray nozzles 253 may be spaced apart from one another along one or more vertically-elongated manifolds 255 disposed proximate the outer section 266 and/or inner section 268 of the track 262 of the helical conveyor 260. One example of a possible orientation of such manifolds 255 is shown in FIG. 7.

The specific type of thermal regulator 242 used in the liquid heat transfer system 240 may depend on whether the liquid heat transfer medium is used to heat or cool the articles 100. In some embodiments, the thermal regulator 242 can be a heater configured to increase the temperature of the heat transfer medium withdrawn from the vessel 250 via the liquid outlet 251 prior to its reintroduction into the vessel via a liquid inlet 253. In other embodiments, the thermal regulator 242 can be a cooler configured to reduce the temperature of the heat transfer medium flowing from the liquid outlet 251 of the vessel 250 into the liquid inlet 253. In certain embodiments, the liquid heat transfer system 240 may include both a heater and a cooler. Any suitable type of heat exchanger may be used as a thermal regulator 242 including, but not limited to, a shell-and-tube heat exchangers, plate heat exchangers, plate and shell heat exchangers, plate fin heat exchangers, and combinations thereof.

Turning back to FIGS. 2 and 3, the articles exiting the thermal equilibration zone 24 can have an average temperature, measured at the geometric center of the articles, of at least about 25, at least about 30, at least about 35, at least about 40, at least about 45, at least about 50, at least about 55, or at least about 60° C. and/or not more than about 90, not more than about 85, not more than about 80, not more than about 75, not more than about 70, or not more than about 65° C. When the articles are being pasteurized, the average temperature at the geometric center of the articles exiting the thermal equilibration zone 24 can be in the range of from about 25° C. to about 90° C. or about 40° C. to about 70° C., while it may be in the range of from about 40° C. to about 90° C., or about 60° C. to about 80° C. when the articles are being sterilized. The heated articles may also have a substantially uniform temperature such that, for example, the temperature at the geometric center of adjacent articles exiting the thermal equilibration zone 24 can be within about 10, within about 8, within about 6, within about 4, within about 2, within about 1.5, within about 1, or within about 0.5° C. of one another.

As shown in FIGS. 2 and 3, after exiting the thermal equilibration zone 24 of the initial thermal regulation zone 16, the articles may then be passed through a pressure lock 26a before entering the RF heating zone 18. In general, a pressure lock can be any device suitable for transitioning the articles between two environments having different pressures. Pressure locks may transition the articles from a higher-pressure environment to a lower-pressure environment or from a lower-pressure environment to a higher-pressure environment. In certain embodiments, pressure lock 26a may be configured to transition the articles from the lower-pressure thermal equilibration zone 24 to the higher-pressure RF heating zone 18. In certain embodiments, the RF heating zone 18 can have a pressure that is at least about 2, at least about 5, at least about 10, or at least about 15 psig and/or not more than about 50, not more than about 40, not more than about 30, not more than about 20, or not more than about 10 psig higher than the pressure in the thermal equilibration zone 24.

Figure 11:
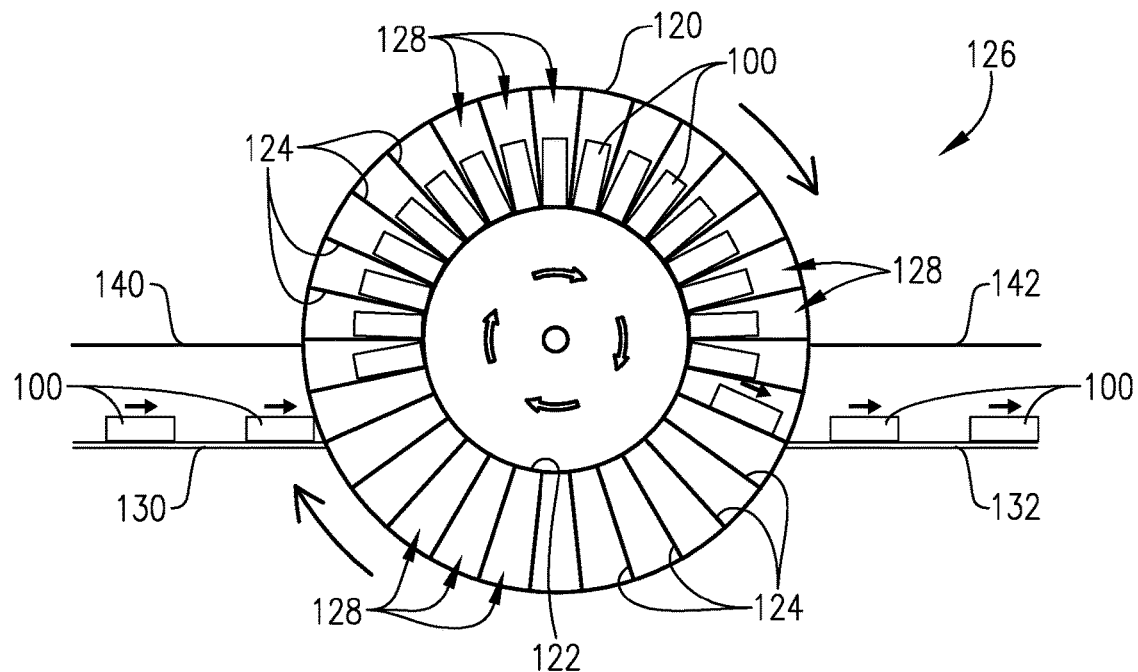
FIG. 11 is a schematic side view of a pressure lock suitable for use in transitioning articles between environments having different pressures according to various embodiments of the present invention, particularly illustrating a wheel-type pressure lock.

Turning now to FIG. 11, one embodiment of a pressure lock 126 suitable for use in RF heating systems of the present invention is shown. As depicted in FIG. 11, the pressure lock 126 includes an outer cylinder 120, an inner cylinder 122, and a plurality of dividers 124 extending between the inner cylinder 122 and the outer cylinder 120. The dividers 124 define a plurality of article-receiving spaces 128, into which one or more articles 100 may be placed. As shown in FIG. 11, one or more articles 100 may be loaded from an entrance convey line 130 into an article receiving space 128 of the pressure lock 126. Once the article 100 is loaded into the article-receiving space 128, the inner and outer cylinders 120, 122 of the pressure lock 126 rotate, as shown by the arrows in FIG. 11, so that the previously-loaded article-receiving space 128 moves away from the entrance convey line 130 located in a first pressure vessel 140 and toward an exit convey line 132 located in a second pressure vessel 142 having a different pressure than the first pressure vessel 140. This permits another article 100 to be loaded into the adjacent open article-receiving space 128, after which the pressure lock 126 again rotates to move the articles 100 away from the entrance convey line 130 and toward the exit convey line 132. Once the article 100 in the article receiving space 128 reaches the exit convey line 132, it may be unloaded from the pressure lock 126 onto exit convey line 132 and passed to the next processing zone (not shown).

Figure 12:
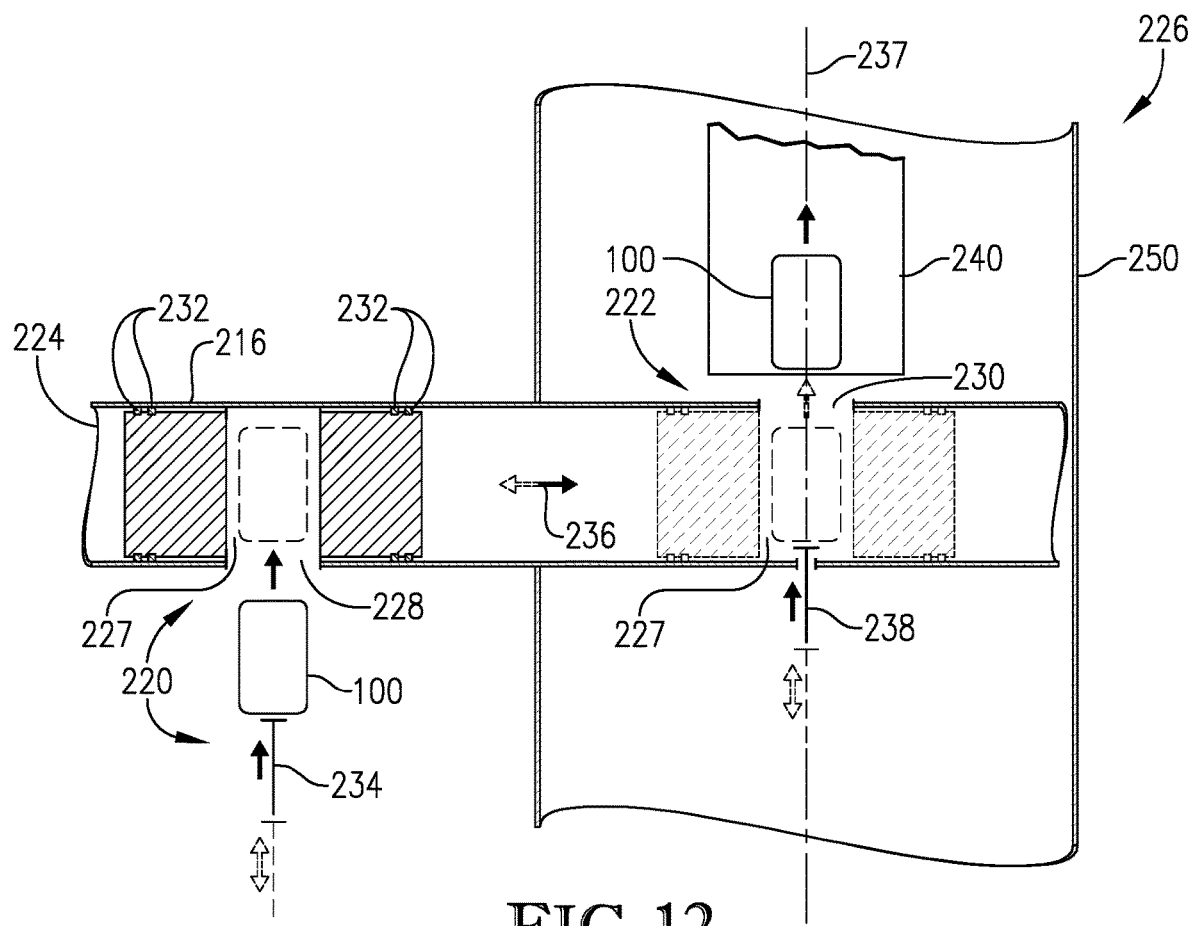
FIG. 12 is a top cutaway view of a pressure lock suitable for use in transitioning articles between environments having different pressures according to various embodiments of the present invention, particularly illustrating a cylinder-type pressure lock.

Another embodiment of a pressure lock 226 suitable for use in RF systems of the present invention is shown in FIG. 12. The pressure lock 226 shown in FIG. 12 includes a loading area 220, an unloading area 222, and a transfer chamber 224 that extends between the loading area 220 and the unloading area 222. A movable transport cylinder 216 is disposed in the transport chamber 224. The transport cylinder 216 includes an opening 227 extending therethrough and configured to receive at least one article 100 from the loading area 220 and transport it to the unloading area 222. The opening 227 in the transport cylinder 216 includes an inlet 228 and an outlet 230. A plurality of sealing rings 232 can be coupled to outside of the transport cylinder 216 for fluidly isolating one side of the transport cylinder 216 from the other side, which permits the articles 100 to be transported in the opening 227 of the transport cylinder 216 from the lower-pressure loading zone 220 to the higher-pressure unloading zone 222. In certain embodiments, the unloading zone 222 may be disposed within a pressure vessel, while the loading zone 220 may be located outside the pressure vessel 250.

In operation, one or more articles 100 may be loaded into the inlet 228 of the transport cylinder 216 using a loading device, such as a pusher arm 234 shown in FIG. 12. Once loaded into the transport cylinder 216, the article or articles 100 may be transported, while in the opening 227 of the transport cylinder 216, from the loading area 220 to the unloading area 222 along a travel path 236 that can be substantially perpendicular to the direction of extension 237 of the vessel into which the articles 100 are introduced. Once in unloading zone 222, an unloading device, shown as pusher arm 238, may be used to unload the articles 100 via the outlet 230 of the transport cylinder 216 and onto another convey line 240. Convey line 240 may subsequently pass the articles 100 onto the next downline processing zone (not shown in FIG. 12).

Although shown in FIG. 12 as having a single transport chamber 224, pressure lock 226 may also include one or more additional transport chambers located on the same or opposite sides of the vessel. In some embodiments, the pressure lock 226 may further include another loading zone similar to the loading zone 220 shown in FIG. 12, but located on the opposite side of the vessel 250. In such cases, the transport cylinder 216 could be alternately movable between the two lower-pressure loading zones and the higher-pressure unloading zone in a similar manner as described above. Additionally, in some embodiments, each cylinder 216 could have more than one article-receiving opening 227 configured to receive at least one article 100 from the loading area 220 and transport it to the unloading area 222.

Referring again to FIGS. 2 and 3, articles exiting the pressure lock 26a may be introduced into the RF heating zone 18 defined within an RF applicator (not shown in FIG. 2 or 3). In RF heating zone 18, the articles may be rapidly heated via exposure to RF energy. As used herein, the term "RF energy" or "radio frequency energy" refers to electromagnetic energy having a frequency of greater than 300 kHz and less than 300 MHz. In certain embodiments, the RF heating zone 18 can utilize RF energy having a frequency of at least about 500 kHz, at least about 1 MHz, at least about 5 MHz, at least about 10 MHz, at least about 20 MHz, at least about 30 MHz, at least about 40 MHz, or at least about 50 MHz. Additionally, or in the alternative, the RF heating zone 18 may utilize RF energy having a frequency of not more than about 250 MHz, not more than about 200 MHz, or not more than about 150 MHz. The frequency of the RF energy utilized in the RF heating zone 18 can be in the range of from 50 to 150 MHz.

In addition to RF energy, the RF heating zone 18 may optionally utilize one or more other types of heat sources such as, for example, conductive or convective heat sources, or other conventional heating methods or devices. However, at least about 35, at least about 45, at least about 55, at least about 65, at least about 75, at least about 85, at least about 95 percent, or substantially all, of the energy used to heat the articles within the RF heating zone 18 can be derived from an RF energy source. In some embodiments, not more than about 50, not more than about 40, not more than about 30, not more than about 20, not more than about 10, or not more than about 5 percent or substantially none of the energy used to heat the articles in the RF heating zone 18 may be provided by other heat sources, including non-RF electromagnetic radiation having a frequency greater than 300 MHz.

The articles passing through the RF heating zone 18 may be at least partially submerged in a liquid medium while being heated with RF energy during at least a portion of the heating step. In some embodiments, the liquid medium may be the same liquid medium in which the articles were submerged while passing through the initial thermal regulation zone 16. The RF heating zone 18 may be at least partially defined within a pressurized vessel so that the RF heating zone 18 is maintained at a pressure of at least about 2, at least about 5, at least about 10, or at least about 15 psig and/or not more than about 80, not more than about 75, not more than about 70, not more than about 65, not more than about 60, not more than about 55, not more than about 50, not more than about 45, not more than about 40, not more than about 35, not more than about 30, not more than about 25, not more than about 20 psig during the heating step. When the articles passing through the RF heating zone 18 are being pasteurized, the pressure in the RF heating zone 18 may be in the range of from about 1 psig to about 40 psig or about 2 psig to about 20 psig. When the articles passing through the RF heating zone 18 are being sterilized, the pressure in the RF heating zone 18 may be in the range of from about 5 psig to about 80 psig, or about 15 psig to about 40 psig.

In certain embodiments, the RF heating zone 18 may be configured to heat the articles passing therethrough so that the temperature of the geometric center of the articles increases by at least about 10, at least about 15, at least about 20, at least about 25, at least about 30, at least about 35, at least about 40, or at least about 45° C. and/or not more than about 120, not more than about 110, not more than about 100, not more than about 90, not more than about 85, not more than about 80, not more than about 75, not more than about 70, not more than about 65, not more than about 60, not more than about 55, not more than about 50, not more than about 45, or not more than about 40° C. When the articles are being pasteurized, the RF heating zone 18 may be configured to increase the temperature of the geometric center of the articles by an amount in the range of from about 10° C. to about 60° C. or about 20° C. to about 40° C. When the articles are being sterilized, the RF heating zone may be configured to increase the temperature of the geometric center of the articles by an amount in the range of from about 20° C. to about 120° C. or about 35° C. to about 65° C.

The temperature at the geometric center of the articles introduced into the RF heating zone 18 can be at least about 25, at least about 30, at least about 35, at least about 40, at least about 45, at least about 50, at least about 55, or at least about 60° C. and/or not more than about 110, not more than about 105, not more than about 100, not more than about 95, not more than about 90, not more than about 85, not more than about 80, not more than about 75, not more than about 70° C. When the articles are being pasteurized, the temperature at the geometric center of the articles introduced into the RF heating zone 18 can be in the range of from about 25° C. to about 90° C. or about 40° C. to about 70° C., while articles being sterilized may have a temperature at the geometric center of the articles in the range of from about 40° C. to about 110° C. or about 60° C. to about 90° C. when entering the RF heating zone 18.

The articles introduced into the RF heating zone 18 may be heated to the desired temperature in a relatively short period of time. In some cases, this may help minimize damage or degradation of the foodstuff or other ingestible substance being heated. In certain embodiments, the articles passed through RF heating zone 18 may have an average residence time in the RF heating zone 18 (also called an RF heating period) of at least about 0.1, at least about 0.25, at least about 0.5, at least about 0.75, at least about 1, at least about 1.25, or at least about 1.5 minutes and/or not more than about 6, not more than about 5.5, not more than about 5, not more than about 4.5, not more than about 4, not more than about 3.5, not more than about 3, not more than about 2.5, not more than about 2, not more than about 1.5, or not more than about 1 minute. When the articles are being pasteurized, the average residence time of each article in the RF heating zone 18 may be in the range of from about 0.1 minutes to 3 minutes, or 0.5 minutes to 1.5 minutes. When the articles are being sterilized, each article may have an average residence time in the range of from about 0.5 minutes to about 6 minutes, or about 1.5 minutes to about 3 minutes.

Figure 13:
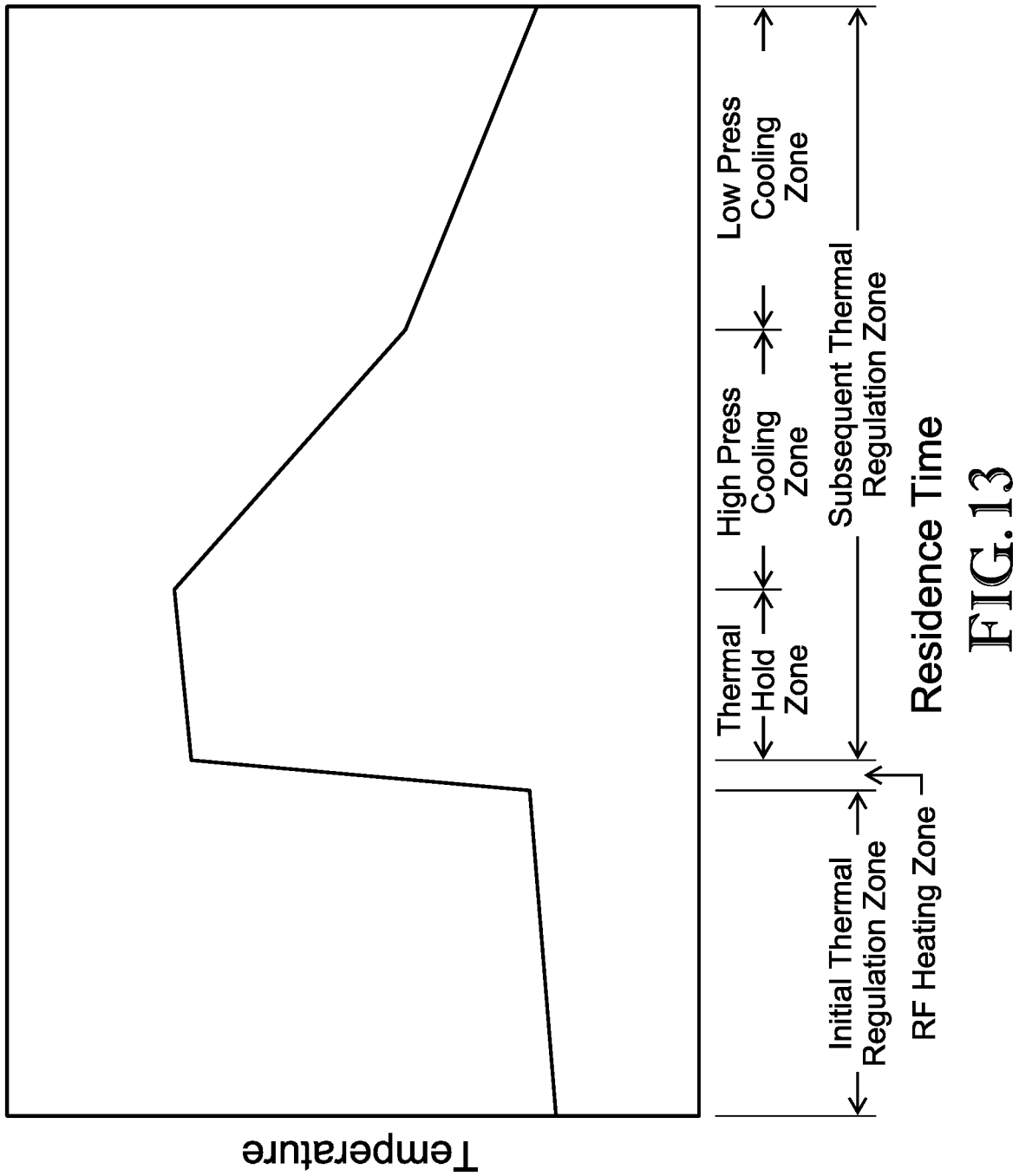
FIG. 13 is a graphical representation of the average temperature at the geometric center of articles being heated by an RF heating system configured according to embodiments of the present invention as a function of residence time particularly showing the relative residence time in each area of the liquid contact zone depicted in FIG. 3.

FIG. 13 provides a graphical depiction of the change in temperature at the geometric center of the articles as the articles are passed through each stage of the liquid contact zone as a function of residence time. As shown in FIG. 13, although the articles may pass through the RF heating zone 18 relatively quickly, the energy provided to the articles in the RF heating zone 18 is sufficient increase the temperature of the articles rapidly, thereby ensuring that pasteurization or sterilization occur with minimal degradation of the foodstuff or other ingestible substance. For example, in certain embodiments, the overall heating rate of the articles passing through the RF heating zone 18 can be at least about 5, at least about 10, at least about 15, or at least about 20° C./min and/or not more than about 90, not more than about 85, not more than about 80, not more than about 75, not more than about 70, not more than about 65, not more than about 60, not more than about 55, not more than about 50, not more than about 45, not more than about 40, not more than about 35, or not more than about 30° C./min, measured at the geometric center of the articles. In some embodiments, the overall heating rate measured at the geometric center of the articles passing through the RF heating zone 18 can be in the range of from about 5° C./min to about 80° C./min or about 10° C./min to about 30° C./min.

As shown by comparing the relative residence time of the articles in each of processing zones shown in FIG. 13, the residence time of the articles in the RF heating zone 18 is only a small percentage of the total residence time of the articles passing through liquid contact zone 14. For example, in some embodiments, the average residence time of the articles in the RF heating zone 18 can be not more than about 10, not more than about 8, not more than about 6, not more than about 5, or not more than about 4 percent of the average residence time of the articles in the liquid contact zone 14. Additionally, the average residence time of the articles in the RF heating zone 18 can be at least about 0.25, at least about 0.5, at least about 0.75, at least about 1, at least about 1.25, or at least about 1.5 percent of the average residence time of the articles in the liquid contact zone 14, or it can be in the range of from about 0.25 percent to about 10 percent or about 1.5 percent to about 4 percent of the average residence time of the articles in the liquid contact zone 14. In some cases, the length of the total travel path of the articles through the RF heating zone 18 can be not more than about 30, not more than about 25, not more than about 20, not more than about 15, not more than about 10, not more than about 5, or not more than about 3 feet.

As also shown in FIG. 13, the articles passing through liquid contact zone 14 may spend far less time in the RF heating zone 18 than in the initial thermal regulation zone 16. For example, in certain embodiments, the average residence time of the articles passing through the RF heating zone 18 can be not more than about 30, not more than about 25, not more than about 20, not more than about 15, not more than about 10, not more than about 6, or not more than about 5 percent of the average residence time of the articles passing through the initial thermal regulation zone 16. In some cases, the average residence time of the articles passing through the RF heating zone 18 can be at least about 0.50, at least about 1, at least about 1.5, at least about 2, at least about 2.5, at least about 3, at least about 3.5, at least about 4, at least about 4.5, or at least about 5 percent of the average residence time of the articles passing through the initial thermal regulation zone 16.

When the articles are being pasteurized, the average residence time of the articles passing through the RF heating zone 18 can be about 0.5 percent to about 20 percent or about 2 percent to about 6 percent of the average residence time of the articles passing through the initial thermal regulation zone 16. Alternatively, when the articles are being sterilized, the average residence time of the articles passing through the RF heating zone 18 can be about 1 percent to about 30 percent, or about 4 percent to about 10 percent of the average residence time of the articles passing through the initial thermal regulation zone 16.

Further, as also shown in FIG. 13, the average residence time of the articles in the RF heating zone 18 is significantly shorter than the residence time of the articles in any one portion of the subsequent thermal regulation zone 20, as well as the overall residence time of the articles in the subsequent thermal regulation zone 20. For example, in some embodiments, the average residence time of the articles passing through the RF heating zone 18 can be at least about 0.25, at least about 0.50, at least about 1, at least about 1.5, or at least about 2 percent and/or not more than about 20, not more than about 18, not more than about 15, not more than about 12, not more than about 10, not more than about 8, not more than about 6, not more than about 5, or not more than about 4 percent of the average overall residence time of the articles passing through the subsequent thermal regulation zone 20. When the articles are being pasteurized, the average residence time of the articles passing through the RF heating zone 18 can be about 0.25 percent to about 15 percent, or about 1 percent to about 4 percent of the overall average residence time of the articles passing through subsequent thermal regulation zone 20. When the articles are being sterilized, the average residence time of the articles passing through the RF heating zone 18 can be about 1 percent to about 20 percent, or about 2 percent to about 6 percent of the average residence time of the articles passing through the subsequent thermal regulation zone 20.

When the subsequent thermal regulation zone 20 includes a thermal hold zone 30 as shown in FIG. 3, the average residence time of the articles in the thermal hold zone 30 can be longer than the average residence time of the articles in the RF heating zone 18. For example, in certain embodiments, the average residence time of the articles in the RF heating zone 18 can be at least about 2, at least about 5, at least about 8, or at least about 10 percent and/or not more than about 50, not more than about 45, not more than about 40, not more than about 35, not more than about 30, or not more than about 25 percent of the average residence time of the articles in the thermal hold zone 30, which will be discussed in further detail below. When a hold zone 30 is present, the average residence time of the articles in the RF heating zone 18 can be in the range of from about 5 percent to about 50 percent, about 8 percent to about 45 percent, or about 10 percent to about 40 percent of the average residence time of the articles in the hold zone 30.

Despite having the shortest residence time of all processing steps in liquid contact zone 14, the RF heating zone may be configured to heat the articles passing therethrough in order to achieve the largest change in temperature, as compared to the other processing zones, as illustrated in FIG. 13. In some embodiments, the temperature at the geometric center of the articles exiting the RF heating zone 18 can be at least about 60, at least about 65, at least about 70, at least about 75, at least about 80, at least about 85, at least about 90, at least about 95, at least about 100, at least about 105, or at least about 110° C. and/or not more than about 135, not more than about 130, not more than about 125, not more than about 120, not more than about 115, not more than about 110, or not more than about 105° C. When being pasteurized, the temperature at the geometric center of the articles exiting the RF heating zone 18 can be in the range of from about 65° C. to about 115° C. or about 80° C. to about 105° C. When being sterilized, the temperature at the geometric center of articles exiting the RF heating zone 18 can be in the range of from about 95° C. to about 135° C., or about 110° C. to about 125° C.

In some cases, the average difference between the maximum temperature (hottest portion) and minimum temperature (coldest portion) within each of the articles exiting the RF heating zone 18 is not more than about 25, not more than about 20, not more than about 15, not more than about 10, not more than about 5, or not more than about 2° C. The average difference between the temperatures at the geometric centers of adjacent articles exiting the RF heating zone 18 can be not more than about 20, not more than about 15, not more than about 10, not more than about 5, not more than about 2, or not more than about 1° C. In certain embodiments, the articles withdrawn from the RF heating zone 18 can be uniformly heated so that, for example, the temperature of at least about 95, at least about 98, or at least about 99 percent of the total volume of the articles can be within an about 25, about 20, about 15, about 10, about 5, about 2.5, or about 2° C. temperature range.

Achievement of desirable temperatures in the RF heating zone 18 may be due, at least in part, to the configuration of the RF heating zone 18. In certain embodiments, the RF heating zone 18 can be configured to maximize the intensity and efficiency of the heating performed therein. For example, in certain embodiments, the RF heating zone 18 may be configured to maximize energy absorption by the foodstuff or other edible substance to achieve the desired level of sterilization or pasteurization while also minimizing thermal degradation. In certain embodiments, the articles heated in the RF heating zone 18 may absorb RF energy at an average lengthwise energy absorption rate of at least about $2 \times 10^5$ Joules per foot (J/ft). The average lengthwise energy absorption rate ($R_A$) for a given article is determined by the following formula:

$$R_A = \frac{(c_p m T_f - T_i)}{L_c},$$

where $c_p$ is the specific heat of the foodstuff or other substance contained in the package, m is the mass of the foodstuff, $T_f$ and $T_i$ are the final and initial temperatures of the foodstuff (or other edible substance) measured at its geometric center, and $L_c$ is the length of the RF heating zone 18. In some embodiments, the average lengthwise energy absorption rate for articles passing through the RF heating zone 18 can be at least about $1 \times 10^4$, at least about $2 \times 10^4$, at least about $5 \times 10^4$, at least about $8 \times 10^4$, at least about $1 \times 10^5$, at least about $2 \times 10^5$, at least about at least about $5 \times 10^5$, or at least about at least about $1 \times 10^6$ J/ft and/or not more than about $5 \times 10^6$, not more than about $2 \times 10^6$, not more than about $1 \times 10^6$, not more than about $8 \times 10^5$, not more than about $5 \times 10^5$, or not more than about $3 \times 10^5$ J/ft, or it can be in the range of from about $1 \times 10^4$ J/ft to about $1 \times 10^6$ J/ft or in the range of from about $1 \times 10^5$ J/ft to about $3 \times 10^5$ J/ft.

Additionally, in certain embodiments, the articles heated in RF heating zone 18 may have an average lengthwise center point heating rate of at least about 2° C./foot (° C./ft) and not more than about 100° C. per foot (° C./ft), measured at the geometric center of the article. The lengthwise center point heating rate ($R_{cp}$) is calculated according to the following formula:

$$R_{cp} = \frac{(T_{cpf} - T_{cpi})}{L_c},$$

where $T_{cpf}$ is the final temperature of the geometric center of the article at the outlet of the RF heating zone 18, $T_{cpi}$ is the initial temperature of the geometric center of the article at the inlet of the RF heating zone 18, and $L_c$ is the length of the RF heating zone 18. In some embodiments, the average lengthwise center point heating rate of articles heated in the RF heating zone 18 can be at least about 2, at least about 3, at least about 5, at least about 8, or at least about 10° C./ft and/or not more than about 100, not more than about 90, not more than about 80, not more than about 70, not more than about 60, not more than about 50, not more than about 40, or not more than about 30° C./ft, or it can be in the range of from about 2° C./ft to about 100° C./ft or about 10° C./ft to about 30° C./ft.

In certain embodiments, the articles heated in the RF heating zone 18 may be exposed to RF energy at an average lengthwise power intensity of at least about 3 kW per foot (kW/ft). The average lengthwise power intensity ($R_I$) for a given article is determined by the following formula:

$$R_I = \frac{P_C}{L_c},$$

where Pc is the total cumulative power (in kW) to which the articles have been exposed in the RF heating zone, and $L_c$ is the length of the RF heating zone 18 (in feet). In some embodiments, the average lengthwise power intensity for articles passing through the RF heating zone 18 can be at least about 1, at least about 1.5, at least about 2, at least about 3, at least about 4, at least about 5, at least about 8, or at least about 10 kW per foot (kW/ft) and/or not more than about 30, not more than about 25, not more than about 20, not more than about 15, not more than about 10, not more than about 8, or not more than about 5 kW/ft.

Turning now to FIGS. 14 through 18, several views of the RF heating section of the heating system of the present invention are shown. The RF heating section may include an RF generator 328, an RF energy transmission system 330, and an RF applicator 332, which can define the RF heating zone 318. RF energy from the RF generator 328 may be passed by the RF energy transmission system 330 to the RF applicator 332 and discharged into the RF heating zone 318, which is generally defined within the RF applicator 332. Once in the RF heating zone 318, the RF energy may be used to heat articles 100 passing therethrough along at least one convey line 370. In some embodiments, the RF heating section may further include a pressure vessel 350, in which the RF applicator 332 and the RF heating zone 318 may be disposed.

The RF generator 328 may be any device suitable for producing RF energy. In certain embodiments, the RF generator 328 can generate power in an amount of at least about 10, at least about 20, at least about 25, at least about 30, at least about 35 kW and/or not more than about 500, not more than about 250, not more than about 200, not more than about 150, not more than about 100, or not more than about 50 kW. RF heating systems of the present invention may use a single RF generator, or two or more RF generators to provide sufficient energy to the RF heating zone 318.

The RF applicator 332 defines RF heating zone 318 and can be configured to act as a resonant cavity for the RF energy. In certain embodiments, the RF applicator 332 may be a split applicator having an upper applicator section 360, a lower applicator section 362 spaced apart from the upper applicator section 360, and at least one opening 356 defined between the upper section 360 and the lower section 362. Embodiments of split RF applicators 332 are shown in FIGS. 17 and 18. In some embodiments, as shown in FIG. 17, the split RF applicator 332 may include a single opening 356, while, in other embodiments, as shown in FIG. 18, the split RF applicator 332 may include two openings 356a,b. When the RF applicator 332 includes at least one opening 356, at least one RF choke 364 may be located proximate to the opening 356 to inhibit, or prevent, RF energy from passing out of the opening 356. As shown in FIG. 18, when the split RF applicator 332 has two openings 356a,b, each opening 356a,b may include a choke 364a,b proximate to it for inhibiting or preventing RF energy from passing out of each respective opening 356a,b.

Figure 16:
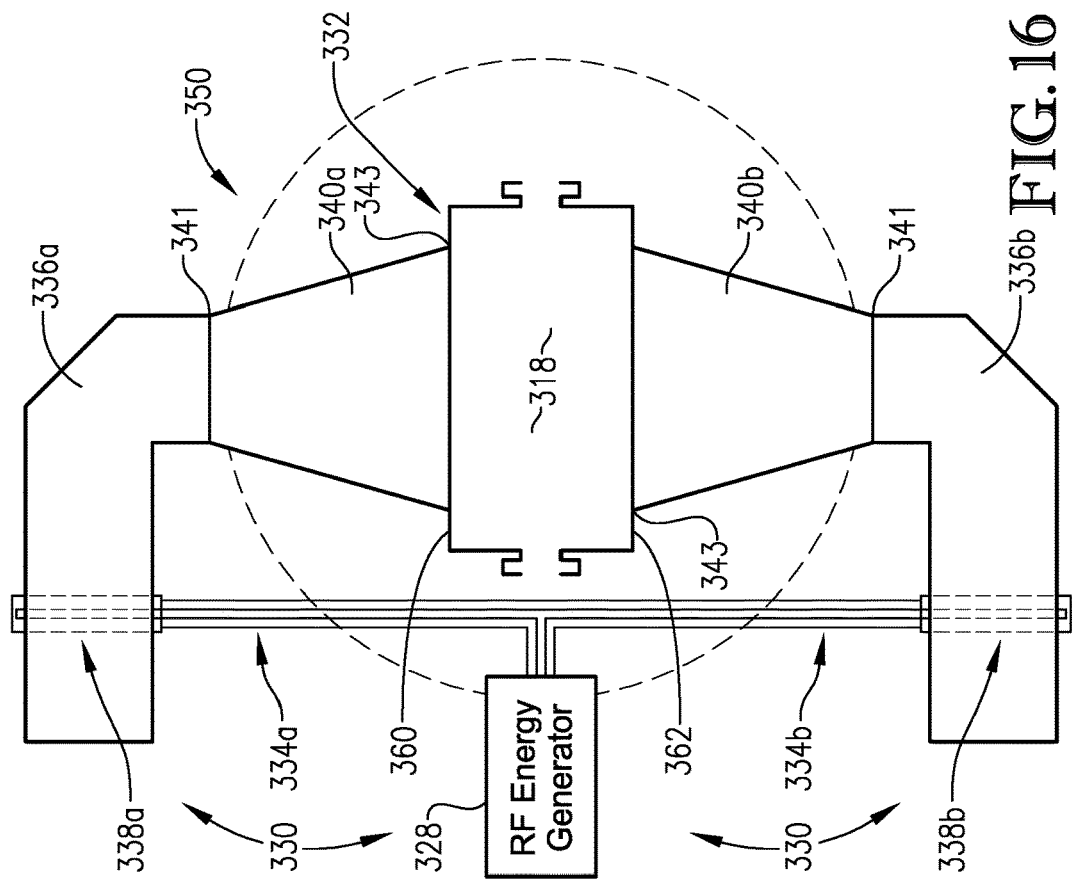
FIG. 16 is a schematic axial cross-section of an RF heating section particularly illustrating the RF energy transmission system for transmitting RF energy from the RF generator to the RF heating zone.

The RF energy transmission system 330 is configured to transport RF energy from the RF generator 328 and into the RF applicator 332 thereby creating the RF heating zone 18 in the RF applicator 332. Several components of an RF energy transmission system 330 configured according to embodiments of the present invention are shown in FIGS. 14-18. For example, as shown in FIGS. 15 and 16, the RF energy transmission system 330 may include at least one coaxial conductor 334, at least one waveguide 336, and at least one coax-to-waveguide transition 338. RF energy produced by the RF generator 328 may be transferred by the coaxial conductor 334 and into the waveguides 336, which are located outside the RF heating zone 18. The coax-to-waveguide transition 338 may be configured to transition the RF energy from the coaxial conductor 334 into the waveguide 336, which guides the RF energy into the RF applicator 332.

In certain embodiments, the waveguide 336 may be at least partially filled with a liquid medium, such as, for example, water. When the waveguide 336 is at least partially filled with a liquid medium, the dimensions of the waveguide may be much smaller than if the waveguide were filled with air. For example, in certain embodiments, the waveguide 336 can have a generally rectangular cross-section with the dimension of the widest waveguide wall being in the range of from about 5 inches to about 40 inches or about 12 inches to about 20 inches, and the dimension of the narrowest waveguide wall being in the range of from about 2 inches to about 20 inches, about 4 inches to about 12 inches, or about 6 inches to about 10 inches.

Figure 14:
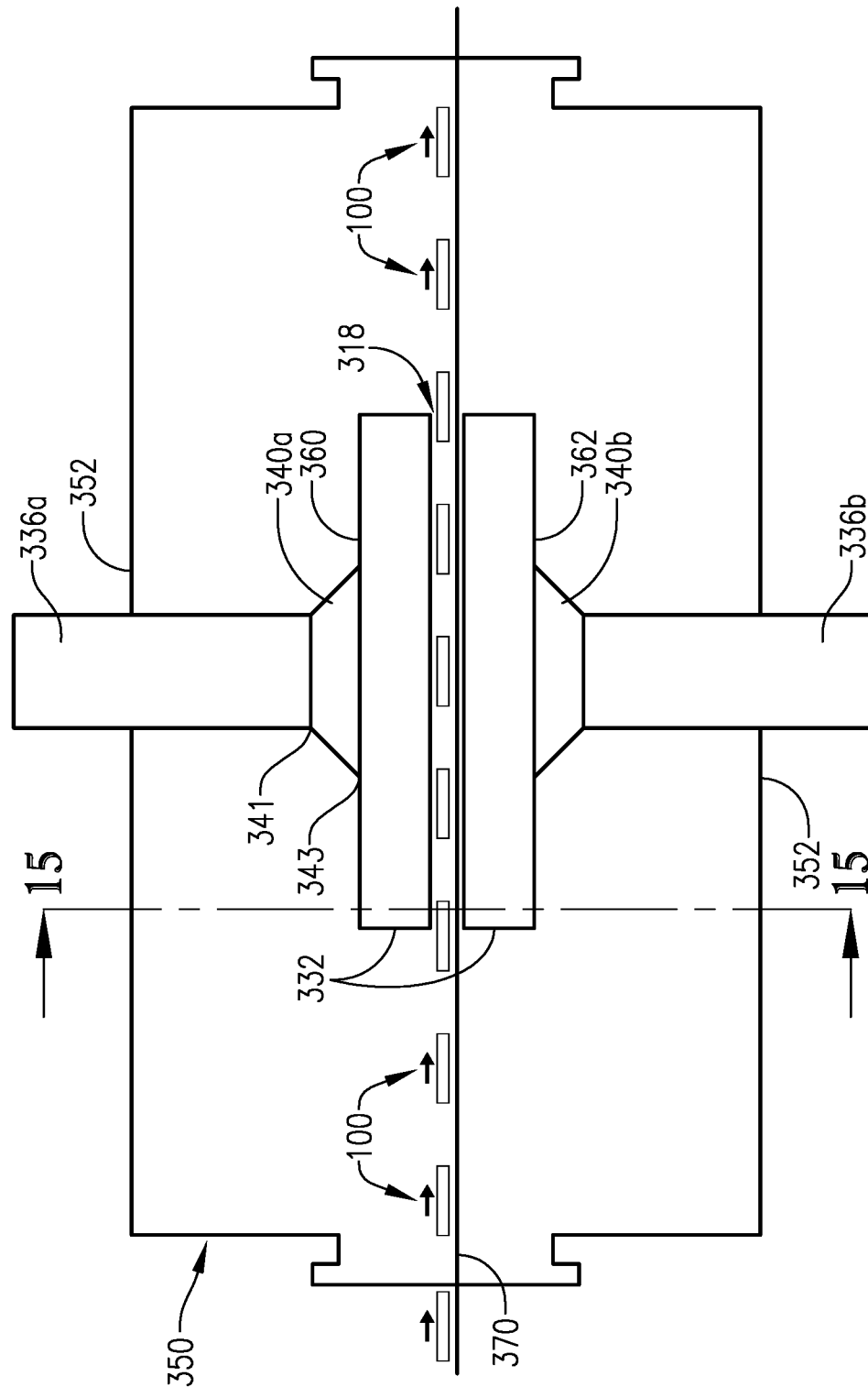
FIG. 14 is a side cross-sectional view of an RF heating section configured according to various embodiments of the present invention, particularly illustrating the RF heating zone and RF energy transmission system.
Figure 15:
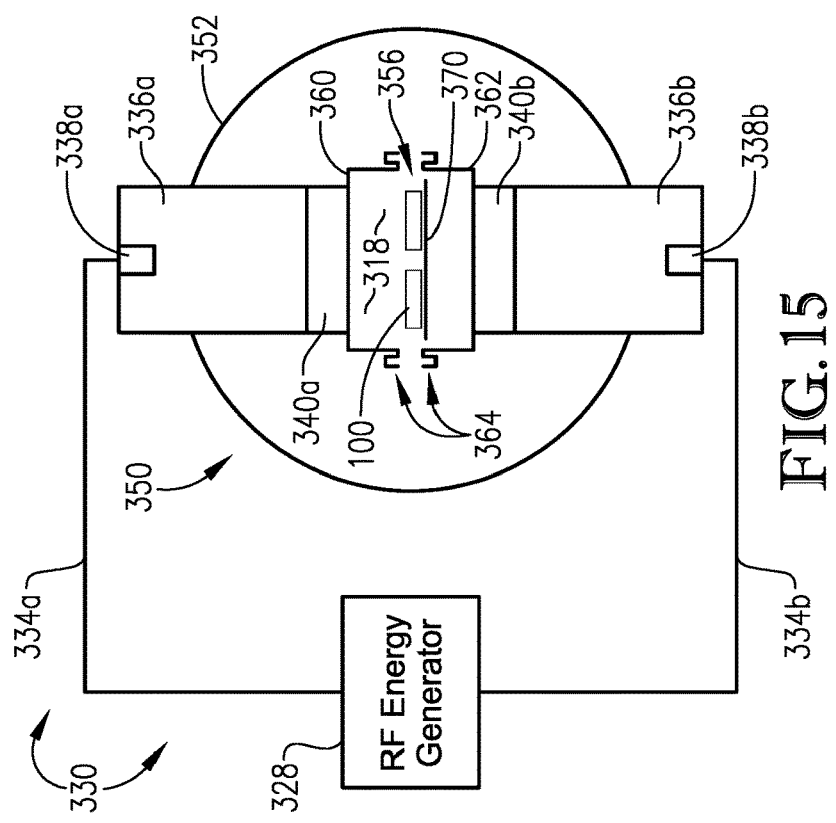
FIG. 15 is an axial cross-sectional view of the RF heating section taken along line 15-15 in FIG. 14.

In addition, as shown in FIGS. 14 through 18, the RF energy transmission system 330 may include at least one RF launcher 340 located between the waveguide 336 and the RF applicator 332 for emitting RF energy into the RF applicator 332 and the RF heating zone 318. Each RF launcher 340 is configured to discharge energy from the waveguide 336 into the RF applicator 332 and may include, for example, a narrow end 341 and a broad end 343. As shown in FIGS. 14 and 16, the narrow end 341 can be coupled to the waveguide 336, while the broad end 343 can be coupled to the RF applicator 332. Although shown in FIGS. 14 through 18 as including an upper launcher 340a and a lower RF launcher 340b disposed on generally opposite sides of the pressure vessel 350, it should be understood that other configurations would also be suitable. For example, in some embodiments, the RF energy transmission system may include a single RF launcher, while, in other embodiments, it may include two or more RF launchers located on the same side of the vessel 350 and spaced apart from one another along the direction of extension of the vessel.

In certain embodiments, the interior of the upper RF launcher 340a and/or lower RF launcher 340b can be substantially empty. That is, there may be few or no additional structures located within the interior of the upper RF launcher 340a and/or the lower RF launcher 340b. Such structures which may be absent from the interior of the upper RF launcher 340a and/or the lower RF launcher 340b include, for example, dividing septa and irises.

As shown in FIGS. 14 through 18, in some embodiments, at least one waveguide 336 may penetrate a wall 352 of the pressure vessel 350 so that the RF applicator 332 can be disposed within the interior of the vessel 350. In some embodiments, the RF applicator 332 may be spaced inwardly from the wall 352 of the vessel 350, as shown in FIGS. 14 through 18, while, in other embodiments, the RF applicator 332 may be positioned proximate to or integrated with the wall 352. The RF energy transmission system 330 may include a pair of waveguides, shown as upper waveguide 336a and lower waveguide 336b, that penetrate the sides of the vessel 350 at respective upper and lower locations. Each of the upper waveguide 336a and lower waveguide 336b may be configured to provide RF energy to substantially opposite sides of the RF applicator 332. In some embodiments as shown in FIGS. 14 to 18, all or a portion of the RF launchers 340 may also be present within the interior of the pressure vessel 350.

When the RF energy transmission system 330 includes an upper waveguide 336a and a lower waveguide 336b, it may also include an upper coaxial conductor 334a and a lower coaxial conductor 334b, and an upper coax-to-waveguide transition 338a for coupling the upper coaxial conductor 334a to the upper waveguide 336a and a lower coax-to-waveguide transition 338b for coupling the lower coaxial conductor 334b to the lower waveguide 336b. One such embodiment is generally depicted in FIGS. 15 and 16.

The upper and lower coaxial conductors 334a and 334b may include an inner conductor and an outer conductor that extend coaxially from the RF energy generator 328 to the inlet of the upper and lower waveguides 336a and 336b respectively. As shown in FIG. 16, the outer conductor of each of the upper coaxial conductor 334a and the lower coaxial conductor 334b may terminate at the wall of respective upper and lower waveguides 336a and 336b. The inner conductor, however, may extend through one wall of each of the upper and lower waveguides 336a and 336b and into the interior of the waveguides 336a and 336b, thereby forming respective upper and lower coax-to-waveguide transitions 338a and 338b. Optionally, the inner conductor of the upper or lower coax-to-waveguide transitions 338a and 338b may extend through the opposite wall of the upper or lower waveguide 336a or 336b. A dielectric sleeve may surround the inner conductor where the inner conductor penetrates the wall or walls of the upper or lower waveguides 336a,b in order to prevent fluid from flowing into respective upper or lower coaxial conductor 334a,b. The dielectric sleeve may be formed from any material capable of being sealed with the waveguide and that is substantially transparent to RF energy. One example of a suitable material includes, but is not limited to, glass fiber filled polytetrafluoroethylene (PTFE).

In certain embodiments, the RF applicator 332, within which the RF heating zone 318 is defined, can be in open communication with the interior of the pressure vessel 350 and/or with the interior of at least one waveguide 336. As used herein, the term "open communication" means that a fluid present in one of the RF applicator 332 and the interior of the pressure vessel 350 and/or the interior of the waveguide 336 may be permitted to flow therebetween with little or no restriction. Such open communication may be facilitated by, for example, use of a split RF applicator 332 that includes at least one opening 356 as discussed previously. With the use of one or more chokes at the opening of the RF applicator 332, open fluid communication between the inside and the outside of the RF applicator 332 can be maintained, while substantially all of the RF energy remains contained within the RF applicator 332.

When the RF applicator 332 is in open communication with the interior of the pressure vessel 350 and/or the interior of the waveguide 336 (or upper and lower waveguides 336a,b, when present), each can have a similar pressure. In some embodiments, the pressure within the RF applicator 332 and the interior of the pressure vessel 350 and/or the waveguide 336 can be at least about 5, at least about 10, at least about 15, at least about 20, or at least about 25 psig and/or not more than about 80, not more than about 70, not more than about 60, not more than about 50, not more than about 40, or not more than about 35 psig. When the articles 100 are being pasteurized, the pressure can be in the range of from about 1 psig to about 40 psig or about 2 psig to about 20 psig. When the articles 100 are being sterilized, the pressure can be in the range of from about 5 psig to about 80 psig, or about 15 psig to about 40 psig. The RF heating zone 318 and articles 100 passing therethrough may also be at or near a pressure within one or more of the above ranges.

In certain embodiments, the interior of the RF applicator 332, the interior of the pressure vessel 350, and, optionally, the upper waveguide 336a and lower waveguide 336b may be filled with a common liquid. The liquid can act as a transfer medium through which RF energy is passed as it is directed toward to the articles 100 passing through RF heating zone 318. The RF heating zone 318 may also be filled with the liquid medium and the articles 100 being heated may be submerged in the liquid while passing through the RF heating zone 318. The liquid medium can comprise, or be, any of the aforementioned types of liquid and, in some embodiments, may be pretreated in order to minimize its conductivity. For example, in some embodiments, the liquid may be treated so that it has a conductivity of not more than about 100, not more than about 90, not more than about 80, not more than about 70, not more than about 60, not more than about 50, not more than about 40, not more than about 30, not more than about 20, not more than about 10, not more than about 5, not more than about 1, or not more than about 0.5 mS/m. In some embodiments, the liquid can comprise or be deionized or distilled water.

As the articles 100 pass through RF heating zone 318, at least a portion of the RF energy discharged therein may be used to heat the articles 100. The RF heating portion of the RF heating system may include at least one convey line for transporting the articles 100 through the RF heating zone and into and out of the pressure vessel. Any suitable type of conveyor can be used to form the convey line, including, for example, plastic or rubber belt conveyors, chain conveyors, roller conveyors, flexible or multi-flexing conveyors, wire mesh conveyors, bucket conveyors, pneumatic conveyors, trough conveyors, vibrating conveyors, and combinations thereof.

Figure 19:
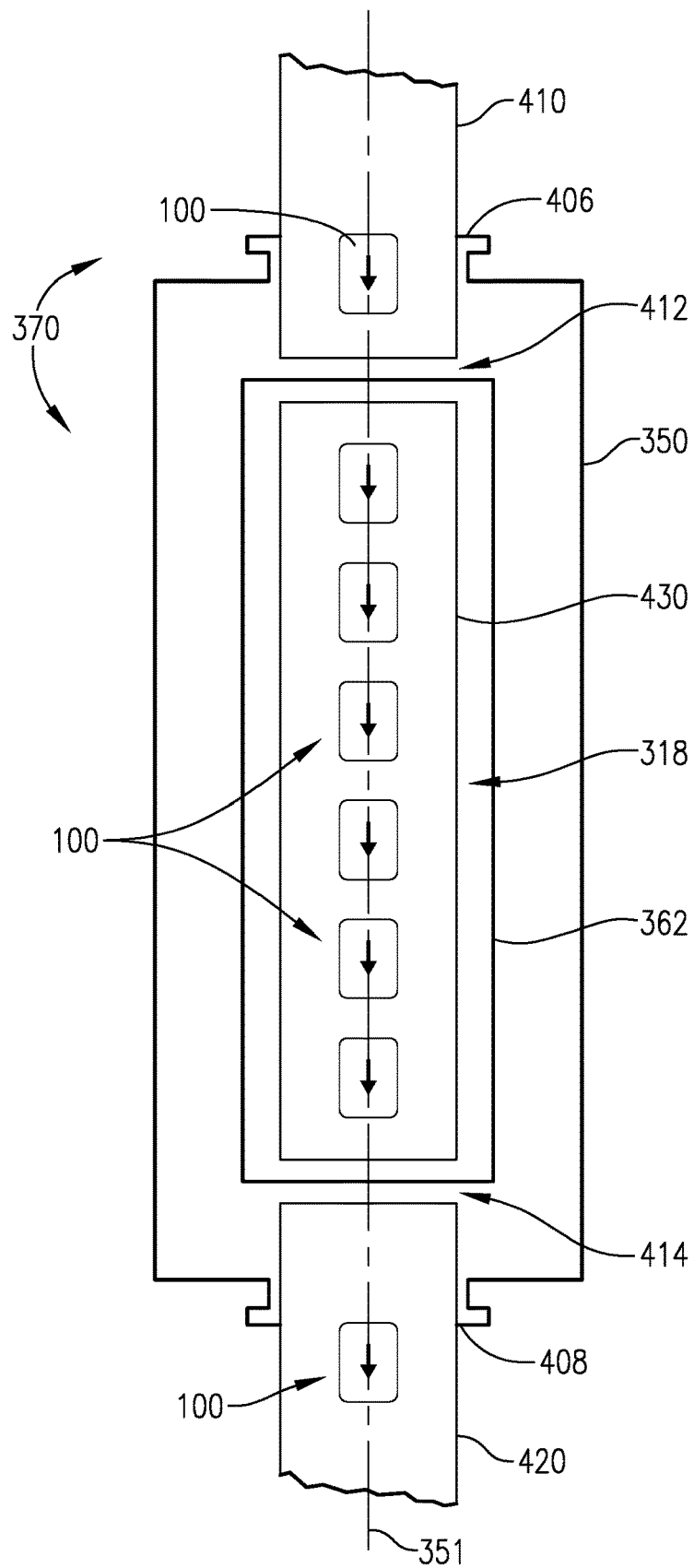
FIG. 19 is a simplified top view of a convey line suitable for use in the RF heating section according to various embodiments of the present invention.

In some embodiments, the convey line may include a single convey segment while, in other embodiments, the convey line may include two or more convey segments arranged in parallel or series. One example of a convey line 370 suitable for use in the RF heating section of the present invention is shown in FIG. 19. As shown in FIG. 19, the convey line 370 is disposed in the pressure vessel 350 and is configured to transport articles 100 in the direction of extension of the central axis of the pressure vessel 351. In the embodiment shown in FIG. 19, the convey line 370 includes an approach conveyor 410, a take-away conveyor 420, and an RF zone conveyor 430. The approach conveyor 410 may be configured to transport the articles 100 through an entrance opening 406 in the pressure vessel 350 toward the RF heating zone 318 defined within RF applicator 332, and the take-away conveyor 420 may be configured to transport the articles 100 through an exit opening 408 away from the RF heating zone 318. The RF zone conveyor 430 can transport the articles 100 through the RF heating zone 318 while the articles are being heated with RF energy. The articles 100 are loaded onto the RF zone conveyor 430 in a loading zone 412 and unloaded from the RF zone conveyor 430 in an unloading zone 414.

The approach conveyor 410, take-away conveyor 420, and RF zone conveyor 430 may be operated so that the average velocity of the articles 100 passing through RF heating zone 318 may be at least about 0.05, at least about 0.10, at least about 0.15, or at least about 0.20 inches per second (in/s) and/or not more than about 10, not more than about 8, not more than about 6, not more than about 5, not more than about 4, not more than about 3, not more than about 2, or not more than about 1 in/s, or it can be in the range of from about 0.10 in/s to about 10 in/s, about 0.15 in/s to about 5 in/s, or about 0.2 to about 2 in/s. In some embodiments, the articles may pass through the RF heating zone at a rate of at least about 5, at least about 10, at least about 15, at least about 20, or at least about 25 articles per minute and/or not more than about 100, not more than about 75, not more than about 50, not more than about 30, or not more than about 25 articles per minute.

Each of the approach conveyor 410, the take-away conveyor 420, and the RF zone conveyor 430 may be operated at similar speeds or one or more may be operated at different speeds. For example, in some embodiments, the approach conveyor 410 and the take-away conveyor 420 may be operated at velocities that are at least 1.25, at least about 1.5, at least about 1.75, at least about 2, at least about 2.5, or at least about 3 times faster than the velocity of the RF zone conveyor 430. As such, the average centerpoint-to-centerpoint spacing of the articles 100 on the approach conveyor 410 and/or the take-away conveyor 420 can be at least about 1.25, at least about 1.5, at least about 1.75, or at least about 2 times greater than the spacing of articles 100 on the RF zone conveyor 430.

Such differences may depend, at least in part, on the particular configuration of each conveyor and can be used to ensure a consistent mass convey rate of the articles 100 through the pressure vessel. In certain embodiments, the total mass convey rate of the articles 100 passing through the RF heating zone 318 can be at least about 5, at least about 10, at least about 15, at least about 25, at least about 30, at least about 35, at least about 40, at least about 45, at least about 50, at least about 55, at least about 60, at least about 65, at least about 70, or at least about 75 pounds per minute (lb/min) and/or not more than about 1000, not more than about 900, not more than about 800, not more than about 700, not more than about 600, not more than about 500, not more than about 400, not more than about 300, not more than about 200, or not more than about 100 lb/min, or it can be in the range of from about 5 to about 1000 lb/min or about 75 to about 200 lb/min.

Figure 20:
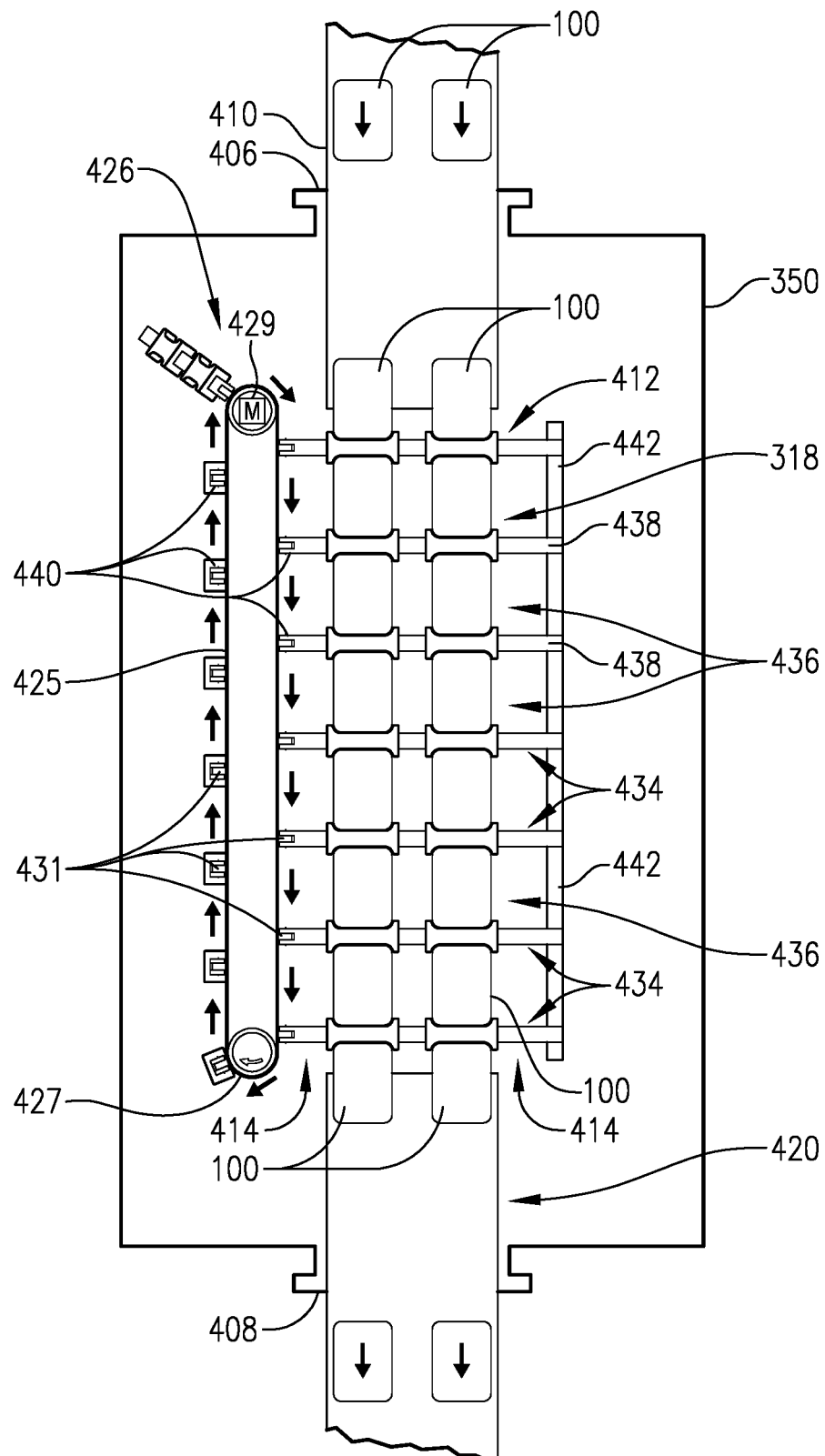
FIG. 20 is top cross-sectional view of an RF heating section configured according to various embodiments of the present invention, particularly illustrating a swing arm conveyor.
Figure 22:
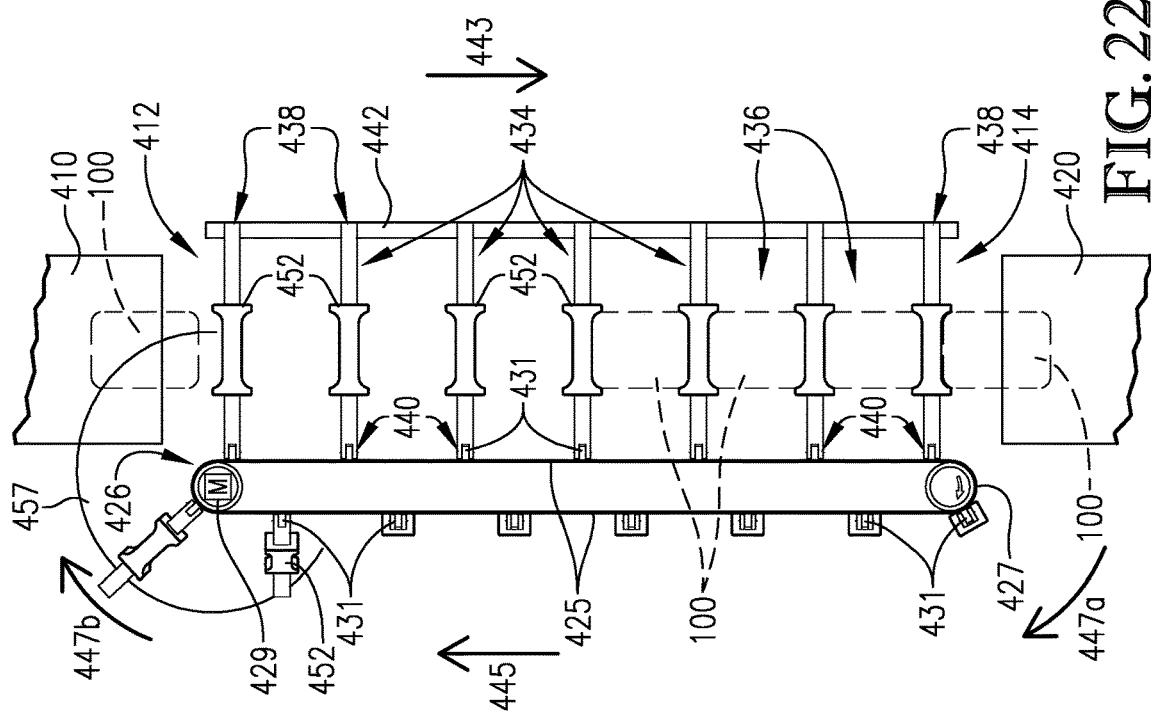
FIG. 22 is a simplified top view of an RF zone conveyor according to various embodiments of the present invention, particularly illustrating the travel path of the article supporting members.
Figure 21:
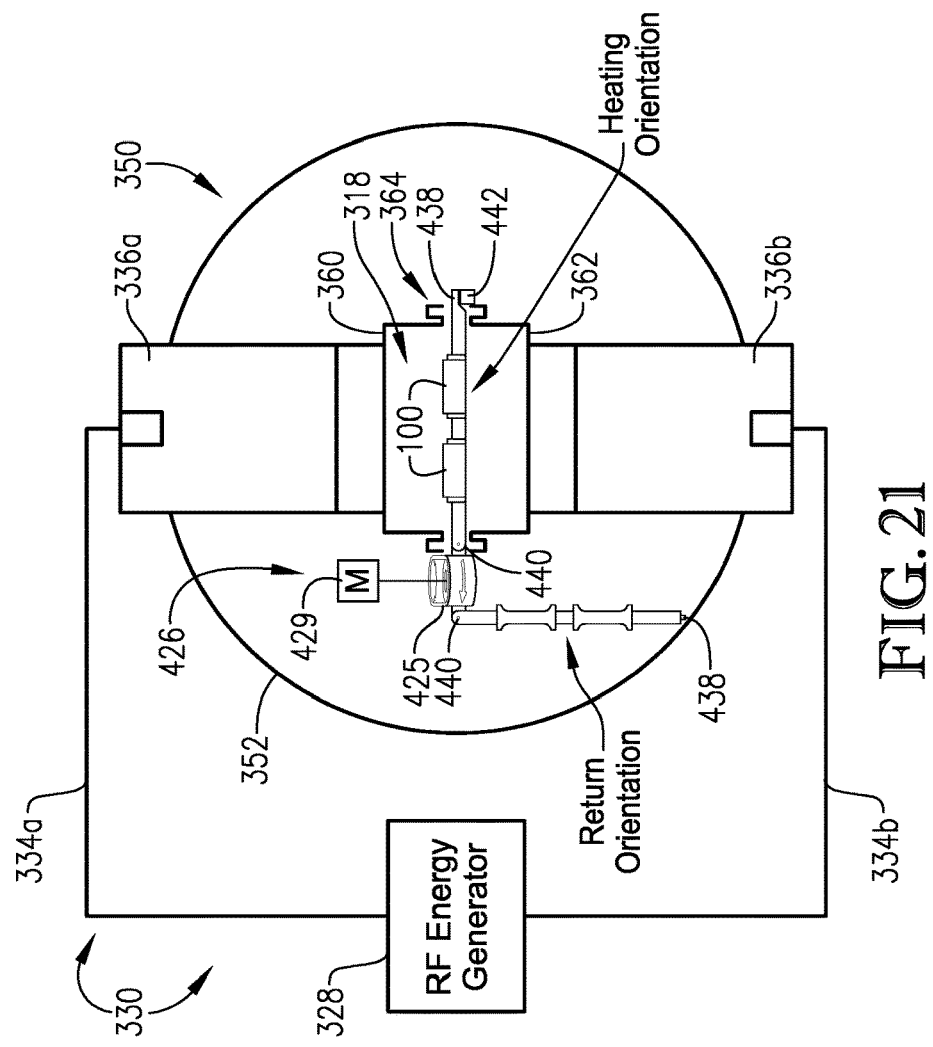
FIG. 21 is an axial cross-sectional view of the RF heating section shown in FIG. 20.

Turning now to FIGS. 20 through 23, several aspects of an RF heating section that includes an RF zone conveyor configured according to certain embodiments of the present invention are illustrated. The RF zone conveyor shown in FIGS. 20 through 23 is a swing arm conveyor that includes a plurality of spaced-apart article supporting members 434 for engaging, supporting, and moving the articles 100 through the RF heating zone 318. The article supporting members 434 are coupled to a drive mechanism 426 that moves the article supporting members 434 from the loading zone 412, through the RF heating zone 318, and to an unloading zone 414. The articles 100 passing through RF heating zone 318 may be held in article-receiving spaces 436 that are defined between adjacent article-supporting members 434, as generally shown in FIGS. 21 and 22.

The drive mechanism 426 of the swing arm conveyor may be any device or system suitable for moving the article supporting members 434 through the RF heating zone 318. In some embodiments, the drive mechanism 426 may be a continuous drive mechanism. In certain embodiments, as particularly illustrated in FIG. 20, the drive mechanism 426 can include a belt or chain 425, a pulley or sprocket 427, and a motor 429 for rotating the sprocket or pulley 427 with the belt or chain 425. Additionally, the belt or chain 425 can include a plurality of anchors 431 to which individual article-supporting members 434 may be coupled. All, or a portion, of the drive mechanism 426 may be located outside the RF heating zone 318, but within the interior of the pressure vessel 350, as shown in FIGS. 20 and 21. When the pressure vessel 350 is filled with a liquid medium, the drive mechanism 426 may be configured to be at least partially, or completely, submerged in the liquid medium during operation.

Turning now to FIGS. 24 through 27, several views of an article supporting member 434 suitable for use with a swing arm conveyor according to various embodiments of the present invention are shown. The article supporting member 434 has a free end 438, a connected end 440, and a longitudinal axis 435 extending from the connected end 440 to the free end 438. As shown in FIG. 24, the connected end 440 is configured to be coupled to a belt or chain 425, which is part of the drive mechanism 426 of the swing arm conveyor. In some embodiments, the connected end 440 may be rigidly connected to the belt or chain 425 of drive mechanism 426, so that the article supporting member 434 remains in generally the same position as it moves along the entire travel path within the pressure vessel.

In other embodiments, the connected end 440 may be rotatably coupled to the drive mechanism 426 so that, for example, the article supporting member 434 may pivot or otherwise rotate during at least a portion of its movement through the pressure vessel 350. One example of an article supporting member 434 having a connected end 440 capable of being rotatably coupled to the drive mechanism 426 is shown in FIG. 25. As shown in FIG. 25, the connected end 440 of the article supporting member 434 presents a slot 441 into which an anchor 431 of the continuous drive mechanism 426 may be inserted. When the anchor 431 is inserted into the slot 441, the holes in the anchor 431 and the connected end 440 align, and a pin 443 may be inserted into the holes. This not only secures the article supporting member 434 to the belt or chain 425, but also permits the article supporting member 434 to pivot vertically so that it can be in different positions as it moves along the travel path.

In some embodiments, the connected end 440 may include a releasable attachment mechanism for readily permitting removal and replacement of the article supporting member 434 from the drive mechanism 426. For example, as shown in FIG. 25, the pin 443 may be removable, so that another article supporting member having a different shape, but similarly configured connected end 440, may be secured to the belt or chain 425 as described previously. In other embodiments, the article supporting member may be fixed and not removable from the continuous drive mechanism 426 without damaging the swing arm conveyor.

As shown in FIGS. 24 through 27, the article supporting member 434 comprises an elongated convey arm 450 and an article contact member 452 coupled to the elongated convey arm 450 and configured to contact and at least partially surround the article as it is passed through the RF heating zone. The elongated convey arm 450 may be formed from a generally rigid material and, in some embodiments, may not absorb energy. For example, in certain embodiments, the elongated convey arm 450 can have a dielectric loss factor of not more than about 10, not more than about 8, not more than about 6, not more than about 4, not more than about 2, or not more than about 1, measured as described herein. Additionally, or in the alternative, the elongated convey arm 450 may have a conductivity of at least about $1 \times 10^6$, at least about $2 \times 10^6$, at least about $5 \times 10^6$ Siemens per meter (S/m). The elongated convey arm 450 may be formed from, for example, stainless steel or another metal.

The article contact member 452 of the article supporting member 434 may include an energy-absorptive component 454. The energy-absorptive component can be capable of absorbing energy and may, for example, have a dielectric constant of at least about 20, at least about 25, at least about 30, at least about 35, at least about 40, at least about 45, or at least about 50 and/or not more than about 150, not more than about 140, not more than about 130, not more than about 120, not more than about 110, not more than about 100, not more than about 90, not more than about 80, not more than about 70, or not more than about 60, or it can be in the range of from about 20 to about 150, about 30 to about 100, or about 40 to about 60. Alternatively, or in addition, the energy-absorptive component 454 can have a dielectric loss factor of at least about 10, at least about 20, at least about 30, at least about 40, at least about 50, at least about 100, at least about 150, or at least about 200 and/or not more than about 1500, not more than about 1250, not more than about 1000, or not more than about 800, or it can be in the range of from about 10 to about 1500, about 50 to about 1500, about 100 to about 1250, or about 200 to about 800.

In some embodiments, it may be possible to form the article contact member 452 of the article supporting member 434 so that the dimensions and/or dielectric properties of the article contact member 452 are similar to those of the package holding the ingestible substance and/or the ingestible substance itself. For example, the article contact member 452 (or the energy-absorptive component 454) may have a dielectric constant within about 50, within about 45, within about 40, within about 35, within about 30, within about 25, within about 20, within about 15, or within about 10 percent of the dielectric constant of the ingestible substance. Alternatively, or in addition, the article contact member 452 (or the energy-absorptive component 454) can have a dielectric loss factor within about 50, within about 45, within about 40, within about 35, within about 30, within about 25, within about 20, within about 15, or within about 10 percent of the dielectric loss factor of the ingestible substance. In some embodiments, the dielectric constant and/or dielectric loss factor of the article contact member 452 can be controlled during the formation of the energy-absorptive component 454. For example, changing the composition of the energy-absorptive component 454 may change the dielectric properties of the article contact member 452.

In some embodiments, the RF heating system may include two or more sets of article supporting members that each have different dimensional and/or dielectric characteristics. This permits the swing arm conveyor to be operated in at least two different configurations, each one employing a plurality of article supporting members configured to contact and support packaged articles having different dimensional and/or dielectric characteristics. For example, one set of article supporting members may be configured to hold a different number of packages, or may be configured to hold larger or smaller packages, or packages of a different shape than the other set. Additionally, or in the alternative, the energy-absorptive material used to form the article contact members on one set of the article supporting members may have a different dielectric constant and/or dielectric loss than the energy-absorptive material used with the other set. In such embodiments, each of the article supporting members 434 may include a releasable attachment so that the article supporting members of one set may be easily replaced with the article supporting members of another set so that the RF conveyor can be run in a different configuration. One example of a releasable attachment is the anchor 431 and pin 443 described previously with respect to FIG. 25. The swing arm conveyor can include any suitable number of sets of article supporting members, each having dimensions and/or dielectric properties specifically configured to process certain types of articles.

Turning again to FIGS. 24-27, the energy-absorptive component 454 of each article contact member 452 may be formed from an energy-absorptive material that may be shaped to permit the contact member 452 to support and at least partially surround the article when the article supporting member 434 moves the article through the RF heating zone. The energy-absorptive material may be a homogeneous (single) material, or it may be a composite material formed from a mix or blend of two or more different materials.

In certain embodiments, the energy-absorptive material can have a dielectric constant of at least about 20, at least about 25, at least about 30, at least about 35, at least about 40, at least about 45, or at least about 50 and/or not more than about 150, not more than about 140, not more than about 130, not more than about 120, not more than about 110, not more than about 100, not more than about 90, not more than about 80, not more than about 70, or not more than about 60, or it can be in the range of from about 20 to about 150, from about 30 to about 100, or about 40 to about 60. Alternatively, or in addition, the energy-absorptive material can have a dielectric loss factor of at least about 10, at least about 25, at least about 50, at least about 100, at least about 150, or at least about 200 and/or not more than about 1500, not more than about 1250, not more than about 1000, or not more than about 800, or it can be in the range of from about 10 to about 1500, about 100 to about 1250, or about 200 to about 800.

In certain embodiments, the energy-absorptive material used to form the energy-absorptive component 454 may be a homogeneous material. As used herein, the term "homogeneous" refers to a single type of material having an overall purity of at least about 98 weight percent, based on the entire weight of the material or component. For example, in some cases, the homogeneous energy-absorptive material can include a single type of material in an amount of at least about 98.5, at least about 99, at least about 99.5, or at least about 99.9 weight percent. Conversely, a homogenous energy-absorptive material may also include not more than about 2, not more than about 1.5, not more than about 1, not more than about 0.5, or not more than about 0.1 weight percent of components other than the single type of energy-absorptive material. When formed from a homogenous material, the energy-absorptive component 454 can include one or more layers of the material stacked upon one another, or it may comprise a solid mass of the energy-absorptive material formed by, for example, melting, blending, or binding powders, pellets, or particles of the energy-absorptive material.

In other embodiments, the energy-absorptive material may comprise a composite material having two or more different types of material blended, mixed, or otherwise combined with one another. The types and amounts of materials combined to form a composite energy-absorptive material may vary and may be selected in order to achieve one or more desirable properties in the final energy-absorptive component 454. For example, in some embodiments, the composite material may comprise a blend of a polymeric material having a low dielectric loss and a solid electrolyte material having a higher loss. The type and amount of components in the composite material may be selected so that at least one of the dielectric loss, dielectric constant, and conductivity of the energy absorptive material (or final energy-absorptive component 454) is within about 20, within about 15, within about 10, within about 5, or within about 2 percent of the dielectric loss, dielectric constant, or conductivity of the ingestible substance or article being heated.

Suitable composite energy-absorptive materials can have a dielectric constant of at least about 20, at least about 25, at least about 30, at least about 35, at least about 40, at least about 45, or at least about 50 and/or not more than about 150, not more than about 140, not more than about 130, not more than about 120, not more than about 110, not more than about 100, not more than about 90, not more than about 80, not more than about 70, or not more than about 60, or it can be in the range of from about 20 to about 150, from about 30 to about 100, or about 40 to about 60. Alternatively, or in addition, composite material, when used, can have a dielectric loss factor of at least about 10, at least about 25, at least about 50, at least about 100, at least about 150, or at least about 200 and/or not more than about 1500, not more than about 1250, not more than about 1000, or not more than about 800, or it can be in the range of from about 10 to about 1500, about 100 to about 1250, or about 200 to about 800.

The energy-absorptive material may also have a conductivity in the range of from about 0.01 to about 10 Siemens per meter (S/m), or at least about 0.01, at least about 0.05, at least about 0.075, at least about 0.1, at least about 0.25, at least about 0.3, at least about 0.5, at least about 1, at least about 1.5, at least about 2, at least about 2.5, at least about 3, at least about 3.5, at least about 4, at least about 4.5, or at least about 5 S/m and/or not more than about 10, not more than about 9.5, not more than about 9, not more than about 8.5, not more than about 8, not more than about 7.5, or not more than about 7 S/m, or it can be in the range of from about 0.2 to about 9 S/m, at least about 0.25 to about 8.5 S/m, or at least about 0.3 to about 8 S/m. Additionally, the solid electrolyte material, when present, may also have a conductivity within one or more of the above ranges, and may have a conductivity the same as or different than the energy-absorptive material.

In some embodiments, the energy-absorptive material may comprise at least one solid electrolyte material. Examples of suitable solid electrolyte materials can include, but are not limited to, polymers including repeat units of perfluorosulfonic acid. In some embodiments, the solid electrolyte material can comprise copolymers of perfluorosulfonic acid and polytetrafluoroethylene (PFSA-PTFE), which may be chemically stabilized and/or in the acid form. One example of such a polymer is Nafion® PFSA commercially available from DuPont™.

When used as the energy-absorptive material, the solid electrolyte can have a dielectric constant and/or dielectric loss factor within one or more of the above ranges. When used to form the energy-absorptive component 454, the solid electrolyte material may be in any suitable form. In some cases, solid electrolyte materials may be used as a homogeneous energy-absorptive materials, while in others solid electrolytes may be part of a composite energy-absorptive material. For example, in some embodiments, the solid electrolyte material may be in the form of a film or membrane and may be stacked in layers to form the energy-absorptive component. When all of the layers are formed from the same solid electrolyte material, the resulting energy-absorptive material may be homogeneous, while alternating one or more layers with a different material may form a composite energy-absorptive material. In still other embodiments, the energy-absorptive component may be formed from a powder, pellets, or particles of solid electrolyte material, which may be blended, mixed, melted, or otherwise combined with one or more other components to form a composite solid electrolyte material. Examples of suitable components that may be combined with the solid electrolyte material include, but are not limited to, binders, polymers, rubbers, other solid electrolyte materials, and combinations thereof.

In certain embodiments, the energy-absorptive material may be a composite material comprising a polymeric binder and a plurality of solid particles dispersed in the polymeric binder. Such materials can have a dielectric constant and/or dielectric loss factor similar to, or the same as, the energy-absorptive component 454, while, in other embodiments, the dielectric constant and/or dielectric loss factor of the composite polymeric material may be less than the dielectric constant and/or dielectric loss factor of the energy-absorptive component 454.

When the energy-absorptive material is a composite material including a polymeric binder and a plurality of solid particles dispersed in the polymeric binder, the polymeric binder may be present in the composite material in an amount in the range of from about 10 to about 99.5 weight percent, based on the total weight of the composite material. In some embodiments, the polymeric binder may be present in an amount of at least about 10, at least about 20, at least about 25, at least about 30, at least about 35, at least about 40, at least about 45, at least about 50, at least about 55, at least about 60, at least about 65, at least about 70 weight percent and/or not more than about 99.5, not more than about 99, not more than about 97, not more than about 95, not more than about 90, not more than about 85, not more than about 80, not more than about 75, not more than about 70, not more than about 65, not more than about 60, or not more than about 55 weight percent, based on the total weight of the composite material. The polymeric binder may be present in the composite material in an amount in the range of from about 10 weight percent to about 99.5 weight percent, about 20 weight percent to about 90 weight percent, or about 40 weight percent to about 60 weight percent.

The polymeric binder can include any moldable polymeric material suitable for use in an RF heating zone. In certain embodiments, the polymeric binder can have a dielectric constant and/or dielectric loss factor of not more than about 10, not more than about 8, not more than about 6, not more than about 4, not more than about 2, or not more than about 1. In certain embodiments, the polymeric binder may comprise rubber. Examples of suitable rubbers include, but are not limited to, chloroprene (neoprene), ethylene-propylene-diene (EDPM), ethylene-propylene, nitrile-butadiene, polysiloxane (silicone), styrene-butadiene, isobutene-isoprene (butyl), isoprene, natural rubber, chloro-sulfonyl-polyethylene, polyethylene-adipate, poly(oxy-1,4-butylene) ether (urethane), hexafluoropropylene-vinylidene fluoride, fluorocarbon, hydrogenated acrylonitrile-butadiene, carboxylated nitrile, and combinations thereof. In certain embodiments, the rubber may be silicone rubber.

When used, the solid particles dispersed in the polymeric binder of the composite material may be present in an amount of at least about 0.5, at least about 1, at least about 5, at least about 10, or at least about 15 weight percent and/or not more than about 50, not more than about 45, not more than about 40, not more than about 35, or not more than about 30 weight percent, based on the total weight of the composite material. In certain embodiments, the solid particles may be present in an amount in the range of from about 0.5 weight percent to about 50 weight percent, about 1 weight percent to about 40 weight percent, or about 2 weight percent to about 20 weight percent, based on the total weight of the composite material. The weight ratio of solid particles to polymeric binder in the composite material can be at least about 1:100, at least about 1:75, or at least about 1:50 and/or not more than about 1:1, not more than about 1:1.5, or not more than about 1:2, or it can be in the range of from about 1:100 to about 1:1, about 1:75 to about 1:1.5, or about 1:50 to about 1:2.

The solid particles dispersed in the polymeric binder of the composite material can be any solid particles that increase the dielectric constant and/or dielectric loss factor of the polymeric binder so that, for example, the dielectric constant and/or dielectric loss factor of the composite material is higher than it would be if the composite material were formed only from the polymeric binder. The solid particles may have an average particle size of at least about 5, at least about 10, at least about 15, at least about 20, at least about 25, at least about 30, at least about 35, at least about 40, at least about 45, or at least about 50 nanometers (nm) and/or not more than about 1000, not more than about 900, not more than about 800, not more than about 700, not more than about 600, not more than about 500, not more than about 400, not more than about 300, not more than about 200, or not more than about 100 nm, or it can be in the range of from about 5 nm to about 1000 nm, about 20 nm to about 500 nm, about 10 nm to about 250 nm, or about 50 to about 100 nm. In some embodiments, the solid particles may comprise a carbon black. In other embodiments, the solid particles may comprise solid electrolyte materials. The selection of the specific type and/or amount of solid particles in the polymeric binder in the composite material used to form the energy-absorptive component 454 (or article contact member 452) may help control the final dielectric properties of the article contact member 452.

In certain embodiments, the energy-absorptive component 454 may further include a plurality of spaced-apart conductive elements 456, as shown in FIG. 25. Use of the conductive elements 456, which can include, for example, metallic plates, may permit adjustment of the dielectric constant and/or dielectric loss factor of the energy control component 454. For example, in some embodiments, the energy-absorptive material may have a dielectric constant and/or dielectric loss factor less than the dielectric constant and/or dielectric loss factor of the energy-absorptive component 454, when the conductive elements 456 are present. When present, the conductive elements 456 may be configured so that the energy-absorptive material can be received between the conductive elements 456 to form the energy-absorptive component 454. Conductive elements 456 may be formed from a conductive material and can have a conductivity of at least about $1 \times 10^6$, at least about $2 \times 10^6$, at least about $5 \times 10^6$ Siemens per meter (S/m) and may comprise, for example, a plurality of metallic plates. Stainless steel is one example of a suitable metal for use in forming one or more of the conductive elements 456. In some embodiments, the energy-absorptive component 454 does not include any conductive elements.

Figure 26:
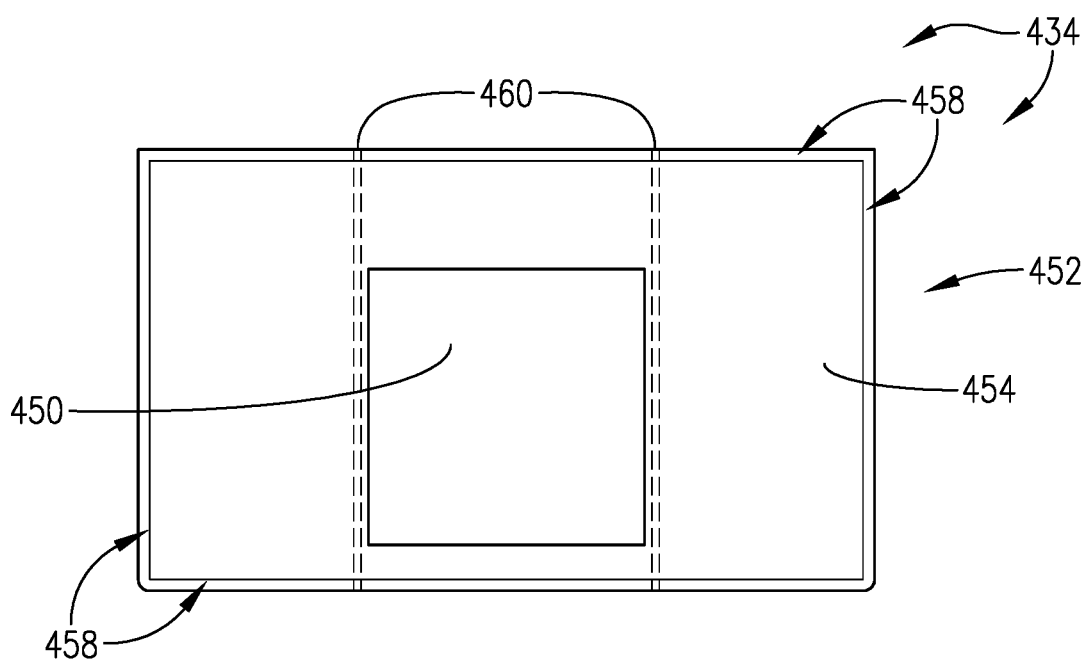
FIG. 26 is an axial cross-sectional view of an article supporting member configured according to various embodiments of the present invention, particularly illustrating various aspects of one type of article contact member.
Figure 27:
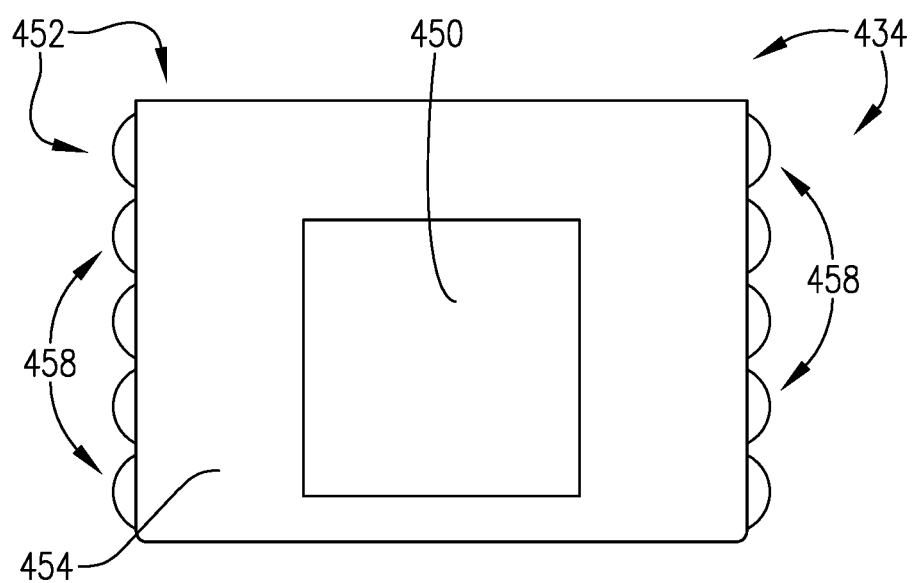
FIG. 27 is an axial cross-sectional view of another article supporting member configured according to various embodiments of the present invention, particularly illustrating various aspects of another type of article contact member.

Additionally, as shown particularly in FIGS. 26 and 27, the article contact member 452 can include an insulating component 458. The insulating component 458 of the article contact member 452 can be configured to contact and support one of the articles 100 when the article supporting member 434 is transporting the article through the RF heating zone. The insulating component 458 may cover all or a portion of the outer surface of the energy-absorptive component 454, and may be positioned between the energy-absorptive component 454 and the package of the article when the article supporting member 434 is in contact with the article to prevent the overheating of the article that may occur if the package were in direct contact with the energy-absorptive component 454. The insulating component 458 may be present on at least about 50, at least about 55, at least about 60, at least about 65, at least about 70, at least about 75, at least about 80, at least about 85, at least about 90, at least about 95, or all of the surface area of the energy-absorptive component 454.

The insulating component 458 may be formed of an energy insulating material having a dielectric constant and/or dielectric loss factor of not more than about 10, not more than about 8, not more than about 6, not more than about 4, not more than about 2, or not more than about 1. In some embodiments, as generally illustrated in FIG. 26, the insulating component 458 may comprise a layer of the insulating material that covers at least a portion of the energy-absorptive component 454. In other embodiments, as generally illustrated in FIG. 27, the insulating component may include a plurality of protrusions formed from the insulating material and protruding from various portions of the surface of the energy-absorptive component 454. The insulating element 458 may be present on at least 1, at least 2, at least 3, or 4 or more sides of the energy-absorptive component 454.

Figure 23:
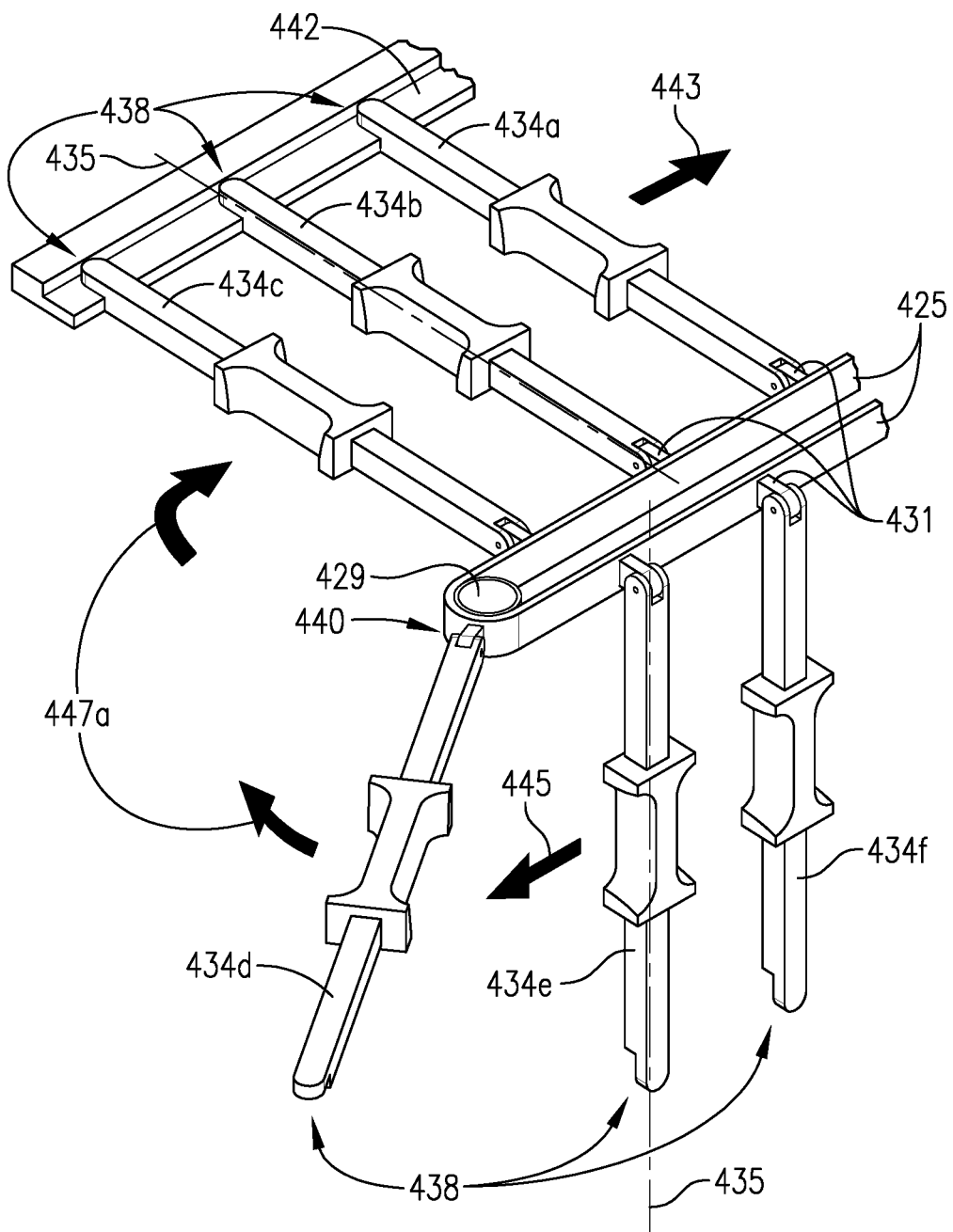
FIG. 23 is a partial perspective view of a portion of an RF zone conveyor according to various embodiments of the present invention, particularly illustrating the movement of several article supporting members in a return orientation, transitioning from a return orientation to a heating orientation, and in a heating orientation.

Turning again to FIGS. 20 through 24, the drive mechanism 426 of the swing arm conveyor may be configured to transport a plurality of article support members 434 along a continuous travel path throughout the interior of vessel 350. As shown in FIGS. 22 and 23, the continuous travel path may include a heating path 443 for transporting articles 100 through the RF heating zone, a return path 445 for transporting the article supporting members 434 from the unloading zone 414 to the loading zone 412, and two transition paths 447a and 447b for transitioning the article supporting members between the heating path 443 and the return path 445.

When the article supporting members 434 are passed along at least a portion of the heating path 443, the article supporting members 434 can be configured in a heating orientation as shown in FIGS. 21 and 22. Article supporting members 434a through 434c shown in FIG. 23 are also configured in a heating orientation. When configured in the heating orientation, the article supporting member may be oriented substantially horizontally so that, for example, the longitudinal axis 435 of the article supporting member 434 is within about 30° of the horizontal. In certain embodiments, an article supporting member configured in a heating orientation may be oriented so that its longitudinal axis is within about 25, within about 20, within about 15, within about 10, within about 5, within about 3, within about 2, or within about 1° of the horizontal, or it may be horizontal.

In certain embodiments, when oriented in the heating orientation, the free end 438 of each article supporting member 434 can supported on an arm support member 442. The arm support member 442 can be any device suitable for supporting the free end 438 of the article supporting member 434 such as, for example, a rail or other surface. As particularly shown in FIG. 21, when the RF applicator 332 is a split applicator, the arm support member 442 may be located outside the RF heating zone 318 so that at least a portion of each of the article supporting members 434 (e.g., the free end 438) can pass through the opening 356 defined between the upper applicator section 360 and the lower applicator section 362 of the split RF applicator 332 as the article supporting member 434 moves through the RF heating zone 318. Additionally, as shown in FIG. 21, the continuous drive 426 may also be positioned outside of the RF heating zone 318, so that a portion of the connected end 440 of the article supporting member is positioned in or near the other opening defined by the upper applicator section 360 and the lower applicator section 362.

As the article supporting members 434 are moved along the heating path 443, the article contact members 452 of the article supporting members 434 may support and hold articles 100 being transported through the RF heating zone 318. As the article supporting members 434 pass through the RF heating zone 318, the article contact member 452 (or energy-absorptive component 454) may also be heated with RF energy. In some embodiments, the temperature of the surface of the article contact member 452 (or the energy-absorptive component 454) may increase by at least about 5, at least about 10, at least about 15, at least about 20, at least about 25, or at least about 30° C. as the article supporting member 434 passes through the RF heating zone 318.

When an article supporting member 434 reaches the end of the heating path 443, the article held in the article-receiving space 436 can be unloaded onto the take-away conveyor 420, as generally shown in FIGS. 20 and 22. When the article is unloaded from the swing arm conveyor, the article supporting member 434 in contact with the front of the article can be moved out of contact with the article as the article supporting member transitions from a heating orientation to a return orientation along transition path 447a, as generally shown in FIG. 22. At this point, the article-receiving space 436 defined between the article supporting member 434 that had been in contact with the front of the article and the adjacent article supporting member 434 still in contact with the back of the article is larger than it was while the article supporting members 434 were transporting the article through the RF heating zone 318. In some cases, the maximum distance between adjacent article supporting members 434 in the unloading zone 414 can be at least about 1.5, at least about 2, at least about 2.5, or at least about 3 times larger than the maximum distance between adjacent article supporting members 434 in the RF heating zone.

Figure 28:
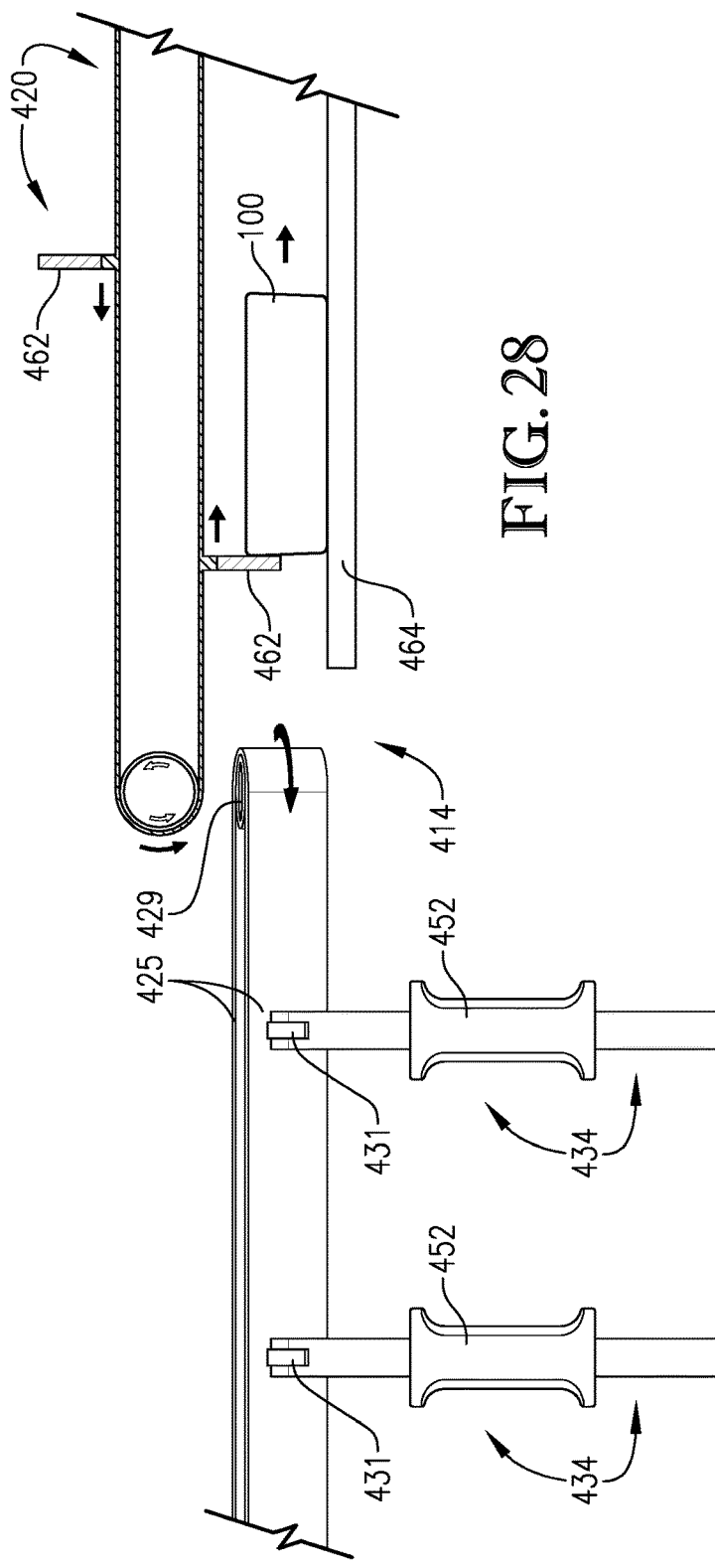
FIG. 28 is a partial side view of an unloading zone in an RF heating section configured according to various embodiments of the present invention, particularly illustrating the transition between a swing arm conveyor and a take-away conveyor in the unloading zone.

Turning now to FIG. 28, a partial view of unloading zone 414 is shown. As shown in FIG. 28, the article 100 being unloaded may be transitioned onto the take-away conveyor 420, which includes a plurality of take-away pushing members 462 for sliding the articles 100 along a take-away track 464. As the back of the article is contacted with one of the take-away pushing members 462, the article 100 can be moved along the take-away track 464 and out of contact with the article supporting member 434 in contact with the back of the article 100. The article 100 may then be moved by take-away conveyor 420 to the next processing zone (not shown).

After the article 100 is unloaded from the swing arm conveyor, the article supporting member 434 may move along a transition path 447a as it moves from the heating orientation to the return orientation, as generally shown in FIG. 22. In certain embodiments, the movement of the article supporting member 434 along the transition path 447a may include pivoting the article supporting member 434 downwardly through an angle of at least 45, at least about 50, at least about 55, at least about 60, at least about 65, at least about 70, at least about 75, at least about 80, at least about 85, or at least about 90° from the heating orientation to the return orientation. Such movement may be accomplished by permitting the article supporting member to move along an inclined surface, such as a ramp, or the article supporting member 434 may simply be permitted to drop downwardly.

As the article supporting members 434 are passed along at least a portion of the return path 445, the article supporting members 434 can be configured in a return orientation as shown in FIG. 23. Article supporting members 434e and 434f shown in FIG. 23 are also configured in a return orientation. In certain embodiments, the article supporting member 434 in a return orientation does not support an article, and may be oriented substantially vertically so that, for example, its longitudinal axis is oriented within about 30° of the vertical. In certain embodiments, an article supporting member 434 in a return orientation can be oriented so that its longitudinal axis is oriented within about 25, within about 20, within about 15, within about 10, within about 5, within about 3, within about 2, or within about 1° of the vertical, or it may be vertical. When oriented in a return orientation the free ends 438 of the article supporting members 434 are not supported on the arm support member 442. In other embodiments (not shown), the article supporting member in a return orientation may be oriented so that its longitudinal axis is within about 30° of the horizontal.

In certain embodiments, passing the article supporting members 434 along the return path in a vertical return configuration may permit reduction in the overall size of the pressure vessel 350. For example, when the pressure vessel 350 includes a cylindrical sidewall 352, as shown in FIG. 21, the diameter of the cylindrical sidewall can be not more than 2.5 times the length of one of the article supporting members 434. In certain embodiments, the diameter of the cylindrical sidewall 352 can be not more than about 2.4, not more than about 2.3, not more than about 2.2, not more than about 2.1, not more than about 2.0, not more than about 1.9, or not more than about 1.8 times the length of one of the article supporting members 434. Each article supporting member can have a total length of at least about 6, at least about 8, at least about 10, at least about 12, at least about 14, at least about 16, or at least about 18 inches and/or not more than about 60, not more than about 50, not more than about 40, not more than about 30, or not more than about 24 inches.

When the pressurized vessel 350 is a liquid-filled vessel, the article supporting members 434 moving from the unloading zone 414 to the loading zone 412 along the return path 445 pass through a liquid medium. In certain embodiments, this may help facilitate heat transfer between the surface of the article contact members 452 (or energy-absorptive components 454) which was heated during passage through the RF heating zone 318 in order to cool the surface by at least about 5, at least about 10, at least about 15, at least about 20, at least about 25, or at least about 30° C. As a result, the temperature of the surface of the article contact member 452 (or energy-absorptive component 454) returned to the loading zone 412 can be within about 10, within about 8, within about 5, within about 3, within about 2, within about 1° C. or the same temperature as the surface of the article contact member 452 (or energy-absorptive component 454) immediately prior contacting an article 100 being loaded onto the RF conveyor for passage through the RF heating zone 318 (e.g., the initial contact surface temperature).

In certain embodiments, the article contact member 452 may include a plurality of heat transfer channels 460 extending through the article contact member 452, as generally shown in FIGS. 25 and 26. As the article supporting member 434 passes along the return path 445 shown in FIG. 20 and through the liquid medium, the liquid medium may pass through the heat transfer channels 460 to facilitate cooling of the article contact member 452. The temperature of the liquid medium through which the article supporting members 434 pass along the return path 445 can be at least about 1, at least about 2, at least about 5, at least about 10, or at least about 15° C. cooler than the temperature of the surface of the article contact member 452 immediately after removing the article from contact with the article supporting member 434 in the unloading zone 414 (e.g., the final contact surface temperature).

As shown in FIGS. 20 through 22, at any given time during the operation of swing arm conveyor, a portion of the article supporting members 434 may be configured in the heating orientation and another portion of the article supporting members 434 may be configured in the return orientation. As particularly shown in FIG. 23, article supporting members oriented in a return configuration (e.g., article supporting members 434e and 434f) may be configured so that the direction of extension of the longitudinal axes of these support members is skewed relative to the direction of extension of the longitudinal axes of the article supporting members that are oriented in a heating configuration (e.g., article supporting members 434*a-c*). For example, in certain embodiments, the direction of extension of the longitudinal axis of an article supporting member in a return configuration can be skewed by at least about 45, at least about 50, at least about 55, at least about 60, at least about 65, at least about 70, at least about 75, at least about 80, at least about 85, or at least about 90° from the direction of extension of the longitudinal axis of a corresponding article supporting member in a heating configuration.

When the article supporting member 434 reaches the end of the return path 445, it may be moved along a second transition path 447*b* as it moves from the return orientation to the heating orientation. In certain embodiments, the article supporting member 434 may be pivoted upwardly through an angle until it reaches the heating orientation. In some cases, it may pivot upwardly through an angle of at least about 45, at least about 50, at least about 55, at least about 60, at least about 65, at least about 70, at least about 75, at least about 80, at least about 85, or at least about 90° when moving from the return orientation to the heating orientation. Such movement of the article supporting members 434 may be achieved by, for example, permitting the article supporting member 434 to move along an inclined surface such as a ramp 457 shown in FIG. 22.

Figure 29:
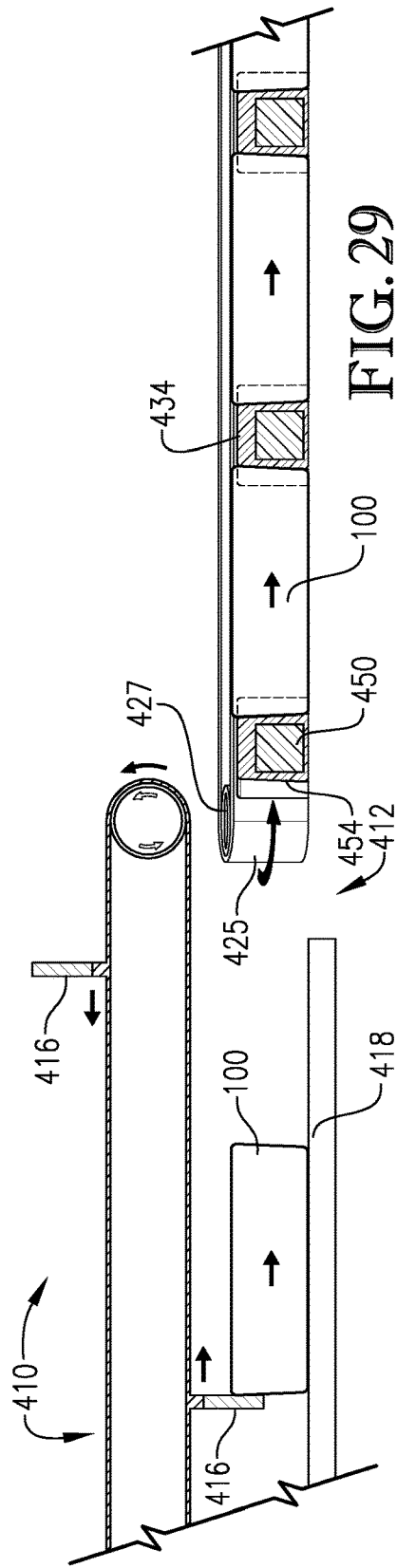
FIG. 29 is a partial side view of a loading zone in an RF heating section configured according to various embodiments of the present invention, particularly illustrating the transition between an approach conveyor and a swing-arm conveyor in the loading zone.

When the article supporting members 434 return to the loading zone 412, articles 100 may be loaded into the receiving spaces between adjacent members. For example, as shown in FIG. 29, an article 100 may be loaded onto the RF zone swing conveyor by using an approach conveyor 410 to push the front of the article 100 into contact with a first article supporting member 434. The approach conveyor 410 may include a plurality of approach pushing members 416 configured to contact the article 100 and move it along an approach track 418 and into contact with an article supporting member 434. Next, an adjacent article supporting member (not shown in FIG. 29), which may be transitioning from the return orientation to the heating orientation, may move into contact with the back of the article 100 as the article supporting member 434 enters the heating orientation, thereby securing the article 100 into the article into the article receiving space 436 between the adjacent article supporting members 434. As shown in FIG. 22, the adjacent article supporting member 434 moves into the loading zone 412, the article-receiving space 436 defined between the article supporting member 434 contacting the front of the article 100 and the adjacent article supporting member 434 transitioning from the return orientation to the heating orientation in the loading zone 412 is larger than it when the article supporting members 434 are in contact with the article 100 and moving it through the RF heating zone 318.

Returning again to FIG. 1, the articles exiting the RF heating zone 18 may be introduced into a subsequent thermal regulation zone 20, wherein, ultimately, the average temperature at the geometric center of the articles can be reduced by at least about 5, at least about 10, at least about 15, at least about 20, at least about 25, at least about 30, at least about 35, at least about 40, at least about 45, or at least about 50° C. within the subsequent thermal regulation zone 20. Thus, the average temperature at the geometric center of the articles withdrawn from the last stage of the subsequent thermal regulation zone 20 can be at least about 5, at least about 10, at least about 15, at least about 20, at least about 25, at least about 30, at least about 35, at least about 40, at least about 45, or at least about 50° C. cooler than the average temperature at the geometric center of the articles introduced into the first stage of the subsequent thermal regulation zone 20.

The average temperature at the geometric center of the articles withdrawn from the last stage of the subsequent thermal regulation zone 20 can be not more than about 120, not more than about 110, not more than about 100, not more than about 90, not more than about 80, not more than about 70, not more than about 60, not more than about 50, not more than about 40° C. lower than the average temperature at the geometric center of the articles entering the subsequent thermal regulation zone 20. When the articles are being pasteurized, the temperature of the articles passed through the subsequent thermal regulation zone 20 can be reduced by about 10° C. to about 60° C., or about 20° C. to about 40° C. When the articles are being sterilized, the average temperature at the geometric center of the articles passed through the subsequent thermal regulation zone 20 can be reduced by about 20° C. to about 120° C. or about 40° C. to about 60° C.

In certain embodiments, the articles can have an average residence time in the subsequent thermal regulation zone 20 of at least about 5, at least about 10, at least about 15, at least about 20, at least about 25, at least about 30, at least about 35, at least about 40, at least about 45, or at least about 50 minutes and/or not more than about 120, not more than about 110, not more than about 100, not more than about 90, not more than about 80, not more than about 70, not more than about 60, not more than about 50, or not more than about 40 minutes. When the articles are being pasteurized, the average residence time of the articles in the subsequent thermal regulation zone 20 can be in the range of from about 5 minutes to about 60 minutes or about 25 minutes to about 40 minutes. When the articles are being sterilized, the average residence time of the articles in subsequent thermal regulation zone 20 can be in the range of from about 15 minutes to about 120 minutes, or about 50 minutes to about 80 minutes.

In certain embodiments, as generally shown in FIG. 13, the residence time of the articles in the subsequent thermal regulation zone 20 can correspond to, for example, at least about 15, at least about 20, at least about 25, at least about 30, at least about 35, at least about 40, or at least about 45 percent and/or not more than about 85, not more than about 80, not more than about 75, not more than about 70, not more than about 65, or not more than about 60 percent of the total residence time of the articles passing through the entirety of the liquid contact zone 14. When the articles are being pasteurized, this can correspond to a residence time that is in the range of from 15 percent to 80 percent or 35 percent to 60 percent of the total residence time in liquid contact zone 14, while, this can correspond to a residence time that is in the range of from 30 percent to 85 percent, or from 45 percent to 75 percent of the residence time of the articles in the liquid contact zone 14 when the articles are being sterilized.

In certain embodiments, the percent of the total travel path of the articles defined in the subsequent thermal regulation zone 20 can be similar and within one or more of the ranges above such as, for example, at least about 15, at least about 20, at least about 25, or at least about 30 percent and/or not more than about 75, not more than about 70, not more than about 65, not more than about 60, not more than about 55, or not more than about 50 percent of the total travel path along which the articles are transported through the RF heating system may be defined within the initial thermal regulation zone 16. In some cases, the travel path of the articles through the initial thermal regulation zone 16 can correspond to 15 percent to 75 percent or 30 percent to 55 percent of the total travel path of the articles through the entire RF heating system. Depending on whether the articles are being pasteurized or sterilized, the subsequent thermal regulation zone 20 may have a different configuration, as generally shown in FIGS. 2 and 3.

Turning again to FIG. 2, when the articles passing through the RF heating system are being pasteurized, the subsequent thermal regulation zone 20 includes a high-pressure cooling zone 32, a pressure lock 26b, and a low-pressure cooling zone 34. Articles being pasteurized are not passed through a hold zone (as shown in FIG. 3), but are instead transitioned directly from the RF heating zone 18 into the high-pressure cooling zone 32. In certain embodiments, the articles being pasteurized can have an average residence time in a hold zone of not more than about 10, not more than about 8, not more than about 6, not more than about 4, not more than about 2, or not more than about 1 minute. Additionally, or in the alternative, not more than about 15, not more than about 12, not more than about 10, not more than about 8, not more than about 5, not more than about 2, or not more than about 1 percent of the total travel path of the articles through the RF heating system may be defined in the hold zone when the articles are being pasteurized.

Overall, the average temperature at the geometric center of the articles being pasteurized changes by not more than about 15, not more than about 10, not more than about 5, not more than about 2, or not more than about 1° C. as it passes through a hold zone. The temperature of at least about 95, at least about 98, or at least about 99 percent of the total volume of the articles being pasteurized withdrawn from the hold zone, if present, can be within a temperature range of about 2.5, about 2, about 1.5, about 1, about 0.75, about 0.50, or about 0.25° C. The high-pressure cooling zone 34 and the low-pressure cooling zone 32 will be discussed in further detail below.

Turning now to FIG. 3, when the articles passed through the RF heating system 10 are being sterilized, the subsequent thermal regulation zone 20 includes a thermal isolation zone 28, a hold zone 30, a high-pressure cooling zone 32, a pressure lock 26b, and a low-pressure cooling zone 34. Articles exiting the RF heating zone 18 may be passed through a thermal isolation zone 28 before entering the hold zone 30. In certain embodiments, the temperature of the fluid (e.g., liquid medium if liquid-filled) in the hold zone 30 may be at least about 2, at least about 5, at least about 8, at least about 10, at least about 12, at least about 15, at least about 18, or at least about 20° C. higher than the average temperature of the fluid (e.g., liquid medium if liquid-filled) in the RF heating zone 18. The thermal isolation zone 28 may be configured to transition the articles from the RF heating zone 18 to the hold zone 30 while maintaining the difference in temperature between the two zones.

Figure 30:
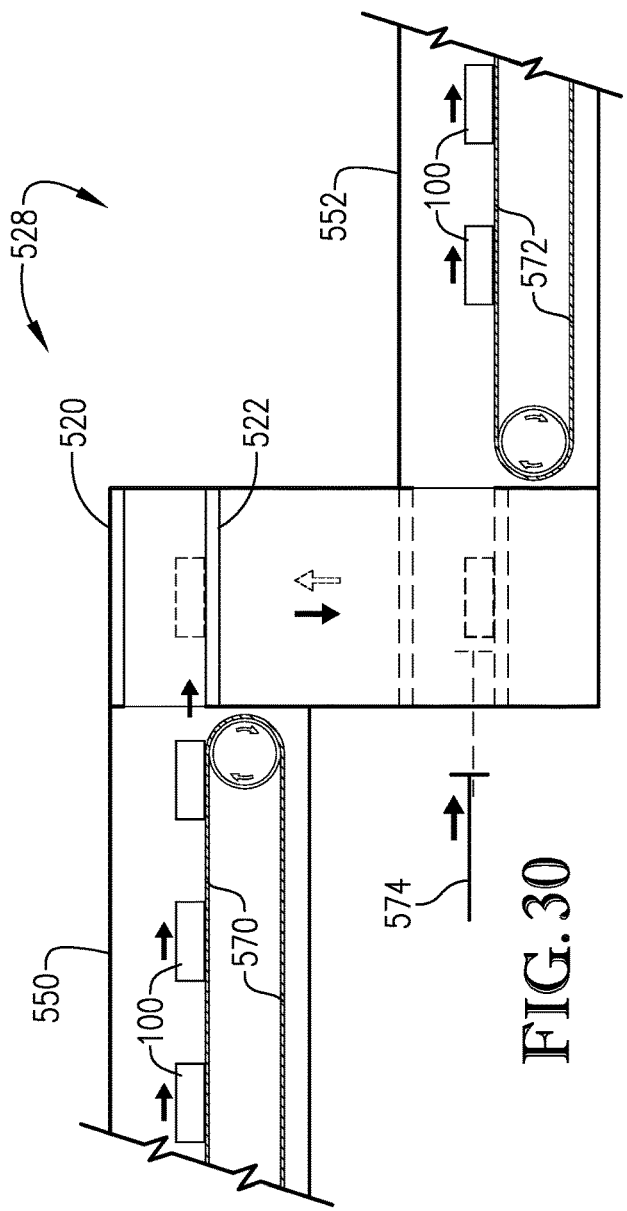
FIG. 30 is a schematic side view of a thermal isolation zone for transitioning articles between an RF heating zone and a hold zone according to various embodiments of the present invention.

Turning now to FIG. 30, one embodiment of a thermal isolation zone 530 is shown as generally comprising a transport housing 520 and a movable article transport device 522 disposed within the transport housing 520. As generally shown in FIG. 30, articles 100 exiting RF heating zone may be moved toward the thermal isolation zone 530 using a convey line 570 disposed within a first vessel 550. In some embodiments, the convey line 570 shown in FIG. 30 may be the take-away conveyor discussed previously. When the articles 100 reach the thermal isolation zone 530, one or more of the articles 100 can be loaded into an inlet of the movable article transport device 522. In some cases, the articles 100 may be loaded using the convey line 570, or may be pushed into the movable article transport device 522 using a pusher (not shown).

Once the articles 100 are loaded, the movable article transport device 522 may move within the transport housing 520 so that the movable article transport device 522 aligns with a second convey line 572 disposed within (or just upstream) of the hold zone in a second vessel 552. At that point, a pusher arm 574 or other device may be used to unload the article or articles 100 from an outlet of the movable article transport device 522 and onto the second convey line 572. Thereafter, the articles 100 may be transported into the hold zone for further processing, while the empty movable article transport device 522 is returned to the its original position proximate the first convey line 570 in vessel 550. Although shown in FIG. 30 as moving downwardly from the first convey line 570 to the second convey line 572, it should be understood that the transport housing 530 could be configured so that the movable article transport device 522 moves upwardly if, for example, the second vessel 552 was located at a higher vertical elevation than the first vessel 550.

Referring again to FIG. 3, in the hold zone 30, the heated articles are held so that the temperature of each article is maintained at or above a specified minimum temperature for a certain amount of time. In certain embodiments, the temperature at the geometric center of each article passing through the hold zone 30 can be maintained at a temperature at or above the average temperature at the geometric center of the articles exiting the RF heating zone 18. As a result, the articles exiting the hold zone 30 may be sufficiently and uniformly sterilized.

In certain embodiments, articles passing through hold zone 30 may be contacted with a liquid during at least a portion of the holding step. The liquid may comprise or be water and can have a temperature within about 25, within about 20, within about 15, or within about 10° C. of the average temperature at the geometric center of the articles introduced into the hold zone 30. The step of contacting may include submerging the articles in a liquid medium and/or contacting at least a portion of the articles with a jet of liquid emitted from one or more spray nozzles within the hold zone 30.

Overall, the average temperature at the geometric center of the articles passing through the hold zone 30 may increase by at least about 2, at least about 4, at least about 5, at least about 8, at least about 10, or at least about 12° C. and/or not more than about 40, not more than about 35, not more than about 30, not more than about 25, or not more than about 20° C., or it may increase by about 4° C. to about 40° C., or about 10° C. to about 20° C. In certain embodiments, the articles withdrawn from the hold zone 30 can be uniformly heated so that, for example, the temperature of at least about 95, at least about 98, or at least about 99 percent of the total volume of the articles can be within a temperature range of about 2.5, about 2, about 1.5, about 1, about 0.75, about 0.50, or about 0.25° C.

In certain embodiments, the average residence time of each article passed through the hold zone 30 (e.g., the hold time) can be at least about 1, at least about 2, at least about 5, at least about 6, or at least about 8 minutes and/or not more than about 40, not more than about 35, not more than about 30, not more than about 25, not more than about 20, not more than about 15, or not more than about 10 minutes, or it can be in the range of from 2 minutes to 40 minutes or 6 minutes to 20 minutes.

Turning again to FIG. 13, the average residence time of the articles passing through the hold zone 30 during sterilization can be at least about 2, at least about 5, at least about 8, or at least about 10 percent and/or not more than about 50, not more than about 45, not more than about 40, not more than about 35, not more than about 30, not more than about 25, or not more than about 20 percent of the overall residence time of the articles passing through liquid contact zone 14. In some embodiments, the average residence time of the articles passing through the RF heating zone 18 can be at least about 2, at least about 5, at least about 8, or at least about 10 percent and/or not more than about 50, not more than about 45, not more than about 40, not more than about 35, or not more than about 30 percent of the average residence time of the articles in the hold zone 30. At least about 5, at least about 8, at least about 10 percent and/or not more than about 50, not more than about 40, not more than about 30, or not more than about 20 percent of the total article travel path may be defined within the hold zone 30.

The articles passed through the hold zone 30 may be transported using one or more convey lines. Any suitable type of conveyor may be used to form the convey line through hold zone 30 including, for example, a helical conveyor as described previously with respect to FIGS. 7 through 10. Other types of conveyors may also be used. In certain embodiments, the convey line used to move the articles through the hold zone 30 can comprise at least one indexing conveyor, which may permit the residence time of the articles passing through hold zone 30 to be adjusted. The ability to control and adjust the article residence time and/or processing rate within the hold zone 30, or in other sections of the RF heating system, may provide additional operational flexibility not possible with other types of commercial heating systems.

Figure 31:
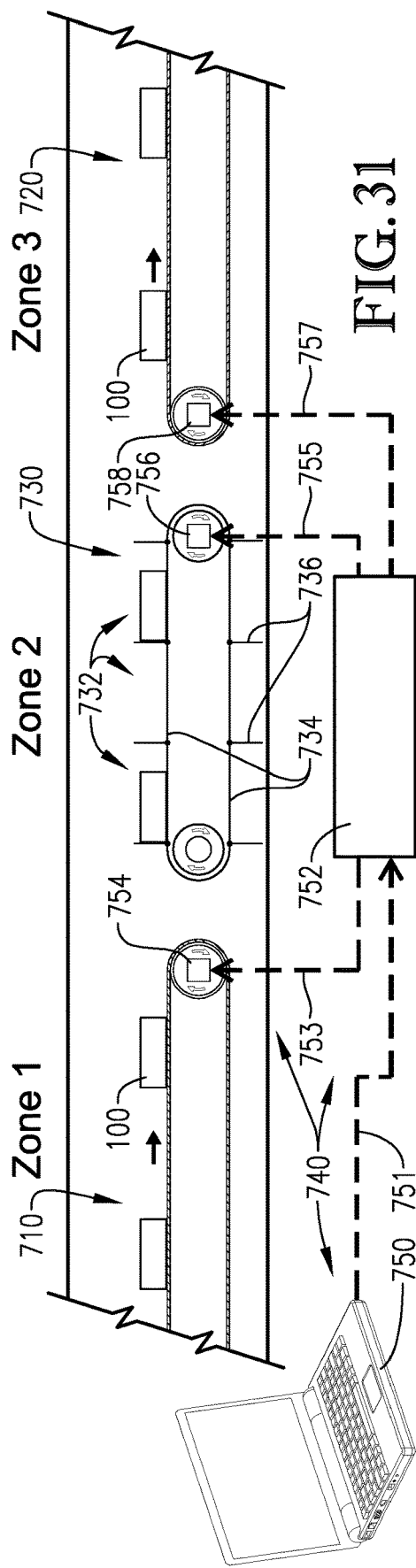
FIG. 31 is a schematic cross-sectional view of several processing zones in an RF heating system that include an indexing conveyor for intermittently transporting individual items through one of the zones, particularly when the indexing conveyor is a trough conveyor.
Figure 32:
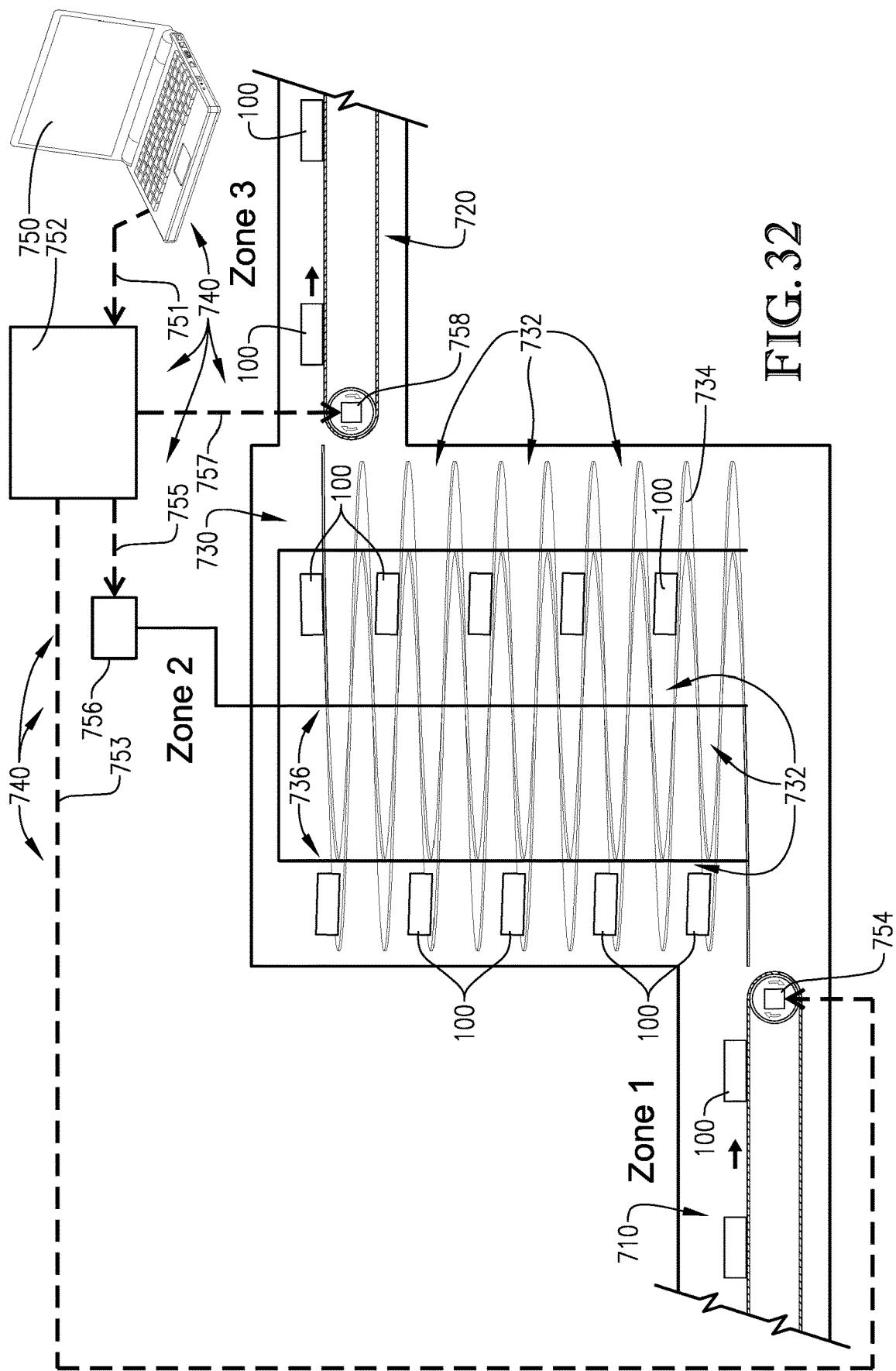
FIG. 32 is a schematic cross-sectional view of several processing zones in an RF heating system that include an indexing conveyor for intermittently transporting individual items through one of the zones, particularly when the indexing conveyor is a helical conveyor.

Turning now to FIGS. 31 and 32, embodiments of one section of a multi-zone processing apparatus that has enhanced operational flexibility are shown. Such apparatuses can be used, for example, in the section of an RF heating system that includes the hold zone 30. The apparatus shown in FIGS. 31 and 32 includes sequential first, second, and third processing zones that each including separate conveyors for transporting articles through that zone. In the embodiments depicted in FIGS. 31 and 32, the first zone includes an initial continuous conveyor 710, the second zone includes an indexing conveyor 730, and the third zone includes a subsequent continuous conveyor 720. In addition to the section of the RF heating system that includes the hold zone 30, this arrangement of conveyors can also be used in other zones of the RF heating system, including, the thermal equilibration zone 24, the RF heating zone 18, the high-pressure cooling zone 32, or the low-pressure cooling zone 34. Such an arrangement may also be used in other types of systems for treating articles that include multiple processing zones.

In operation, a plurality of discrete articles 100 can be transported through the first zone using the initial continuous conveyor 710. In some embodiments, the first zone may be a process zone, such as the RF heating zone 18 or the loading zone 12, while, in other embodiments, it may be a transition zone, such as the thermal isolation zone 28 disposed between the RF heating zone 18 and the hold zone 30. At the end of the first zone, the articles 100 may be transitioned from the initial continuous conveyor 710 to the indexing conveyor 730 of the second zone. The indexing conveyor 730 generally includes a plurality of discrete article-receiving spaces 732 defined along the convey path of the indexing conveyor 730 for receiving and holding articles passing through the second zone. The articles are transitioned onto the indexing conveyor 730 from the initial continuous conveyor 710 by intermittently loading individual articles 100 from the initial continuous conveyor 710 into individual article-receiving spaces 732 of the indexing conveyor 730. In certain embodiments, the indexing conveyor 730 may include N total article-receiving spaces 732, wherein N is an integer between 4 and 500. In some embodiments, N can be in the range of from 5 to 250, 10 to 100, or 20 to 80. The indexing conveyor 730 can be any suitable type of conveyor, including, for example, a trough conveyor as shown in FIG. 31 or a helical conveyor as shown in FIG. 32.

Once loaded into the indexing conveyor 730, the articles 100 may be transported through the second zone. The second zone may be a process zone, such as, for example the hold zone 30, or it could be another a thermal regulation zone, such as the thermal equilibration zone 24, the high-pressure cooling zone 32, or the low-pressure cooling zone 34. The second zone may also be the RF heating zone 18. Articles 100 passed through the second zone may be intermittently moved along the convey path of the indexing conveyor 730. The convey path can be substantially linear such as, for example, when the indexing conveyor 730 is a trough (or other similar) conveyor as shown in FIG. 31, or it can be substantially helical such as, for example, when the indexing conveyor 730 is a helical conveyor, as generally shown in FIG. 32.

As shown in FIGS. 31 and 32, the indexing conveyor 730 can include an article-guiding track 734 and a plurality of article pusher members 736, adjacent ones of which form the article-receiving spaces 732. As the articles 100 travel along the convey path of the indexing conveyor 730, they may be moved along the article-guiding track 734 using the article pusher members 736. When the conveyor is a trough conveyor as shown, for example, in FIG. 31, the article pusher members 736 may comprise push tabs. When the conveyor is a helical conveyor as generally shown in FIG. 32, the article pusher members 736 may be vertical push rods as described previously with respect to FIGS. 7 through 10. When the indexing conveyor 730 is a helical conveyor, the article pusher members 736 may rotate on an axis of rotation that corresponds to the central axis of the helical convey path.

After being transported along the convey path of the indexing conveyor 730, the articles 100 may be transitioned from the indexing conveyor 730 to the subsequent continuous conveyor 720 by intermittently unloading individual articles 100 from each of the article-receiving spaces 732 of the indexing conveyor 730. The subsequent continuous conveyor 720 may then transport the articles 100 through a third zone, which can be a process zone (such as the RF heating zone 18 or the high-pressure cooling zone 32 or the low-pressure cooling zone 34), or a transition zone between two different process zones.

In some embodiments, the average residence time of the articles 100 in the second zone may be adjusted by changing the average number of articles on the convey path of the indexing conveyor 730. For example, in some embodiments, when the articles are being transitioned from the initial continuous conveyor 710 to the indexing conveyor 730, one or more of the article-receiving spaces 732 of the indexing conveyor 730 may be skipped, so that one or more of the article-receiving spaces 732 remains empty as the articles pass through the second zone. As a result, the total number of articles on the convey path of the indexing conveyor is less than N, and the residence time of each article 100 in the second zone is less than it would be if N articles were present. In some cases, the rate of unloading from the initial continuous conveyor 710 to the indexing conveyor 730 and/or the rate of unloading from the indexing conveyor 730 to the subsequent continuous conveyor 720 may remain the same, or approximately the same, despite changes to the residence time of the articles 100 passed along the indexing conveyor 730.

In certain embodiments, the residence time of the articles in the first, second, and third zones can be controlled using a process control system. An example of the basic components of a process control system 740 shown in FIGS. 31 and 32 includes a computer 750, a process controller 752, and a plurality of drivers 754, 756, and 758 for controlling the movement of the initial continuous conveyor 710, the indexing conveyor 730, and the subsequent continuous conveyor 720, respectively. The computer 750 can be configured to receive input from a user and, based on that input (or the results of calculations using that input), to generate and transmit an output signal 751 to the process controller 752. Alternatively, the process controller 752 may be integral with the computer 750 as a single process control device. The process controller 752 converts the input signal 751 into one or more output signals, shown as signals 753, 755, and 757 in FIGS. 31 and 32, which regulate the motion of the drivers 754, 756, and 758, respectively. As a result, the speed and/or frequency of movement of one or more of the initial continuous conveyor 710, the indexing conveyor 730, and the subsequent continuous conveyor 720 can be automatically controlled by the process control system 740.

In operation, a user may input residence time and processing rate information into the computer 750. In certain embodiments, that information can be used by the process control system 740 to calculate one or more operating parameters for the system. In certain embodiments, the operating parameter calculated by the computer 750 and/or process controller 752 of the process control system 740 can include a loading parameter that determines the number of the article receiving spaces 732 are skipped while the articles 100 are loaded from the initial continuous conveyor 710 onto the indexing conveyor 730. The process control system 740 can then operate the first, second, and third zones by, for example, controlling the motion of the initial continuous conveyor 710, the subsequent continuous conveyor 720, and/or indexing conveyor 730 based on the calculated operating parameters as the articles are transported through each zone.

Subsequently, a user may input different processing rate and different residence time information into the computer 750 of the process control system 740 so that the computer 750 and/or process controller 752 calculates a different loading parameter than was previously calculated. This can, for example, results in a new loading parameter that requires a different number of article receiving spaces 732 to be skipped during loading. As a result, when the process control system 740 operates the first, second, and third zones according to the new parameters, the frequency at which the article-receiving spaces 732 of the indexing conveyor 730 are skipped can be reduced or increased as dictated by the new loading parameter. As a result, the residence time of the articles in the second zone increases or decreases. In particular, reducing the frequency at which the article-receiving spaces 732 are skipped during loading can increase the average residence time of the articles 100 in the second zone, while increasing the frequency at which the article-receiving spaces 732 are skipped during loading decreases the average residence time of the articles 100 in the second zone. Thus, in certain embodiments, by entering different processing rate and residence time information into the process control system 740, the user may change the residence time of the articles in the second process zone.

By changing the frequency at which the article-receiving spaces are skipped, the process may transition from an initial operating mode to a subsequent operating mode. In transitioning from one mode to another, the residence time of the articles 100 in the second zone may be changed relative to the residence time of the articles 100 in the first and/or third zones. For example, in the initial operating mode, the articles may have an average residence time in the first, second, and third zones of T1i, T2i, and T3i, respectively, while the articles may have an average residence time in the first, second, and third zones of T1s, T2s, and T3s, when the process is operating in the subsequent mode. Actual values for each of T1i, T2i, T3i, T1s, T2s, and T3s depend on the specific zone and can fall within one or more of the ranges provided herein. In some embodiments, the ratio of T2s to T1s (T2s/T1s) can be at least about 5, at least about 10, at least about 15, at least about 20, or at least about 25 percent different than the ratio of T2i to T1i (T2i/T1i). Alternatively, or in addition, the ratio of T2s to T3s (T2s/T3s) can be at least about 5, at least about 10, at least about 15, at least about 20, or at least about 25 percent different than the ratio of T2i to T3i (T2i/T3i).

When the process is transitioned from the initial mode to the subsequent mode by increasing the frequency at which the article receiving spaces 732 are skipped, the total number of articles on the convey path on the indexing conveyor is reduced. As a result, the average residence time of each article 100 in the second zone decreases relative to the average residence time of the articles in the first and/or third zones. In certain embodiments, the result can be that the ratio of T2s/T1s can be at least about 5 percent less than T2i/T1i and/or the ratio of T2s/T3s can be at least about 5 percent less than the ratio of T2i/T3i. In certain embodiments, T2s/T1s can be at least about 10, at least about 15, at least about 20, or at least about 25 percent less than T2i/T1i and/or T2s/T3s can be at least about 10, at least about 15, at least about 20, or at least about 25 percent less than T2i/T3i.

When the process is transitioned from the initial mode to the subsequent mode by decreasing the frequency at which the article receiving spaces 732 are skipped, the total number of articles on the convey path on the indexing conveyor is increased. As a result, the average residence time of each article in the second zone increases relative to the average residence time of the articles in the first and/or third zones. In certain embodiments, the result can be that the ratio of T2s/T1s can be at least about 5 percent greater than T2i/T1i and/or the ratio of T2s/T3s can be at least about 5 percent greater than the ratio of T2i/T3i. In certain embodiments, T2s/T1s can be at least about 10, at least about 15, at least about 20, or at least about 25 percent greater than T2i/T1i and/or T2s/T3s can be at least about 10, at least about 15, at least about 20, or at least about 25 percent greater than T2i/T3i.

In some embodiments, when the average residence time of the articles in the second zone is adjusted relative to the average residence time of the articles in the first and/or third zones, the overall rate of articles passing through the first, second, and third zones may remain constant. For example, during the initial operating mode, the articles may pass through the first, second, and third zones at an initial average rate of Ri articles per minute. During the subsequent operating mode, the articles may pass through the first, second, and third zones at a subsequent average rate of Rs articles per minute. In certain embodiments, Ri is within about 25, within about 20, within about 15, within about 10, or within about 5 percent of Rs, or Ri can be equal to Rs. It should be understood that the process could be operated in any number of modes, and the terms "initial" and "subsequent" are used for reference, not necessarily to limit the processes or systems herein to two distinct modes of operation.

Turning again to FIGS. 2 and 3, articles being pasteurized that are removed from the RF heating zone 18, and articles being sterilized removed from the hold zone 30 may be introduced into the high-pressure cooling zone 32. In the high-pressure cooling zone 32 the average temperature at the geometric center of the articles can be reduced by at least about 5, at least about 10, at least about 15, or at least about 20° C. and/or not more than about 60, not more than about 55, not more than about 50, not more than about 45, not more than about 40, not more than about 35, or not more than about 30° C. When the articles are being pasteurized, the average temperature at the geometric center of the articles can be reduced by about 5° C. to about 40° C. or about 10° C. to about 30° C. When the articles are being sterilized, the average temperature at the geometric center of the articles can be reduced by about 10° C. to about 60° C., or about 20° C. to about 40° C. as the articles pass through the high-pressure cooling zone 32.

Articles introduced into the high-pressure cooling zone 32 can have an average temperature at the geometric center of at least about 80, at least about 85, at least about 90, at least about 95, at least about 100, at least about 105, at least about 110, at least about 115, or at least about 120° C. and/or not more than about 135, not more than about 130, not more than about 125, not more than about 120, not more than about 115, not more than about 110, or not more than about 105° C. When the articles are being pasteurized and are introduced into the high-pressure cooling zone 32 from the RF heating zone 18, the average temperature at the geometric center of the articles can be in the range of from about 80° C. to about 115° C., or about 95° C. to about 105° C. When the articles are being sterilized and are introduced into the high-pressure cooling zone 32 from the hold zone 30, the average temperature at the geometric center of the articles can be in the range of from about 110° C. to about 135° C. or about 120° C. to about 130° C. The average difference between the maximum temperature (i.e., hottest portion) and the minimum temperature (i.e., coldest portion) of each article exiting the RF heating zone 18 or hold zone 30 can be not more than about 5, not more than about 2.5, not more than about 2, not more than about 1.5, not more than about 1, or not more than about 0.5° C.

In certain embodiments, the hold zone 30 can have a pressure of at least about 2, at least about 5, at least about 10, or at least about 15 psig and/or not more than about 80, not more than about 75, not more than about 70, not more than about 65, not more than about 60, not more than about 55, not more than about 50, not more than about 45, not more than about 40, not more than about 35, not more than about 30, not more than about 25, not more than about 20 psig.

The average residence time of the articles passing through the high-pressure cooling zone 32 can be at least about 1, at least about 2, at least about 5, or at least about 10 minutes and/or not more than about 60, not more than about 55, not more than about 50, not more than about 45, not more than about 40, not more than about 35, not more than about 30, not more than about 25, not more than about 20, not more than about 15, or not more than about 10 minutes. When the articles passed through the high-pressure cooling zone 32 are being pasteurized, the average residence time of the articles in high-pressure cooling zone 32 can be in the range of from about 1 minute to about 30 minutes, or about 5 minutes to about 10 minutes. When the articles are being sterilized, the average residence time of the articles passing through the high-pressure cooling zone 32 can be in the range of from about 2 to about 60 minutes, or about 10 to about 20 minutes.

Referring again to FIG. 13, the average residence time of the articles passing through the high-pressure cooling zone 32 makes up a portion of the residence time of the articles passing through the liquid contact zone. For example, in some embodiments, the average residence time of the articles passing through the high-pressure cooling zone 32 can be at least about 4, at least about 5, at least about 8, or at least about 10 percent and/or not more than about 50, not more than about 45, not more than about 40, not more than about 35, not more than about 30, or not more than about 25 percent of the total residence time of the articles passing through liquid contact zone 14. This can correspond to a travel path through the high-pressure cooling zone 32 that is at least about 4, at least about 5, at least about 8, or at least about 10 percent and/or not more than about 50, not more than about 40, not more than about 30, not more than about 25, or not more than about 20 percent of the total travel path of the articles moving through the RF heating system. The travel path of the articles through the high-pressure cooling zone 32 can be in the range of from about 4 to about 50 percent, or about 10 to about 25 percent of the total travel path the articles follow when moving through the RF heating system.

When the articles heated in the RF heating system are being sterilized, the residence time of the articles in the hold zone 30 can be less than, similar to, or greater than the residence time of the articles in the high-pressure cooling zone 32. For example, in certain embodiments, the average residence time of the articles passing through the hold zone 30 can be at least about 5, at least about 10, at least about 15, at least about 20, at least about 25, at least about 30, at least about 35, at least about 40, at least about 45, or at least about 50 percent and/or not more than about 400, not more than about 300, not more than about 200, not more than about 150 percent of the average residence time of the articles passing through the high-pressure cooling zone 32.

When the articles are being pasteurized (and are not passed through a hold zone), the residence time of articles passing through the hold zone can be not more than about 25, not more than about 20, not more than about 15, not more than about 10, or not more than about 5 percent of the residence time of the articles passing through the high-pressure cooling zone 32. When the articles are being sterilized, the residence time of the articles passing through the hold zone 30 can be in the range of from about 25 percent to about 400 percent, or about 50 percent to about 150 percent of the average residence time of the articles passing through the high-pressure cooling zone 32.

Articles passing through the high-pressure cooling zone 32 may be contacted with a liquid during at least a portion of the cooling step. The liquid may comprise or be water and can have a temperature within about 25, within about 20, within about 15, or within about 10° C. of the average temperature at the geometric center of the articles withdrawn from the outlet of the high-pressure cooling zone 32. The step of contacting may include submerging the articles in a liquid medium and/or contacting at least a portion of the articles with a jet of liquid emitted from one or more spray nozzles within the high-pressure cooling zone 32.

In certain embodiments, the articles may be passed through the high-pressure cooling zone 32 using at least one conveyor. Any suitable type of conveyor can be used and, in some embodiments, it may comprise at least one helical conveyor as described previously with respect to FIGS. 7 through 10. In certain embodiments, when the articles being heated are sterilized, the convey line in the hold zone 30 and the high-pressure cooling zone 32 can each comprise helical conveyors, configured so that one of the conveyors transports the articles upwardly from the inlet to the outlet of the conveyor and the other of the conveyors transports the articles downwardly from the inlet to the outlet of the conveyor. One example of such a configuration is shown in FIG. 33.

Figure 33:
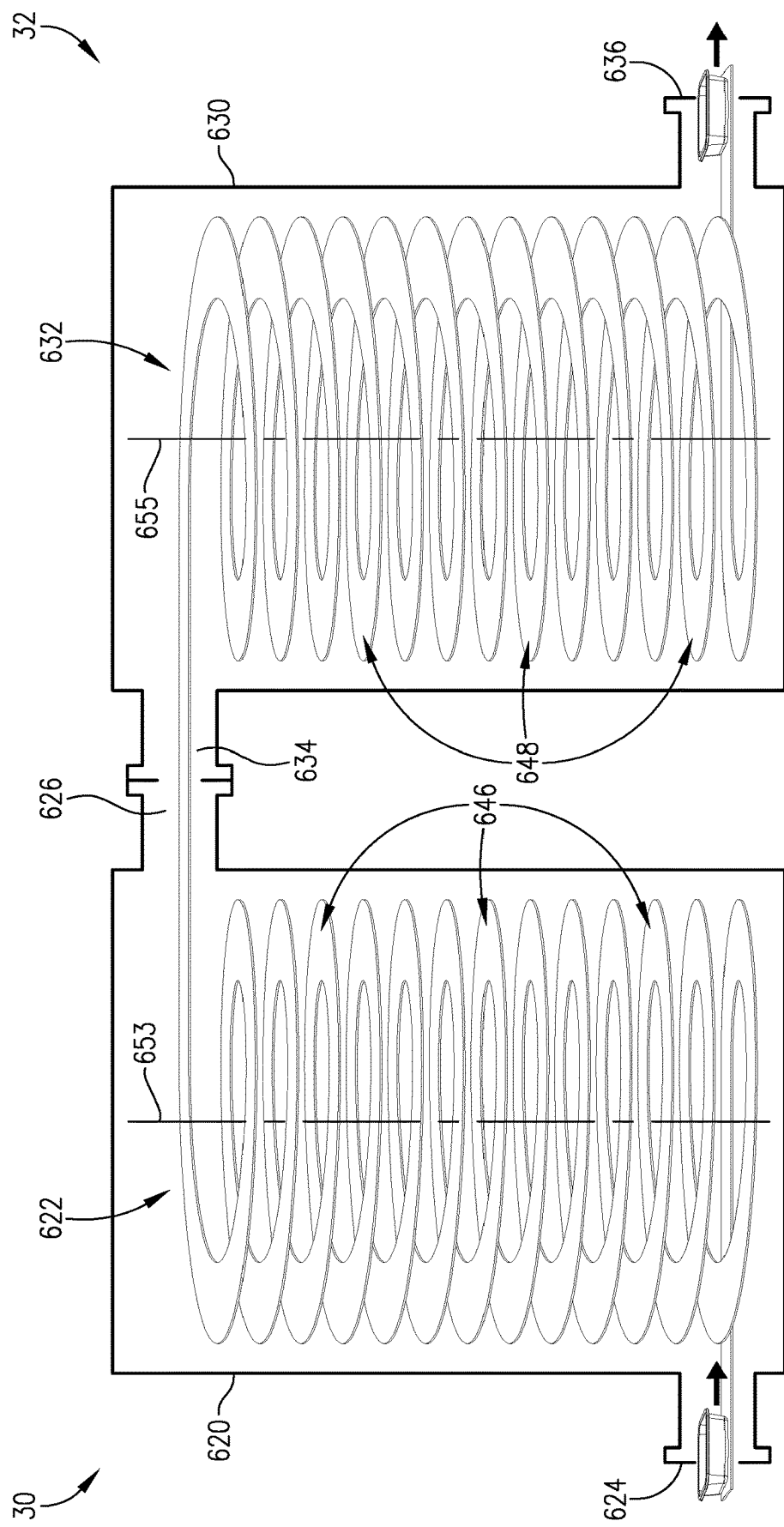
FIG. 33 is a schematic cross-sectional view of a hold zone and a high-pressure cooling zone, particularly illustrating various embodiments of the present invention wherein each zone includes a helical conveyor.

As shown in FIG. 33, the vessel 620 used in hold zone 30 houses a helical conveyor 622 for transporting articles 100 from a lower inlet 624 configured to receive articles into the vessel 620 to an upper outlet 626 configured to discharge articles from the vessel 620, while the vessel 630 used in high-pressure cooling zone 32 includes another helical conveyor 632 disposed therein and configured to transport articles 100 from an upper inlet 634 configured to receive articles to a lower outlet 636 configured to discharge articles. Each conveyor 620 and 630 include respective helical tracks 646 and 648 that extend around respective central vertical axes 653 and 655, which are horizontally offset from one another. It should be understood that helical conveyors 622 and 632 are shown schematically in FIG. 33 and would include a variety of other elements, such as article pushers and liquid heat transfer systems, as described previously with respect to FIGS. 7 through 10. Further, although shown as being received in two separate vessels 620 and 630, it should also be understood that both conveyors may be housed in a single vessel. In such an embodiment, the articles 100 passing along the conveyors 620 and 630 would be introduced into the vessel by inlet 624 and removed from the vessel by outlet 636, both of which would be located at a similar, or substantially the same, vertical elevation.

In certain embodiments, when the hold zone 30 and the high-pressure cooling zone 32 are at least partially liquid filled, the average temperature of the liquid in the hold zone 30 can be at least about 20, at least about 25, at least about 30, at least about 35, at least about 40, at least about 45, at least about 50, at least about 55, at least about 60, at least about 65, at least about 70, at least about 75, at least about 80, at least about 85, at least about 90, at least about 95, or at least about 100° C. and/or not more than about 200, not more than about 190, not more than about 180, not more than about 170, not more than about 160, not more than about 150, not more than about 140, not more than about 130, not more than about 120, not more than about 110, not more than about 100, or not more than about 90° C. higher than the average temperature of the liquid in the high-pressure cooling zone 32. Additionally, or in the alternative, the pressures of the hold zone 30 and the high-pressure cooling zone 32 may be within about 10, within about 5, within about 2, or within about 1 psig of one another.

As discussed previously, articles 100 traveling along the helical conveyor 622 in hold zone 30 and/or articles 100 traveling along the helical conveyor 632 in the high-pressure cooling zone 32 shown in FIG. 33 may be contacted with a liquid during at least a portion of the travel path. In certain embodiments, the contacting performed in one or both steps may include submerging the articles 100 in a liquid medium. Additionally, or in the alternative, the articles 100 may also be contacted with a spray of liquid discharged from one or more liquid jets (not shown) located within vessel 620 and/or vessel 630. In other embodiments, a different type of conveyor may be used in one of hold zone 30 and/or high-pressure cooling zone 32.

As shown in FIGS. 2 and 3, the articles exiting the high-pressure cooling zone 32 can be passed through another pressure lock 26b before entering the low-pressure cooling zone 34. Similarly to pressure lock 26a described previously with respect to FIGS. 11 and 12, the pressure lock 26b can be configured to transition the articles between two environments having different pressures. Pressure lock 26a shown in FIGS. 2 and 3 may be configured to transition the articles from a higher-pressure environment to a lower-pressure environment, such as, for example, from the high-pressure cooling zone 32 to the low-pressure cooling zone 34. In certain embodiments, the high-pressure cooling zone 32 can have a pressure that is at least about 2, at least about 5, at least about 10, or at least about 15 psig and/or not more than about 50, not more than about 40, not more than about 30, not more than about 20, or not more than about 10 psig higher than the pressure in high-pressure cooling zone 32.

Low-pressure cooling zone 34 may be configured to reduce the temperature at the geometric center of the articles by at least about 5, at least about 10, at least about 15, at least about 20, at least about 25, at least about 30, at least about 35, or at least about 40° C. and/or not more than about 100, not more than about 95, not more than about 90, not more than about 85, not more than about 80, not more than about 75, not more than about 70, not more than about 65, not more than about 60, or not more than about 55° C. When the articles are being pasteurized, the low-pressure cooling zone 34 may reduce the temperature at the geometric center of the articles passing therethrough by about 5° C. to about 100° C. or about 50° C. to about 80° C. When the articles are being sterilized, the low-pressure cooling zone 34 may reduce the temperature at the geometric center of the articles by about 10° C. to about 75° C. or about 40° C. to about 60° C.

When removed from the low-pressure cooling zone 34, the articles may be at a suitable handling temperature. For example, the temperature at the geometric center of the articles exiting the low-pressure cooling zone 34 can be at least about 50, at least about 55, at least about 60, at least about 65, at least about 70, at least about 75, or at least about 80° C. and/or not more than about 100, not more than about 97, not more than about 95, not more than about 90, or not more than about 85° C. When being pasteurized, the articles withdrawn from the low-pressure cooling zone 34 can have an average temperature at the geometric center in the range of from about 50° C. to about 97° C. or about 80° C. to about 95° C. When being sterilized, the average temperature at the geometric center of the articles exiting the low-pressure cooling zone 34 can be about 50° C. to about 100° C. or about 80° C. to about 97° C. The average difference between the maximum temperature (i.e., hottest portion) and the minimum temperature (i.e., coldest portion) of each article exiting the low-pressure cooling zone can be not more than about 5, not more than about 2.5, not more than about 2, not more than about 1.5, not more than about 1, or not more than about 0.5° C.

The average residence time of the articles passing through the low-pressure cooling zone 34 can be at least about 1, at least about 2, at least about 5, at least about 8, at least about 10, at least about 12, or at least about 15 minutes and/or not more than about 80, not more than about 70, not more than about 60, not more than about 50, not more than about 40, not more than about 30, or not more than about 20 minutes. When the articles are being pasteurized, the average residence time of the articles in the low-pressure cooling zone 34 can be in the range of from about 1 minute to about 80 minutes, or about 5 minutes to about 20 minutes. When the articles are being sterilized, the average residence time of the articles in the low-pressure cooling zone 34 can be in the range of from about 2 minutes to about 80 minutes or about 15 minutes to about 40 minutes.

This can correspond to at least about 5, at least about 10, at least about 15, or at least about 20 percent and/or not more than about 60, not more than about 55, not more than about 50, not more than about 40 percent of the total residence time of the articles in the liquid contact zone 14, or the average residence time of the articles in low-pressure cooling zone 34 can be in the range of from about 5 percent to about 60 percent or about 20 percent to about 40 percent of the total residence time of the articles in the RF heating system. In certain embodiments, the travel path of the articles through the low-pressure cooling zone 34 can reflect similar percentages of the total travel path of the articles through the RF heating system.

In certain embodiments, the average residence time of the articles in the high-pressure cooling zone 32 can be less than, similar to, or greater than the average residence time of the articles in the low-pressure cooling zone 34. For example, the average residence time of the articles in the high-pressure cooling zone 32 can be at least about 25, at least about 30, at least about 35, or at least about 40 percent and/or not more than about 400, not more than about 350, not more than about 300, not more than about 250, not more than about 200, not more than about 150, or not more than about 120 percent of the average residence time of the articles in the low-pressure cooling zone 34. The average residence time of the articles in the high-pressure cooling zone 32 can be in the range of from about 25 percent to about 400 percent, or about 40 percent to about 120 percent of the average residence time of the articles in the low-pressure cooling zone 34.

In certain embodiments, the articles may be passed through the low-pressure cooling zone 34 using at least one conveyor. Any suitable type of conveyor can be used and, in some embodiments, it may comprise at least one helical conveyor as described previously with respect to FIGS. 7 through 10. Alternatively, one or more other types of conveyors may be used according to other embodiments of the present invention. In some cases, at least one, at least two, or all of the hold zone 30 (when present), the high-pressure cooling zone 32, and the low-pressure cooling zone 34 may include at least one helical conveyor.

As shown in FIG. 1, the cooled articles exiting the low-pressure cooling zone 34 may be removed from the RF heating system 10 via an unloading zone 22. Any suitable method or device may be used to remove the articles from contact with liquid in unloading zone 22. The temperature at the geometric center of the articles removed from the unloading zone 22 can be at least about 25, at least about 30, at least about 35, at least about 40, at least about 45, or at least about 50° C. and/or not more than about 80, not more than about 75, not more than about 70, not more than about 65, or not more than about 60° C. The unloading zone may be operated at approximately ambient temperature and/or pressure. Once removed from the unloading zone 22, the articles may be transported for further processing, storage, shipment, or use.

Definitions

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventor hereby states his intention to rely on the Doctrine of Equivalents to determine and assess the reasonably fair scope of the present invention as pertains to any method or apparatus departing from but not outside the literal scope of the invention as set forth in the following claims.

I claim:

1. A process for sterilizing or pasteurizing articles using radio frequency (RF) energy, said process comprising:
    (a) passing a plurality of articles through an initial thermal regulation zone;
    (b) heating said articles an RF heating zone, wherein at least a portion of said heating is performed using RF energy;
    (c) passing said articles through a subsequent thermal regulation zone,
    wherein at least one of said passing of step (a) and said passing of step (c) includes pushing said articles relative to a track that guides movement of said articles along a helical path having a plurality of vertically-spaced tiers, wherein said pushing is carried out by intermittently moving a plurality of spaced apart pusher members that contact said articles and push said articles relative to said track;
    (d) adjusting the residence time of said articles on said path by adjusting the magnitude of the intermittent movement of said pusher members; and
    (e) loading said articles onto said path at a loading rate and unloading said articles from said path at an unloading rate, wherein said loading and said unloading rates are substantially the same, wherein said adjusting of the residence time of said articles on said path is carried out without changing said loading and unloading rates.

2. The process of claim 1, further comprising contacting said articles on said path with a liquid heat transfer medium to thereby regulate the temperature of said articles, wherein said contacting of said articles with said liquid heat transfer medium is carried out by at least one of (i) spraying said liquid heat transfer medium onto said articles and (ii) by submerging said articles in said liquid heat transfer medium.

3. The process of claim 1, wherein said pushing is caused by rotating an article pushing assembly comprising a plurality of pusher members, wherein said pusher members contact said articles and push said articles relative to said track along said path.

4. The process of claim 3, wherein said pushing is carried out by intermittently rotating said article pushing assembly, further comprising adjusting the residence time of said articles on said path by adjusting the angular magnitude of the intermittent rotation of said article pushing assembly.

5. The process of claim 3, wherein said path extends around a substantially vertical central axis, wherein article pushing assembly rotates on said substantially vertical central axis, wherein said pushing includes pushing articles on different vertically-spaced tiers of said path with a common one of said pusher members, wherein said track includes spaced apart inner and outer sections, wherein said pusher members extend through the space between said inner and outer sections of said track, wherein said pusher members comprise substantially vertical rods.

* * * * *